(12) United States Patent
Gollnick et al.

(10) Patent No.: US 7,536,167 B2
(45) Date of Patent: *May 19, 2009

(54) NETWORK SUPPORTING ROAMING, SLEEPING TERMINALS

(75) Inventors: Charles D. Gollnick, Cedar Rapids, IA (US); Ronald E. Luse, Marion, IA (US); John G. Pavek, Cedar Rapids, IA (US); Marvin L. Sojka, Cedar Rapids, IA (US); James D. Cnossen, Marion, IA (US); Arvin D. Danielson, Cedar Rapids, IA (US); Ronald L. Mahany, Cedar Rapids, IA (US); Mary L. Detweiler, Parnell, IA (US); Gary N. Spiess, Lisbon, IA (US); Guy J. West, Cedar Rapids, IA (US); Amos D. Young, Cedar Rapids, IA (US); Robert C. Meier, Cedar Rapids, IA (US); Keith K. Cargin, Jr., Cedar Rapids, IA (US); Richard C. Arensdorf, Ely, IA (US); Robert G. Geers, Cedar Rapids, IA (US)

(73) Assignee: Broadcom Corporation, Irvine, CA (US)

( * ) Notice: Subject to any disclaimer, the term of this patent is extended or adjusted under 35 U.S.C. 154(b) by 279 days.

This patent is subject to a terminal disclaimer.

(21) Appl. No.: 10/630,138

(22) Filed: Jul. 29, 2003

(65) Prior Publication Data

US 2004/0023651 A1    Feb. 5, 2004

Related U.S. Application Data

(63) Continuation of application No. 09/318,668, filed on May 25, 1999, which is a continuation of application No. 08/545,108, filed on Oct. 19, 1995, now Pat. No. 5,940,771, which is a continuation of application No. 07/947,102, filed on Sep. 14, 1992, now abandoned, and a continuation of application No. 07/907,927, filed on Jun. 30, 1992, now abandoned, said application No. 07/947,102 and a continuation-in-part of application No. 07/857,603, filed on Mar. 30, 1992, now abandoned, is a continuation-in-part of application No. 07/700,704, filed on May 14, 1991, now abandoned, which is a continuation-in-part of application No. 07/699,818, filed on May 13, 1991, now abandoned, said application No. 07/907,927 and a continuation-in-part of application No. PCT/US92/03982, filed on May 13, 1992, and a continuation-in-part of application No. 07/769,425, filed on Oct. 1, 1991, now abandoned, and a continuation-in-part of application No. 07/802,348, filed on Dec. 4, 1991, now abandoned, is a continuation-in-part of application No. 07/790,946, filed on Nov. 12, 1991, now abandoned.

(51) Int. Cl.
*H04W 52/44* (2006.01)
*H04W 52/28* (2006.01)

(52) U.S. Cl. .................. 455/343.4; 455/412.2; 455/517; 455/574

(58) Field of Classification Search .......... 455/343.1–6, 455/517, 561, 412.2, 574
See application file for complete search history.

(56) References Cited

U.S. PATENT DOCUMENTS

| | | | |
|---|---|---|---|
| 3,781,815 A | 12/1973 | Boudreau et al. |
| 4,164,628 A | 8/1979 | Ward et al. |
| 4,332,027 A | 5/1982 | Malcom et al. |
| 4,414,661 A | 11/1983 | Karlstrom |
| 4,449,248 A | 5/1984 | Leslie et al. |
| 4,630,314 A | 12/1986 | Smith |
| 4,644,532 A | 2/1987 | George et al. |
| 4,663,706 A | 5/1987 | Allen et al. |
| 4,679,244 A | 7/1987 | Kawasaki et al. |
| 4,725,992 A | 2/1988 | McNatt et al. |
| 4,734,694 A | 3/1988 | Umetsu et al. |
| 4,736,461 A | 4/1988 | Kawasaki et al. |
| 4,745,408 A | 5/1988 | Nagata et al. |
| 4,747,126 A | 5/1988 | Hood et al. |
| 4,748,658 A | 5/1988 | Gopal et al. |
| 4,794,649 A | 12/1988 | Fujiwara |

| Patent No. | Date | Inventor |
|---|---|---|
| 4,799,253 A | 1/1989 | Stern et al. |
| 4,804,954 A | 2/1989 | Macnak |
| 4,809,257 A | 2/1989 | Gantenbein et al. |
| 4,837,858 A | 6/1989 | Ablay et al. |
| 4,857,915 A | 8/1989 | Andros et al. |
| 4,864,559 A | 9/1989 | Perlman |
| 4,884,266 A | 11/1989 | Pflaumer |
| 4,885,780 A | 12/1989 | Gopal et al. |
| 4,903,319 A | 2/1990 | Kasai et al. |
| 4,916,726 A | 4/1990 | Morley, Jr. et al. |
| 4,926,064 A | 5/1990 | Tapang |
| 4,942,552 A | 7/1990 | Merrill et al. |
| 4,964,121 A | 10/1990 | Moore |
| 4,977,611 A | 12/1990 | Maru |
| 4,984,247 A | 1/1991 | Kaufmann et al. |
| 4,989,230 A | 1/1991 | Gillig |
| 4,995,099 A | 2/1991 | Davis |
| 5,008,882 A | 4/1991 | Peterson et al. |
| 5,018,133 A | 5/1991 | Tsukakoshi et al. |
| 5,025,486 A | 6/1991 | Klughart |
| 5,027,427 A | 6/1991 | Shimizu |
| 5,027,428 A | 6/1991 | Ishiguro et al. |
| 5,029,183 A | 7/1991 | Tymes |
| 5,031,098 A | 7/1991 | Miller et al. |
| 5,031,231 A | 7/1991 | Miyazaki |
| 5,055,659 A | 10/1991 | Hendrick et al. |
| 5,056,085 A | 10/1991 | Vu |
| 5,058,023 A | 10/1991 | Kozikaro |
| 5,058,203 A | 10/1991 | Inagami |
| 5,081,402 A | 1/1992 | Koleda |
| 5,087,099 A | 2/1992 | Stolarczyk |
| 5,089,813 A | 2/1992 | Deluca |
| 5,093,926 A | 3/1992 | Sasuta |
| 5,099,509 A | 3/1992 | Morganstein et al. |
| 5,103,459 A | 4/1992 | Gilhousen et al. |
| 5,103,461 A | 4/1992 | Tymes |
| 5,117,422 A | 5/1992 | Hauptschein et al. |
| 5,117,449 A | 5/1992 | Metroka |
| 5,119,397 A | 6/1992 | Dahlin et al. |
| 5,119,502 A | 6/1992 | Kallin et al. |
| 5,121,408 A | 6/1992 | Cai et al. |
| 5,123,029 A | 6/1992 | Bantz |
| 5,128,932 A | 7/1992 | Li |
| 5,128,938 A | 7/1992 | Borras |
| 5,134,347 A | 7/1992 | Koleda |
| 5,142,279 A | 8/1992 | Jasinski et al. |
| 5,142,531 A | 8/1992 | Kirby |
| 5,142,534 A | 8/1992 | Simpson et al. |
| 5,142,550 A | 8/1992 | Tymes |
| 5,146,214 A | 9/1992 | Yamada et al. |
| 5,150,360 A | 9/1992 | Perlman et al. |
| 5,150,361 A | 9/1992 | Wieczorek et al. |
| 5,152,006 A | 9/1992 | Klaus |
| 5,157,687 A | 10/1992 | Tymes |
| 5,159,592 A | 10/1992 | Perkins |
| 5,163,080 A | 11/1992 | Amoroso et al. |
| 5,168,271 A * | 12/1992 | Hoff .................... 455/343.4 X |
| 5,168,498 A | 12/1992 | Adams |
| 5,175,870 A | 12/1992 | Mabey |
| 5,203,020 A | 4/1993 | Sato et al. |
| 5,224,150 A | 6/1993 | Neustein |
| 5,224,152 A | 6/1993 | Harte |
| 5,230,084 A | 7/1993 | Nguyen |
| 5,239,466 A | 8/1993 | Morgan |
| 5,241,542 A | 8/1993 | Natarajan et al. |
| 5,241,691 A | 8/1993 | Owen |
| 5,252,963 A | 10/1993 | Snowden et al. |
| 5,255,268 A | 10/1993 | Cato et al. |
| 5,257,019 A | 10/1993 | Schwendeman et al. |
| 5,260,988 A | 11/1993 | Schellinger et al. |
| 5,260,990 A | 11/1993 | McLampy et al. |
| 5,265,270 A | 11/1993 | Stengel |
| 5,274,666 A | 12/1993 | Dowdell et al. |
| 5,275,254 A | 1/1994 | Shiraishi et al. |
| 5,276,680 A | 1/1994 | Messenger |
| 5,278,831 A | 1/1994 | Mabey |
| 5,280,480 A | 1/1994 | Pitt et al. |
| 5,285,208 A | 2/1994 | Bertiger |
| 5,291,479 A | 3/1994 | Vaziri et al. |
| 5,293,639 A | 3/1994 | Wilson |
| 5,295,154 A | 3/1994 | Meier et al. |
| 5,296,849 A | 3/1994 | Ide |
| 5,297,144 A | 3/1994 | Gilbert |
| 5,301,225 A | 4/1994 | Suzuki et al. |
| 5,329,531 A | 7/1994 | Diepstraten et al. |
| 5,329,576 A | 7/1994 | Handforth |
| 5,331,634 A | 7/1994 | Fischer |
| 5,343,512 A | 8/1994 | Wang |
| 5,361,397 A | 11/1994 | Wright |
| 5,371,734 A | 12/1994 | Fischer |
| 5,371,898 A | 12/1994 | Grube et al. |
| 5,373,506 A | 12/1994 | Tayloe |
| 5,375,254 A | 12/1994 | Owen |
| 5,377,192 A | 12/1994 | Goodings et al. |
| 5,390,206 A | 2/1995 | Rein |
| 5,392,023 A | 2/1995 | D'Avello |
| 5,392,287 A | 2/1995 | Tiedemann, Jr. et al. |
| 5,394,436 A | 2/1995 | Meier et al. |
| 5,420,911 A | 5/1995 | Dahlin et al. |
| 5,425,051 A | 6/1995 | Mahany |
| 5,440,560 A | 8/1995 | Rypinski |
| 5,461,627 A | 10/1995 | Rypinski |
| 5,465,081 A | 11/1995 | Todd |
| 5,504,476 A | 4/1996 | Marrs et al. |
| 5,509,035 A | 4/1996 | Teidemann, Jr. et al. |
| 5,533,097 A | 7/1996 | Crane |
| 5,550,895 A | 8/1996 | Burson |
| 5,581,173 A | 12/1996 | Yalla et al. |
| 5,584,048 A | 12/1996 | Wieczorek |
| 5,590,346 A | 12/1996 | West et al. |
| 5,649,308 A | 7/1997 | Andrews |
| 5,680,311 A | 10/1997 | Trsar et al. |
| 5,696,468 A | 12/1997 | Nise |
| 5,708,680 A | 1/1998 | Gollnick et al. |
| 5,712,868 A | 1/1998 | Stern |
| 5,740,366 A | 4/1998 | Mahaney et al. |
| 5,745,523 A | 4/1998 | Dent et al. |
| 5,757,239 A | 5/1998 | Gilmore |
| 5,825,253 A | 10/1998 | Mathe et al. |
| 5,828,695 A | 10/1998 | Webb |
| 5,844,893 A | 12/1998 | Gollnick et al. |
| 5,910,752 A | 6/1999 | Filipovic et al. |
| 5,940,771 A | 8/1999 | Gollnick et al. |
| 6,046,992 A | 4/2000 | Meier et al. |
| 6,069,880 A | 5/2000 | Owen et al. |
| 6,348,841 B1 | 2/2002 | See |
| 6,359,872 B1 | 3/2002 | Mahany et al. |
| 6,374,311 B1 | 4/2002 | Mahany et al. |
| 6,522,871 B1 | 2/2003 | Patrick et al. |
| 6,583,675 B2 | 6/2003 | Gomez |
| 6,593,826 B2 | 7/2003 | See |
| 6,694,129 B2 | 2/2004 | Peterzell et al. |
| 6,714,983 B1 | 3/2004 | Koenck et al. |
| 6,731,146 B1 | 5/2004 | Gallardo |
| 6,764,983 B1 | 7/2004 | Hammond et al. |
| 6,819,197 B2 | 11/2004 | Maldanado |
| 6,823,033 B2 | 11/2004 | Fahim |
| 6,888,913 B2 | 5/2005 | Walker |
| 6,911,856 B2 | 6/2005 | Florescu |
| 6,928,275 B1 | 8/2005 | Patrick et al. |
| 6,937,872 B2 | 8/2005 | Krasner |

FOREIGN PATENT DOCUMENTS

| | | |
|---|---|---|
| EP | 0 490 441 A2 | 6/1992 |
| EP | 281334 | 1/1995 |

| | | |
|---|---|---|
| GB | 2250892 | 6/1992 |
| JP | 61-174743 | 8/1986 |
| JP | 62-37008 | 8/1994 |
| WO | WO 92/02084 | 2/1992 |
| WO | WO-9202084 | 2/1992 |

OTHER PUBLICATIONS

"A 1.6-3.2 GHz, High Phase Accuracy Quadrature Phase Locked Loop", Masters Thesis, Department Of Electrical Engineering And Computer Science, Mass. Inst. Of Technology, Jun. 2003.
Digital And Ericsson Agree On Data Network Project, Wall Street Journal, Oct. 8, 1991, p. B4.
"Messenger User Guide", Cognito Limited, Apr. 1991.
"Standards: Ericsson", Communications International 1991, Sep. 1991, p. 46.
Posthearing Brief Of The Commission Investigative Staff, United States International Trade Commission, Apr. 3, 2006.
Joifaei et al., "Concept Of On-Board-Processing Satellites", IEEE—ICUPC '92 Proceedings, Sep. 29, 1992-Oct. 2, 1992, pp. 391-394.
Seshadri et al., "Coded Modulation With Time Diversity, Unequal Error Protection, And Low Delay For The Rayleigh Fading Channel", IEEE—ICUPE '92 Proceedings, Sep. 29, 1992-Oct. 2, 1992, pp. 283-287.
Slimane et al., "Coded Quadrature Pulse-Overlapplng Modulation Techniques For Personal Communications", IEEE—ICUPC '92 Proceedings, Sep. 29, 1992-Oct. 2, 1992, pp. 293-297.
Wang, "Coded BER Performance In A Correlative Fading Channel", IEEE—ICUPC '92 Proceedings, Sep. 29, 1992-Oct. 2, 1992, pp. 126-130.
"Ericsson Wins Mobile Data Pact", Communications Week International, Jun. 26, 1989, No. 21, p. 13.
Rohl, A Short Look on Power Saving Mechanisms In the Wireless LAN Standard Draft IEEE Standard 802.11, Jun. 26, 1997, Bates No. QBB218363-368.
"Man-Machine Interface Of The Mobile Station", GSM 03.30 v. 3.9.0, Feb. 1992, QBB155113-155137.
"Waiting Time For Wireless", Computerworld, Oct. 15, 1990, pp. 73-75.
"Update On Ardis-Mobitex Radio Modem Competition", Newsbyte News Network, Oct. 2, 1991.
MS-BSS Interface—General Aspects And Principles, GSM 04.01 v 3.0.01, Feb. 1992, QBB155196-155206.
Network Functions, GSM 03.01 v 3.0.0, Feb. 1992, QBB155138-155152.
Robert Meier Deposition Transcript, Nov. 18, 2005.
Steven Koenck Deposition Transcript, Nov. 15, 2005.
Technical Manual Callmaster IMTS Series: MT-200 & MT-300, 1982.
Ericsson—Company Report: Svenska International PLC', Ericsson Company Report, Svenska International PLC, Investext Report No. 1152645, Nov. 15, 1991, p. 2.
CALHOUN, Wireless Access and the Local Telephone Network, 1992.
Respondent Qualcomm Incorporated's Notice Of Prior Art, with Exhibits A & D attached thereto, Nov. 15, 2005.
Qualcomm's Response To Interrogatory 3, with Exhibits B & C attached thereto, Nov. 15, 2005.
Intentionally Left Blank.
"A New Chapter In Wireless Communication And Email", Electronic Messaging News, Nov. 27, 1991, vol. 3, No. 24.
"AMDC Extends RFP Deadline To March 10; Waiver Decision Expected At FCC's March Meeting", Industrial Communications, Feb. 17, 1989, No. 7.
"An Effective Prioritization Scheme For Handovers In Cellular Networks", IEEE—ICUPC '92 Proceedings, Sep. 29, 1992-Oct. 2, 1992, pp. 364-368.
"Ardis Links With NCR Notepad Dec. 11, 1991", Newsbytes, Dec. 11, 1991.
"Ardis To Face Competition From RAM", Newsbytes, Feb. 5, 1991.
"Automation In WareHousing", Proceedings Of The 8th International Conference, Tokyo, Japan, Oct. 6-8, 1987, pp. 1-355.
"Autonomous Radio Stations Possible Over Mobitex", Industrial Communications, Dec. 9, 1988, No. 48.
"Bean Bullish On Growth Of Mobile Data In New Future", Industrial Communications, Feb. 15, 1991, No. 7, p. 8.
"Bellsouth Buys Into Ram's Nationwide Mobile Data Network", Industrial Communications, Oct. 18, 1991, No. 42.
"BellSouth Has Option To Buy RAM Oct. 11, 1991", Newsbytes, Oct. 11, 1991.
"BellSouth RAM In Joint Venture", BOC Week, Oct. 21, 1991, vol. 8, No. 40, p. 12.
"Bellsouth, RAM To Form Mobile Communications Joint Venture", PR Newswire, Oct. 10, 1991, p. 1.
Briefing Document For The Design Of The Diplema Messager MMI, Mar. 1989.
"Broadband Lan Technology", 1988.
"Canadian Cellular Industry (the)—Industry Report", First Marathon Securities Ltd. Industry Report, Oct. 25, 1991, Investext Report No. 1154903, p. 30.
"Cantel To Launch Mobile-Data And Paging Networks", The Gazette, Montreal Quebec, May 10, 1989, p. D1.
"CDMA Digital CAI Standard, Cellular System Dual-Mode Mobile Station-Base Station Compatability Standard, Draft Rev. 0", Jul. 31, 1990, Bates Nos. QBB138614-832.
"CDMA Digital CAI Standard, Cellular System Dual-Mode Mobile Station-Base Station Compatability Standard, Draft Rev. 1", Oct. 1, 1990, Bates Nos. QBB138833-9249.
"CDMA Digital CAI Standard, Cellular System Dual-Mode Mobile Station-Base Station Compatability Standard, Draft Rev. 1.1", Jul. 15, 1991, Bates Nos. QBB139250-858.
"Cellular System Dual-Mode Mobile Station—Base Station Compatibility Standard", EIA/TIA Interim Standard, May 1990, IS-54.
"Cellular System Mobile Station—Land Station Compatibility Specification", Office Of Science Technology Bulletin No. 53, Jul. 1983.
"Change Request 05.02-11", Recommendation GSM 05.02, v. 3.3.0, Jun. 22, 1989.
"Change Request 05.02-14", Recommendation GSM 05.02, v. 3.3.0, Nov. 28, 1989.
"Coded First To Jump On Mobitex Equipment Bandwagon; Sees Data Licenses As Worth As Much As Cellular", Industrial Communications, Jun. 9, 1989, No. 22.
"Communications Personals", Communications Daily, Feb. 11, 1991, vol. 11, No. 28.
"Complexity, High Price Keep Some Customers Away: Mobile Datacoms Taxes Users", Communications Week International, Apr. 1, 1991, p. 20.
"Consolidation, New Ventures Going Full Speed Ahead In All Markets", Industrial Communications, Oct. 6, 1989, No. 36, p. 1.
"Covering Note To Draft Rec. GSM 01.04 Version 2.00. 01—Vocabulary In A GSM PLMN", GSM 01.04 v. 2.00.01, Sep. 28, 1990.
"Cutting The Ties That Bind", InformationWeek, Apr. 1, 1991, vol. 314, pp. 25-30.
"DEC On Move: Teaming With Ericsson In Mobile Data Market", Communications Week International, Mar. 18, 1991, p. 1.
"DEC Targets Mobile Data Market", Communications Week International, Mar. 18, 1991, p. 9.
"Descriptive Air Interface Protocol", Cognito Group Limited, V. 6.0, Aug. 19, 1991.
"Discontinuous Reception (DRX) in the GSM System", Recommendation GSM 03.13, v 3.0.2, Jan. 15, 1990.
"Editorial: Telecom Trends", Newsbyte News Network, Dec. 24, 1991.
"Ericsson—Company Report First Boston Corporation (The)", Jun. 10, 1988, Investext Report No. 813838, p. 9.
"Ericsson—Company Report: Hoare Govett Investment Research Ltd", Oct. 1, 1990, Investext Report No. 1039045, p. 22.
"Ericsson—Company Report: Prudential Securities Inc.", Mar. 19, 1990, Investext Report No. 1001955, p. 10.
Ericsson—Company Report: Svenska International PLC', Ericsson Company Report, Svenska International PLC, Investext Report No. 1142535, Oct. 4, 1991, p. 2.

"Ericsson (L.M.) (Telefon A/B)—Company Report: FT Analysis", Ericsson (L.M.) (Telefon A/B) Company Report FT Analysis , Investext Report No. 6027183, Nov. 19, 1991, p. 3.
"Ericsson And Digital Cooperate On Mobile Communications", Newsbyte News Network Oct. 8, 1991, Newsbytes, Oct. 8, 1991.
"Ericsson And Digital Cooperated In Mobile Data", Business Wire, San Francisco, Oct. 7, 1991, p. 1.
"Ericsson And GE And Speedwing Mobile Communications Team Up To Bring Mobile Data Communications To Airports Worldwide", Business Wire, San Francisco, Sep. 17, 1991, p. 1.
"Ericsson And GE Have Formed Joint Venture", Communications Daily, Aug. 28, 1989.
"Ericsson Announces Communications Software", Industrial Communications, Mar. 1, 1991, No. 9.
"Ericsson GE And Melard Technologies Announce A Strategic Alliance In Mobile Data Communications", Business Wire, San Francisco, Sep. 30, 1991, p. 1.
"Ericsson GE And Racotek Announce A Strategic Relationship For Mobile Data Communications", Business Wire, San Francisco, Sep. 16, 1991, p. 1.
"Ericsson GE And Racotek Inc. In Marketing Supply Deal", Alliance Alert-Medical Health, vol. 2, No. 10, Oct. 1, 1991.
"Ericsson GE And Speedwing Mobile Commun In Marketing Supply Deal", Alliance Alert-Medical Health, Oct. 1991, vol. 2, No. 10.
"Ericsson GE Awarded $11.6 Million Contract From The U.S. Navy", Business Wire, San Francisco, Nov. 10, 1993, p. 1.
"Ericsson GE Awarded Contract From The City Of Richardson, Texas", Business Wire, San Francisco, Oct. 1, 1991, p. 1.
"Ericsson GE In Development Deal With Anterior And RIM", Newsbyte News Network, Nov. 20, 1991.
Ericsson GE In Joint Ventures To Develop Wireless E-Mail, Telecommunications Alert, Nov. 19, 1991, vol. 8, No. 38.
"Ericsson GE Mobile Communications New R&D Center Begins Operations In North Carolina", Business Wire, San Francisco, Nov. 27, 1990, p. 1.
"Ericsson GE Mobile Communications Opens Research And Development Center In North Carolina", Business Wire, San Francisco, May 1, 1990, p. 1.
"Ericsson GE Mobile Communications To manage Its Worldwide Cellular Telephone Business From RTP, N.C.", Business Wire, San Francisco, Apr. 24, 1991, p. 1.
"Ericsson GE Mobile Data And BRM Mobile Data Sign Agreements With GE Consumer Service", News Release, Jul. 25, 1991, p. 1.
"Ericsson GE Mobile Data And RAM Mobile Data Sign Agreements With GE Consumer Services", Business Wire, San Francisco, May 9, 1991, p. 1.
"Ericsson GE, Anterior Technology & Research In Motion (RIM)—Announce Wireless Access For E-Mail Users", News Release, Nov. 18, 1991, p. 1.
"Ericsson Gets $55M Pact for Cellular Radio Data Gear", Electronic News (1991), p. 19, Jun. 12, 1989.
"Ericsson Has Data Unit" Communications Week, Jan. 8, 1990, p. 8.
"Ericsson Mobile Data Formed In New Jersey", Communications Daily, Jan. 5, 1990.
"Ericsson Signs $55 Million Agreement With RAM Broadcasting For Mobile Data Network", Industrial Communicaitons, Jun. 2, 1989, No. 20.
"Ericsson To Introduce Radio Modem Next Month", Telecommunications Alert, Dec. 17, 1991, vol. 8, No. 56.
"Ericsson/GE Announces New Agreements", Industrial Communications, Oct. 4, 1991, No. 40.
"Ericsson: Breakthrough $55 Million Agreement For Mobile Data Network In U.S.A.", Edge, Jun. 12, 1989, vol. 4, No. 64.
"Ericsson's Mobitex Mobile Data System Is Chosen By Cantel For Nationwide Public Mobile Data Service In Canada", News Release, Ericsson (LM) Telephone, Dec. 1, 1988, p. 1.
"European Digital Cellular Telecommunications System (Phase 2), Discontinous Reception (DRX) In The GSM System", GSM 03.13, v. 4.0.1, Jul. 1, 1993.
"European Digital Cellular Telecommunications System (Phase 2), Functions Related To MS In Idle Mode", GSM 03.22, Version 4.4.0, Jun. 25, 1993.

"European Digital Cellular Telecommunications System (Phase 2), Mobile Stations (MS) Features", GSM 02.07, Oct. 1993.
"European Digital Cellular Telecommunications System (Phase 2), Mobile Stations Features", GSM 02.07, v. 4.4.1, Jun. 7, 1993.
"FCC Calendar Of Events For The Week Of February 11", FCC Daily Digest, Feb. 8, 1991, vol. 10, No. 27.
"IBM, Motorola Join Networks Forming 2-Way Data Offering", Industrial Communications, Feb. 2, 1990, No. 5, p. 1.
"Industry Briefs", Network World, Oct. 14, 1991, vol. 8, No. 41, pp. 9, 11.
Lead Story #2: Swedish Government Picks Magnovox AVL For Upcoming Trials, Inside IVHS, Feb. 4, 1991, vol. 1, No. 3.
"Man-Machine Interface Of The Mobile Station", Recommendation GSM 02.30, v 3.5.0, Mar. 1990.
"Mobidata And Cantel Set To Complete In Digital Mobile Data Market", Common Carrier Week, May 22, 1989, vol. 6, No. 21.
"Mobile Data Communications—A New Market", News Release, Jul. 3, 1987, p. 1.
"Mobile Data Communications: Erickson GE & Racotek In Strategic Relationship", Edge, Sep. 23, 1991, vol. 6, No. 165, p. 6.
"Mobile Data Communications: Ericsson GE & Racotek In Strategic Relationship", Edge, Sep. 23, 1991, vol. 2, No. 70, p. 21.
"Mobile Move", CommunicationsWeek International, Nov. 4, 1991, No. 73, p. 3.
"Mobile Station Features", Recommendation GSM 02.07, v. 3.4.0, Jan. 1991.
"Mobile Station Features", Recommendation GSM 02.07, v 3.3.0, Mar. 1990.
"Mobile Users Get Electronic Mail Link (Anterior Technology)", Communications International, Dec. 13, 1991, No. 1823, CGI1210016.
"MS-BSS Interface Date Link Layer Specification", Recommendation GSM 04.06, v. 3.6.0, Nov. 1990.
"MTEL WOOS FCC For Two-Way Data Net At 930-931 MHz", Industrial Communications, No. 47, Nov. 22, 1991.
"Multi-Channel Land Mobile Systems For Dispatch Traffic (With Or Without PSTN Interconnection)", ITU-R—International Telecommunication Union/ITU Radiocommunication Sector, 1990, Report No. 741-3, pp. 142-153.
"Multiplexing And Multiple Access On The Radio Path", GSM Recommendation 05.02, v. 3.4.1, Jan. 1990.
"National Car Rental Chooses RAM For Data Network Services", Industrial Communications, VIS24, Jun. 14, 1991.
"National Mobile Data Network Sends Out Request For Information; Dream System In Mind Already", Industrial Communications, Oct. 21, 1988.
"Noise-Free Data Nets Introduced", Telecommunications Alert, Jul. 1990, vol. 8, No. 7.
"Nokia—Line Of Business Classification", Annual Report, 1987.
"Nordic Monthly—Geographic Report: Svenska International PLC", Oct. 1, 1991, Investext Report No. 1142734, p. 6.
" Northern Indiana Public Service Company Selects $10 Million Ericsson GE Communications System", News Release, Nov. 11, 1991, p. 1.
"Other Manufactures Developing Compatible Hardware", Industrial Communications, Dec. 9, 1988, No. 48.
"Outline Of Idle Mode Tasks, GSM Recommendation" 03.22, v. 1.0.1, May 23, 1991.
"Physical Layer On The Radio Path: General Description", Change Request 05.02-2, Recommendation GSM 05.01, v. 3.3.0, Nov. 17, 1989.
"Programme Management Review, GSM Action Plan, Review 18" ETSI/GSM 23, Jun. 5, 1989.
"Programme Management Review; GSM Action Plan, Review 18", GSM 243/89, Jun. 5, 1989.
"Proposed EAI,TIA Standard, Cellular System CDMA-Analog Dual-Mode Mobile Station—Base Station Compatibility Standard, Rev. 1.12", Mar. 16, 1992.
"Proposed EAI,TIA Standard, Cellular System CDMA-Analog Dual-Mode Mobile Station—Base Station Compatibility Standard, Rev. 1.13", Mar. 23, 1992.

"Proposed EIA/TIA Interim Standard, Wideband Spread Spectrum Digital Cellular System Dual-Mode Mobile Station—Base Station Compatibility Standard", EIA/TIA/IS-95, Apr. 21, 1992.

"Radio-Linked Network To Be Offered To Airlines Sep. 19, 1991", Newsbytes, Inc., Sep. 19, 1991.

"RAM Adds Customers To Mobile Data Network", Industrial Communications, Apr. 5, 1991, No. 14.

"RAM Mobile Data And Ericsson GE Mobile Data Announce Agreements With Sears Business Centers", News Release, Mar. 26, 1991, p. 1.

"RAM Mobile Data Launches Network With Transcontinental Message", News Release, Feb. 20, 1991, p. 1.

"Ram Signs GE Consumer Service To A Pilot Test On its Data Network", Industrial Communications, May 10, 1991, No. 19.

"Sales Decline: Ericsson 9-Month Net Off 53%", Electronic News, 1991, vol. 37, Issue 18.

"Sears Business Centers To Market RAM's Mobile Data Network", Industrial Communications, Mar. 29, 1991, No. 13.

"Sears Inks Pacts With Ericsson, RAM Mobile Data", Computer Reseller News, Apr. 29, 1991, 102, Issue 418, p. 1-2.

"Security Related Network Functions", Recommendation GSM 3.20, v. 3.3.2, Jan. 1991.

"Service", Industrial Communications, Dec. 9, 1988, No. 48.

"SIM, Functional Characteristics", Recommendation GSM 02.17, v. 3.2.0, Mar. 1990.

"Simware And Ram Mobile Date Network Sign Strategic Marketing Agreement", News Release, Oct. 7, 1991, p. 1.

"Smith Barney's Morning Call—Topical Report Smith Barney, Harris Upham & Co.", Investext Report, No. 1145237, Oct. 11, 1991, p. 3.

"Strategic Agreement: Simware & Ericsson GE In Strategic Marketing Agreement For Laptop Computer Access To Corporate Mainframes", Edge, Oct. 21, 1991, vol. 6, No. 169, p. 17.

"Supporting Research And Advanced Development", NASA Space Programs Summary 37-48, vol. III, Jet Propulsion Laboratory, Dec. 31, 1967, pp. 1-291.

"Sweden Launches The World's First Public Radio Telecommunication Network For Text, Speech And Data", Newswire, Trade Publication, Industrial News Service, Feb. 24, 1987.

"Swedish Road Adminstration To Try Out Vehicle Location System", Industrial Communications Trade Publication, Apr. 5, 1991, No. 14.

"Swedish Telecom Mobitex System Eases Mobile Frequency Congestion", Communications News, Apr. 1985, vol. 22, No. 4, p. 135.

"The Messenger MMI Specification", Mar. 1990.

"The Mobitex Packet-Switched Radio Date System", IEEE, Jul. 1992, pp. 534-538.

"The OSPF Specification", Oct. 1989.

"Third-Quarter Losses Prompt Sizable Ericsson Layoffs", Industrial Communications, Nov. 22, 1991, No. 47.

Devasirvatham et al., "Two Frequency Radiowave Propagation Measurements In Brooklyn", IEEE—ICUPC '92 Proceedings, Sep. 29, 1992-Oct. 2, 1992, pp. 23-27.

"U.K. Mobile Data Licenses Granted", Communications Week International, Feb. 26, 1990, No. 36, p. 18.

"U.S. Army Selects Digitally Accessed Trunked Communications System For Training Centers", News Release, Oct. 1, 1991, p. 1.

"Update On Ardis-Mobitex Radio Modem Competition", Newsbytes, Inc., Oct. 2, 1991.

XIA et al., "Urban And Suburban Microcellular Propagation", IEEE—ICUPC '92 Proceedings, Sep. 29, 1992-Oct. 2, 1992, pp. 5-9.

"Vandals Wreck Cardphones To Increase Booty From Payphones", Europe 2000—Communications & Information Technology, Sep. 1991, vol. 3, No. 7.

"Vehicle Tracking And Communication Joint Venture", PRS Automotive Service, Aug. 22, 1991.

"Why Did Ericsson Pick Up The Long-For-Sale GE Subsidiary?", Mobile Phone News, Aug. 31, 1989, vol. 7, No. 18.

"Wireless Data: The Next Frontier For Cellular", Mobile Phone News, Dec. 5, 1991, vol. 9, No. 24, pp. 4-6.

"Wireless World: Ericsson GE Enters Lockdown Matrix With Mobile Digital Telephone", Business Wire, San Francisco, Oct. 7, 1991, p. 1.

"Wireless World: Ericsson GE In Lockdown Matrix With Mobile Digital Telephone", Edge, Oct. 7, 1991, vol. 6, No. 167, p. 29.

"Wireless World: Ericsson GE, Anterior Technology & Research In Motion Announced Wireless Access For E-Mail Users", Business Wire, San Francisco, Nov. 18, 1991, p. 1.

"Wireless World: Ericsson GE, Anterior Technology & Research In Motion (RIM) Announce Wireless E-mail", Edge, Nov. 25, 1991, vol. 6, No. 174, p. 4.

"Year's Biggest Stories Land In Personal Communications, Spectrum (Part 1)" Industrial Communications, Jan. 4, 1991, No. 1.

Abowd et al., "Cyberguide: A Mobile Context-Aware Tour Guide", Wireless Networks, 1997, vol. 3, pp. 421-433.

Afek et al., "End-To-End Communication In Unreliable Networks", Proceedings Of The 7th Annual ACM Symposium On Principles Of Distributed Computing (Toronto, Ontario, Canada), 1988, pp. 131-148.

Aguirre et al., "Signal Strength Measurements At 915 MHz and 1920 MHz In An October Microcell Environment", IEEE—ICUPC '92 Proceedings, Sep. 29, 1992-Oct. 2, 1992, pp. 16-22.

Olmos et al., "Performance Analysis Of A Second Order Delay-Lock Loop With Application To A CDMA System With Multipath Propagation", IEEE—ICUPC '92 Proceedings, Sep. 29, 1992-Oct. 2, 1992, pp. 209-213.

Akaiwa et al., "The Channel Segregation, A Self-Organized Dynamic Channel Allocation Method: Application to TDWA/FDMA Microcellular System", IEEE—ICUPC '92 Proceedings, Sep. 29, 1992-Oct. 2, 1992, pp. 345-349.

Alfano et al., "UPT Supplementary Services European Standards Scenario", IEEE—ICUPC '92 Proceedings, Sep. 29, 1992-Oct. 2, 1992, pp. 69-73.

Ameden, "Activities Of The Cellular Telecommunications Industry Association Microcell/Microsystems Subcommittee Regarding Microcell Technology", IEEE—ICUPC '92 Proceedings, Sep. 29, 1992-Oct. 2, 1992, pp. 147-150.

Aoki, "Improved Output Spectrum Of Linearized Class-F Power Amplifier For Digital Cellular Mobile Communications", IEEE—ICUPC '92 Proceedings, Sep. 29, 1992-Oct. 2, 1992, pp. 195-198.

Arndt et al., "International Standards On Universal Personal Telecommunications: State Of The Art And Future Projections", IEEE—ICUPC '92 Proceedings, Sep. 29, 1992-Oct. 2, 1992, pp. 59-63.

Assarsson, "Technology, Know-How And Teamwork—The Vital Circle In A Ro-Ro Port", Report No. 0-904930-27-0, 1984, pp. 138-142.

Badrinath et al., "Designing Distributed Algorithms For Mobile Computing Networks", Proceedings Of The Second Workshop On The Management Of Replicated Data Rutgers University, 1994, pp. 1-13.

Badrinath et al., "To Send Or Not To Send: Implementing Deferred Transmission In Mobile Host", ICDCS, Hong Kong, Jun. 1996, pp. 1-7.

Balakrishnan et al., "Improving Reliable Transport And Handoff Performance In Cellular Wireless Networks", Wireless Networks, 1995, vol. 1, pp. 469-481.

Bart, "Vendors Join The Wireless Bandwagon", Communications International, Oct. 1991, vol. 18, No. 19, p. 25.

Bartoli, "Group-Based Multicast And Dynamic Membership In Wireless Networks With Incomplete Spatial Coverage", Mobile Networks And Applications 3, 1998, pp. 175-188.

Bean,"Paging At The Crossroads—Industry Report", Arthur D. Little Decision Resources, Inc., Jun. 27, 1990, Investext Report No. 1111592, pp. 5-6.

Bedingfield, "On The Concept Of A Service Host For Personal Communications Services", IEEE—ICUPC '92 Proceedings, Sep. 29, 1992-Oct. 2, 1992, IEEE—ICUPC '92 Proceedings, Sep. 29, 1992-Oct. 2, 1992, pp. 314-318.

Berkman, "Ericsson Is Restructuring To Adapt To A Deregulated Global Market", Electronic Business, Jan. 21, 1991, vol. 17, No. 2, pp. 34-38.

Berntson, "Mobitex—A New Network For Mobile Data Communications", Ericsson Review, 1989, vol. 66, Issue 1, p. 33, Bates Nos. QBB151463-151469.

Biba, "A Hybrid Wireless MAC Protocol Supporting Asynchronous And Synchronous MSDU Delivery Services", IEEE 802.11/91-92, Sep. 1991.
Binkley et al., "Authenticated Ad Hoc Routing At The Link Layer For Mobile Systems", Wireless Networks, 2001, vol. 7.
Blankenhorn, PacTel Cellular Introduces Microcells In Los Angeles, Newsbytes, Inc., Oct. 2, 1991.
Blazević et al., "Self-Organizing Wide-Area Routing", Proc. Of SCI, 2000, pp. 1-8.
Boyer, "An Analytical Comparison Of Block Error Rate Performance For Wireline Data Modulation Standards In A Variably Fading Ricean Analog Cellular Channel", IEEE—ICUPC '92 Proceedings, Sep. 29, 1992-Oct. 2, 1992, pp. 121-125.
Bragwad et al., "Advanced Intelligent Network Requirements For Personal Communications Services", IEEE—ICUPC '92 Proceedings, Sep. 29, 1992-Oct. 2, 1992, pp. 324-328.
Brodsky, "Wireless Data Networks And The Mobile Workforce", Telecommunications, Dec. 1990, vol. 24, No. 12, p. 31.
Brodsky, "Wireless MANs/WANs Offer 'Data To Go'", Business Communications Review Feb. 1991, vol. 21, No. 2, p. 45-51.
Buck, "Tele-Trends—Industry Report, Donaldson, Lufkin & Jenrette Securities Corp.", Jun. 24, 1988, Investext Report No. 814739, p. 8.
Bulusu et al., "Scalable coordination For Wireless Sensor Networks: Self-Configuring Localization Systems", Proceedings Of The 6th International Symposium On Communication Theory And Applications (ISCTA), Jul. 2001, pp. 1-6.
Bushaus, "GE, Ericsson In Cellular Pact", Telephony's AM Report, Aug. 28, 1989, vol. 217, No. 10, p. 3.
Cáceres et al., Fast And Scalable Wireless Handoffs In Support Of Mobile Internet Audio, Mobile Networks And Applications 3, 1998, pp. 351-363.
Cáceres et al., "The Effects Of Mobility On Reliable Transport Protocols", International Conference On Distributed Computing Systems, Nov. 1, 1993.
Cáceres et al., "Inproving The Performance Of Reliable Transport Protocols In Mobile Computing Environments", IEEE Journal On Selected Areas In Communications, Jun. 1995, vol. 13, No. 5, pp. 1-10.
Calhoun, "Digital Cellular Radio", 1988.
Callendar, "Standards For Global Personal Communications Services", IEEE—ICUPC '92 Proceedings, Sep. 29, 1992-Oct. 2, 1992, pp. 163-167.
Campbell et al., "A Cellular IP Testbed Demonstrator", Center For Telecommunications Research, Columbia University, New York, 1999, pp. 1-4.
Carpintero et al., "Requirements For The Interconnection Of Base Stations In A Wireless System", IEEE—ICUPC '92 Proceedings, Sep. 29, 1992-Oct. 2, 1992, pp. 141-146.
Cellular Data Network Functional Specification Rev. 2.0.2, Oct. 5, 1992.
Cellular Digital Packet Data System Specification Overview, Jan. 19, 1995.
Cellular Digital Packet Data System Specification Preliminary Release 0.8—Book 1, Mar. 19, 1993.
Cellular Digital Packet Data System Specification Preliminary Release 0.8—Book II, Mar. 19, 1993.
Cellular Digital Packet Data System Specification Preliminary Release 0.8—Book III, Mar. 19, 1993.
Cellular Digital Packet Data System Specification Release 0.3 Preliminary Working Draft, Dec. 28, 1992.
Cellular Digital Packet Data System Specification Release 0.8—Book 4IV, Mar. 19, 1993.
Cellular Digital Packet Data System Specification Release 0.8—Book V, Mar. 19, 1993.
Cellular Digital Packet Data System Specification Release 0.9—Preliminary Draft, N/A, Apr. 30, 1993.
Cellular Digital Packet Data System Specification Release 1.0—Book II, Jul. 19, 1993.
Cellular Digital Packet Data System Specification Release 1.0—Book III, Jul. 19, 1993.
Cellular Digital Packet Data System Specification Release 1.0—Book IV, Jul. 19, 1993.
Cellular Digital Packet Data System Specification Release 1.0—Book V, Jul. 19, 1993.
Cellular Digital Packet Data System Specification Release 1.0—Book I, Jul. 19, 1993.
Cellular Digital Packet Data System Specification Release 1.1—Book 2, 1995 CDPD Forum, Inc., Jan. 19, 1995.
Cellular Digital Packet Data System Specification Release 1.1—Book 3, 1995 CDPD Forum, Inc., Jan. 19, 1995.
Cellular Digital Packet Data System Specification Release 1.1—Book 4, 1995 CDPD Forum, Inc., Jan. 19, 1995.
Cellular Digital Packet Data System Specification Release 1.1—Book 6, 1995 CDPD Forum, Inc., Jan. 19, 1995.
Cellular Digital Packet Data System Specification Release 1.1—Book 7, 1995 CDPD Forum, Inc., Jan. 19, 1995.
Cellular Digital Packet Data System Specification Release 1.1—Book 8, 1995 CDPD Forum, Inc., Jan. 19, 1995.
Chang, "Dispersive Fading Effects In CDMA Radio Systems", IEEE—ICUPC '92 Proceedings, Sep. 29, 1992-Oct. 2, 1992, pp. 185-189.
Change Request to Specification GSM 02.11 Service Accessibility GSM 02.11, v 4.4.0, Feb. 11, 1993.
Chen et al., "Signaling System No. 7 Network Interconnect Impacts In Support Of Mobile Communications Services", IEEE—ICUPC '92 Proceedings, Sep. 29, 1992-Oct. 2, 1992, pp. 247-252.
Chuang, "Frequency Reuse For Two Co-Existing TDMA Personal Communications Systems", IEEE—ICUPC '92 Proceedings, Sep. 29, 1992-Oct. 2, 1992, pp. 350-354.
Ciancetta et al., "Universal Personal Telecommunication Provision Within Intelligent Networks", IEEE—ICUPC '92 Proceedings, Sep. 29, 1992-Oct. 2, 1992, pp. 319-323.
Connolly, "Mobile Data Mission", Communications, Aug. 1990, vol. 27, No. 8, pp. 41-48.
Coursey, Mobile Computing Matures: Radio Modems Will Let Portables Send, Receive E-Mail, InfoWorld, 1991, vol. 13, Issue 51, p. 28.
Craninckx et al., "Wireless CMOS Frequency Synthesizer Design", 1998.
Cunningham, "Rascal Telecom—Company Report Scrimgeour Vickers", Feb. 17, 1989, Investext Report No. 908246, p. 4.
Davis et al., "Filtered Spreading Sequences For Interference Avoidance", IEEE—ICUPC '92 Proceedings, Sep. 29, 1992-Oct. 2, 1992, pp. 54-58.
Didner, "Data Goes Mobile", Telephony, Mar. 11, 1991, vol. 220, No. 10, pp. 24-25.
Didner, "The Next Step In Mobile Communications", Telecommunications, Dec. 1990, vol. 24, No. 12, p. 48-50.
Dommety et al., "Flat Location Management Scheme For PCNs", 1997.
Dube et al., "Signal Stability Based Adaptive Routing (SSA) For Ad-Hoc Mobile Networks", IEEE Personal Communication, Aug. 26, 1996, pp. 1-22.
Duet, "An Assessment Of Duplexing Methods For The Radio Links Of Personal Communication Systems", IEEE—ICUPC '92 Proceedings, Sep. 29, 1992-Oct. 2, 1992, pp. 131-135.
Earnshaw, "The Topology Discovery Service", Feb. 18, 1993, pp. 11 1-11 8.
Edwards, "Simware Targets Software AT RF Wireless Market", Computing Canada, Nov. 7, 1991, vol. 17, No. 23, p. 53.
Egan et al., "City Of Dallas Fire Department Purchases $4 Million Ericsson GE Communications System", Business Wire, San Francisco, Oct. 16, 1991.
Egan et al., "Ericsson And GE Form Mobile Communications Joint Venture", Business Wire, San Francisco, Aug. 24, 1989, p. 1.
Egan et al., "McCaw Cellular, LIN Broadcasting To Rebuild Cellular Systems in N.Y., N.J. Pacific Northwest With Ericsson GE Equipment", Business Wire, San Francisco, Oct. 3, 1990, p. 1.
Egan et al., "SaskTel Purchases New Ericsson GE Communications System To Serve Saskatchewan", Business Wire, San Francisco, Oct. 23, 1991, p. 1.
Egan, "Ericsson Signs Breakthrough Agreement For Mobile Data Network", Business Wire, San Francisco, May 31, 1989, p. 1.
Elson et al., "Fine-Grained Network Time Synchronization Using Reference Broadcasts", May 17, 2002, pp. 1-14.

Eng et al., "A Wireless Broadband Ad-Hoc ATM Local-Area Network", Wireless Networks 1, 1995, pp. 161-174.

Ergen et al., "MEWLANA-Mobile IP Enriched Wireless Local Area Network Architecture", Proc. Of IEEE Vehicular Technology Conference (Vancouver), Mar. 2002, vol. 4, pp. 2449-2453.

Fenner, Mobil Address Management And Billing For Personal Communications, IEEE—ICUPC '92 Proceedings, Sep. 29, 1992-Oct. 2, 1992, pp. 253-257.

Foyil, "Nokia—Company Report: UBS Phillips & Drew Global Research Group", Oct. 8, 1990, Investext Report No. 1034219, p. 2.

Frangini, "Rogers Cantel Lauches 'Public Access' Mobile Network", Computing Canada, Jun. 7, 1990, vol. 16, No. 12, p. 53.

Fraser, "The Mobitex Terminal Specification", Communications, Jul. 1991, vol. 28, No. 7, pp. 33-38.

Fraser, "The MTS—Part II", Communications, Aug. 1991, vol. 28, No. 8, pp. 52-55.

Fudge, "Third Generation Mobile Systems—What They Will Do And Who Decide", IEEE—ICUPC '92 Proceedings, Sep. 29, 1992-Oct. 2, 1992, pp. 433-442.

Gates, "Computers Enter The Wireless Age: New Technology Can Link Terminals Spanning Globe", Financial Post, Jun. 8, 1991, p. 13.

Ghassemian, "Evaluation Of Different Handoff Schemes For Cellular IP", Master's Thesis, Kings College, London, 2001.

Goldberg, "Systems Engineering And Program Management For Personal Communications In T1P1", IEEE—ICUPC '92 Proceedings, Sep. 29, 1992-Oct. 2, 1992, pp. 151-157.

Goodman, "Cellular Packet Communications", IEEE Transactions On Communications, Aug. 1990, vol. 38, No. 8.

Haber, "The Art Of Wireless Computing", Midrange Systems, Aug. 6, 1991, vol. 4, No. 16, p. 66.

Hasselberg, "Mobitex Permits Tailored Telecom", Tele (English Edition), No. 2., 1988, vol. XXXXI, pp. 14-16.

Haug et al., "Microcellular Radio Performance In A Rayleigh/Rician CoChannel Interference Environment", IEEE—ICUPC '92 Proceedings, Sep. 29, 1992-Oct. 2, 1992, pp. 112-115.

Hayes et al., "Personal Satellite Communications Utilizing The KA-Band", IEEE—ICUPC '92 Proceedings, Sep. 29, 1992-Oct. 2, 1992, pp. 385-390.

Hightower et al., "Design And Calibration Of The SpotON Ad-Hac Location Sensing System", Aug. 2001, pp. 1-18.

Hirschman, "Service Mobility/Transparency For Personal Communications", IEEE—ICUPC '92 Proceedings, Sep. 29, 1992-Oct. 2, 1992, pp. 334-338.

Ho, "Effects Of Antenna Polarization And Beam Pattern On Multipath Delay Spread And Path Loss In Indoor Obstructed Wireless Channels", IEEE—ICUPC '92 Proceedings, Sep. 29, 1992-Oct. 2, 1992, pp. 92-96.

Hodes et al., "Composable Ad-Hoc Location-Based Services For Heterogeneous Mobile Clients", Wireless Networks, 1989, vol. 5, pp. 411-427.

Honcharenk et al., "Theoretical Prediction Of UHF Propagation Within Office Buildings", IEEE—ICUPC '92 Proceedings, Sep. 29, 1992-Oct. 2, 1992, pp. 102-105.

Huang et al., "OPNET Simulation Of A Multi-Hop Self-Organizing Wireless Sensor Network", Florida Communication Research Labs, Motorola Labs, Fort Lauderdale, FL 33322, 2002.

Hunt, "The Regulatory Environment For Personal Communications In The Post-WARC-92 Period", IEEE—ICUPC '92 Proceedings, Sep. 29, 1992-Oct. 2, 1992, pp. 429-432.

Ioannidis et al., "IP-Based Protocols For Mobile Internetworking", Proceedings Of Conference On Communications Architecture & Protocols, 1991, pp. 1-17.

Jain, "Characteristics Of Destination Address Locality In Computer Networks: A Comparison Of Caching Schemes", Jun. 25, 1990.

Jakobs et al., "Electronic Mail In Broadcast Networks", IEEE—ICUPC '92 Proceedings, Sep. 29, 1992-Oct. 2, 1992, pp. 412-416.

Jalali et al., "Performance Of Data Protocols For In-Building Wireless Systems", IEEE—ICUPC '92 Proceedings, Sep. 29, 1992-Oct. 2, 1992, pp. 407-411.

Jetcheva et al., "Adaptive Demand-Driven Multicast Routing In Multi-Hop Wireless Ad Hoc Networks", Proceedings Of The 2nd ACM International Symposium On Mobile Ad-Hoc Networking & Computing (Long Beach Session: Routing And Transport), 2001, pp. 33-44.

Johansson et al., "Scenario-Based Performance Analysis Of Routing Protocols For Mobile Ad-Hoc Networks", Proceedings Of The 5th Annual ACM/IEEE International Conference On Mobile Computing And Networking (Seattle), 1999, pp. 195-206.

Johansson, "The Mobitex Experience", Paper Presented At International Mobile Communications (London 1990), Jun. 1990, pp. 55-68.

Jung et al., "A Power Saving MAC Protocol For Wireless Networks", Department Of Computer Science, Texas A&M University, Technical Report, Jul. 2002.

Jung et al., "An Energy Efficient MAC Protocol For Wireless LAN's", Department Of Computer Science, Texas A&M University, Technical Report TR01-017, Jul. 31, 2001.

Kaplan, "The Network In Your Pocket", Business Communications Review, Mar. 1991, vol. 21, No. 3, p. 112.

Karp et al., "GPSR: Greedy Perimeter Stateless Routing For Wireless Networks", Proceedings Of The 6th Annual International Conference On Mobile Computing And Networking (Boston), 2000, pp. 243-254.

Karp, "Geographic Routing For Wireless Networks", PhD Thesis, Harvard University, Oct. 2000.

Katz, "The Use Of Connectionless Network Layer Protocols Over FDDI Networks," ACM SIGCOMM Computer Communication Review, vol. 20(3), 1990, pp. 32-45.

Kay, "Extended-TDMA™ A High Capacity Evolution of U.S. Digital Cellular", IEEE—ICUPC '92 Proceedings, Sep. 29, 1992-Oct. 2, 1992, pp. 182-184.

Kearns, "Scope Of ZENworks 7 Suite Stretches Far And Wide", Network World, (http://www.networkworld.com\newsletters\netware\2005\0829nw1.html), Aug. 30, 2005.

Khandani et al., "ISI-Reduced Modulation Over A Fading Multipath Channel", IEEE—ICUPC '92 Proceedings, Sep. 29, 1992-Oct. 2, 1992, IEEE—ICUPC '92 Proceedings, Sep. 29, 1992-Oct. 2, 1992, pp. 288-292.

Kiang, "Characteristics Of Two-Alternative Frequency Channel Assignment Methods For TDMA Wireless Access Systems", IEEE—ICUPC '92 Proceedings, Sep. 29, 1992-Oct. 2, 1992, pp. 355-358.

Kiang, "Geometrical Ray Tracing Approach For Indoor Wave Propagation In A Corridor", IEEE—ICUPC '92 Proceedings, Sep. 29, 1992-Oct. 2, 1992, pp. 106-111.

Kikuta, "Global UPT Architecture With International Mobility Management", IEEE—ICUPC '92 Proceedings, Sep. 29, 1992-Oct. 2, 1992, pp. 229-235.

Kilpatrick, "Mobile Packet-Switched Data Networks", RF Expo East, Orlando, FL, Oct. 29, 1991-Oct. 31, 1991, pp. 367-369.

Kleeman, "Optimal Estimation Of Position And Heading For Mobile Robots Using Ultrasonic Beacons And Dead-Reckoning", Proceedings Of The 1992 IEEE International Conference On Robotics And Automation (Nice, France), 1992.

Krashinsky et al., "Minimizing Energy For Wireless Web Access With Bounded Slowdown", 2002, Proc. ACM Mobicon 02:119-130.

Krechmer, "A Review Of US Mobile Communications Standards", Telecommunications, Jul. 1991, vol. 25, No. 7, p. 43-45.

Kriz et al., "Spread Spectrum Indoor Video Transmission", IEEE—ICUPC '92 Proceedings, Sep. 29, 1992-Oct. 2, 1992, pp. 421-425.

Ku, "The Outlook Of DCS 1800 For Personal Communications Networks", IEEE—ICUPC '92 Proceedings, Sep. 29, 1992-Oct. 2, 1992, pp. 168-171.

Kubo et al., "Simulated Tolerance Of Loop Parameters Of Cartesian Feedback Amplifier For $\pi/4$—Shifted QPSK Transmitter", IEEE—ICUPC '92 Proceedings, Sep. 29, 1992-Oct. 2, 1992, pp. 136-140.

Kumar, "Antennas For MSAT Ground Terminals", IEEE—ICUPC '92 Proceedings, Sep. 29, 1992-Oct. 2, 1992, pp. 219-223.

Kwok, "Wireless Networking Requirements Of Multimedia Applications", IEEE—ICUPC '92 Proceedings, Sep. 29, 1992-Oct. 2, 1992, pp. 402-406.

Lambert, "Security For Universal Personal Communications", IEEE—ICUPC '92 Proceedings, Sep. 29, 1992-Oct. 2, 1992, pp. 44-48.

Larsen, "Marketing Mobile Data Services And Equipment", Proceedings Of Cellular & Mobile Communications 88, Nov. 1988, pp. 111-116.

Larsen, "Mobitex—A System For Mobile Data Communication", Information Network And Data Communication, III, Proceedings Of The IFIP TC6 International Conference On Information Network And Data Communication, Lillehammer, Norway, Mar. 1990, pp. 239-247.

Larsen, "Mobitex—Public Mobile Radio Service", Communications International, Oct. 1986, vol. 13, Pt. 10, p. 96.

Lau et al., "Interworking Of Satellite And Terrestrial Networks For Land Mobile Communications", IEEE—ICUPC '92 Proceedings, Sep. 29, 1992-Oct. 2, 1992, pp. 375-379.

Laval et al., "Cognito Network Overview", Cognito Group Limited, Sep. 19, 1990.

Laval, "Briefing Documetn For A Brochure On The Cognito Mobile Messaging Service", Cognito Group Limited, May 22, 1990.

Lawson-Jenkins, "The Role of GSM In The Development Of Standards For A Worldwide Personal Communication Network", IEEE—ICUPC '92 Proceedings, Sep. 29, 1992-Oct. 2, 1992, pp. 79-81.

Leibowitz et al., "Rogers Cantel Mobile Communications Inc.—Company Report", Donaldson, Lufkin & Jenrette Securities, Investext Report No. 1145153, Oct. 15, 1991.

Lin et al., "A Two-Stage Maximum Likelihood Sequence Estimation Technique And Its Application To Data Transmission Protocol In Digital Cellular Radio", IEEE—ICUPC '92 Proceedings, Sep. 29, 1992-Oct. 2, 1992, pp. 303-307.

Linnartz et al., "Performance Of Personal Communication Networks With Error Correction Coding In Microcellular Channels", IEEE—ICUPC '92 Proceedings, Sep. 29, 1992-Oct. 2, 1992, pp. 308-313.

Lo et al., "An Estimate Of Network Database Transaction Volume To Support Personal Communications Services", IEEE—ICUPC '92 Proceedings, Sep. 29, 1992-Oct. 2, 1992, pp. 236-241.

Ioannidis et al., "The Design And Implementation Of A Mobile Internetworking Architecture", 1993 Winter USENIX, San Diego, CA, Jan. 25, 1993-Jan. 29, 1993, pp. 489-500.

Loberg et al., "The New Swedish Cellular Mobile Radio Service", International Conference On Radio Receivers & Associated Systems (4th: 1986), 1986, Pub. No. 68, pp. 77-82.

Loberg et al., "Mobitex Brings A New Look To Dispatch Communications", Communications International, Feb. 1985, vol. 12, No. 2, pp. 25-32.

Long et al., "Rapid Prototyping Of Mobile Context-Aware Applications: The Cyberguide Study", Proceedings Of The 2nd Annual International Conference On Mobile Computing And Networking, (Rye, NY), 1996.

Loudermilk, "Trio Throws Weight Behind Radio E-Mail Technology", PC Week, Dec. 2, 1991, vol. 8, No. 48, p. 39.

Lusa, "The ITU's Quadrennial Telecom Show In Geneva Attracts And Dazzles Thousands", Networking Management, Dec. 1991, vol. 9, No. 14, pp. 12-14.

Lycksell, "Mobitex: A New Radio Communication System For Dispatch Traffic", Tele (English Edition), 1983, vol. 35, Issue 1, pp. 68-75.

Madhow, "Minimum Mean Squared Error Interference Suppression For Direct-Sequence Spread-Spectrum Code-Division Multiple-Access", IEEE—ICUPC '92 Proceedings, Sep. 29, 1992-Oct. 2, 1992, pp. 273-277.

Malyan et al., "A Wireless Personal Communications Architecture For Urban Areas", IEEE—ICUPC '92 Proceedings, Sep. 29, 1992-Oct. 2, 1992, pp. 116-120.

Mandell et al., "A Comparison Of CDMA And Frequency Hopping In A Cellular Environment", IEEE—ICUPC '92 Proceedings, Sep. 29, 1992-Oct. 2, 1992, pp. 172-176.

Maric et al., "Microcell Planning And Channel Allocation For Manhattan Street Environments", IEEE—ICUPC '92 Proceedings, Sep. 29, 1992-Oct. 2, 1992, pp. 359-363.

Mathy et al., "An Overlay Tree Building Protocol", J. Crowcroft And M. Hoffman (Eds.) Springer-Verlag Berlin Heidelberg, 2001, pp. 76-87.

McIlwain et al., "Routing Technology Software Inc. And Ericsson GE Team Up To Provide 'Roadshow' Routing Application To Mobitex Networks Worldwide", Business Wire, San Francisco, Jun. 6, 1991, p. 1.

"Mobile Radio Interface Layer 3 Specification", Recommendation GSM 04.08, v. 3.3.1, Apr. 1989.

Mokhtar et al., "Capacity For Cellular CDMA PCS's In Nakagami Fading Log-Normal Shadowing Channels", IEEE—ICUPC '92 Proceedings, Sep. 29, 1992-Oct. 2, 1992, pp. 190-194.

Morrison et al., "Statistical Analysis And Autoregressive Modeling Of The Indoor Radio Propagation Channel", IEEE—ICUPC '92 Proceedings, Sep. 29, 1992-Oct. 2, 1992, pp. 97-101.

Mulqueen, "Mobile Data Network Debuts", Data Communications, Jan. 1991, p. 78.

Murphy et al., "UPT: Mobility vs. Portability", IEEE—ICUPC '92 Proceedings, Sep. 29, 1992-Oct. 2, 1992, pp. 224-228.

Murthy et al., "A Routing Protocol For Packet Radio Networks", Proceedings Of The 1st Annual International Conference On Mobile Computing And Networking (Berkeley), 1995, pp. 86-95.

Murthy et al., "An Efficient Routing Protocol For Wireless Networks", Mobile Networks And Applications 1, 1996, pp. 183-197.

Nakajima et al., "Intelligent Network Architecture For Personal Mobile Telecommunication", IEEE—ICUPC '92 Proceedings, Sep. 29, 1992-Oct. 2, 1992, pp. 339-344.

Nikaein et al, "DDR-Distributed Dynamic Routing Algorithm For Mobile Ad Hoc Networks", Proc. Of The 1st Annual ACM International Symposium On Mobile Ad Hoc Networking & Computing (Boston), Session A, 2000, pp. 19-27.

Noel et al., "The Development Of An 8 KBPS GMSK-Like Modem For Mobitex", IEEE Pacific Rim Conference On Communications, Computers And Signal Processing, May 9, 1991-May 10, 1991, vol. 2, pp. 791-794.

Noerpel, "Hybrid Signaling For The Air Interface For A Wireless Access Communication System", IEEE—ICUPC '92 Proceedings, Sep. 29, 1992-Oct. 2, 1992, pp. 49-53.

O'Byrne, "Digital Cellular Over The Cable Television Fiber-Optic Plant", IEEE—ICUPC '92 Proceedings, Sep. 29, 1992-Oct. 2, 1992, pp. 205-208.

Pande et al., "Application Of Wireless Access To Telecommunication Services In Developing Countries", IEEE—ICUPC '92 Proceedings, Sep. 29, 1992-Oct. 2, 1992, pp. 82-86.

Perlman, "An Algorithm For Distributed Computation Of A Spanning Tree In An Extended LAN", Proceedings Of The Ninth Symposium On Data Communication (Whistler Mountain, British Columbia, Canada), 1985, pp. 44-53.

Perlman, "Incorporation of Multiaccess Links Into A Routing Protocol", Proceedings Of The Eighth symposium On Data Communications (North Falmouth, MA), 1983, pp. 85-94.

Pouwelse et al., "Power Consumption Trade-Offs For Wireless Audio Access", Delft University Of Technology, 2000.

Powell, "Cellular Telephones Give Way To 'Mobile Communications", Communications Canada, Jun. 22, 1989, p. 35.

Powell, "Use Cellular To Support Datacom Applications", Networking Management, Apr. 1991, vol. 9, No. 5, pp. 30-34.

Prakash, "A Routing Algorithm For Wireless Ad Hoc Networks With Unidirectional Links", Wireless Networks, 2000, vol. 7, pp. 617-625.

Prakash, "Unidirectional Links Prove Costly In Wireless Ad Hoc Networks", Proceedings Of The 3rd International Workshop On Discrete Algorithms And Methods For Mobile Computing And Communication (Seattle), 1999, pp. 15-22.

Priyantha et al., "The Cricket Compass For Context-Aware Mobile Applications", Proceedings Of The 7th Annual International Conference On Mobile Computing And Networking (MOBICOM 2000), 2001, PP. 1-14.

Purton, "BT Admits Impact Of Recession But Still Manages To Improve Results", Europe 2000—Communications & Information Technology, vol. 3, No. 7, pR 93(1), Sep. 1991.

Ramésh et al, "Spectral Shaping Using Coded Modulation For Mobile Radio", IEEE—ICUPC '92 Proceedings, Sep. 29, 1992-Oct. 2, 1992, pp. 298-302.

Reinbold et al., "A Comparison Of IP Mobility Protocols", Tech. Rep. Infonet-TR-13, Dec. 2001.
Reiter, "Three Cellular Modems", PC Magazine, Dec. 25, 1990, vol. 9, No. 22, p. 365.
Rodrigues et al., "Rural Satellite Service: A Mexican View", IEEE—ICUPC '92 Proceedings, Sep. 29, 1992-Oct. 2, 1992, pp. 380-384.
Rohani et al., "Low Cost High Performance CDMA System For U.S. PCS", IEEE—ICUPC '92 Proceedings, Sep. 29, 1992-Oct. 2, 1992, pp. 278-282.
Röhl et al., "A Short Look On Power Saving Mechanism In The Wireless LAN Standard" Draft IEEE 802.11, 1997, pp. 1-6.
Royer et al., "Multicast Operation Of The Ad-Hoc On-Demand Distance Vector Routing Protocol", Proceedigns Of the 5th Annual ACM/IEEE International Conference On Mobile Computing And Networking (Seattle), 1999, pp. 207-218.
Salkintzis et al., "Mobile Packet Data Technology: An Insight Into MOBITEX Architecture," IEEE Personal Communications, Feb. 1997, pp. 10-18.
Sanford et al., "Facade Integrated Microstrip Patch Antennas Applied To Personal communication Networks", IEEE—ICUPC '92 Proceedings, Sep. 29, 1992-Oct. 2, 1992, pp. 214-218.
Savage, "A Technology To Link Professionals On The Road To Central Information Systems: Mobitex Public Networks In Europe", World Congress On Applications Of Transport Telematics And Intelligent Vehicle-Highway Systems, 1995, vol. 5, pp. 2662-2668.
Schwartz, "Ericsson Set To Debut Radio Modems", Communications Week, Dec. 2, 1991, p. 21.
Seshan et al., "The Role Of Digital Signal Processing In Personal Communications Networks", IEEE—ICUPC '92 Proceedings, Sep. 29, 1992-Oct. 2, 1992, pp. 200-204.
Seshan, "Low-Latency Handoff For Cellular Data Networks", Ph.D. Thesis, University Of California At Berkeley, 1995.
Sheety et al., "Development In Mobile Markets", Communications International, Dec. 1991, vol. 18, No. 12, p. 47.
Sneed, "A 2-GHz CMOS LC-Tuned VCO Using Switched-Capacitors To Compensate For Bond Wire Inductance Variation", University Of California, Berkeley, Dec. 21, 2000, pp. 1-51.
Sollenberger et al., "An Efficient TDMA Radio Link And Architecture For Wireless Local Access", IEEE—ICUPC '92 Proceedings, Sep. 29, 1992-Oct. 2, 1992, pp. 262-266.
Srisathapornpat et al., "Coordinated Power Conservation For Ad Hoc Networks", IEEE International Conference On Communications, 25(1), 2002, pp. 3330-3335.
Stein, "Greater Efficiency With Mobile Data Communication", Ericsson Review, 1991, vol. 68, Issue 4, pp. 104-110.
Steinert-Threlkeld, "Ericsson Unit To Aid New Network; Richardon Firm To Provide Equipment For Cellular Data Link", The Dallas Morning News, Record No. DAL1073150, Jun. 1, 1989.
"Subscriber Identity Modules, Functional Characteristics", Recommendation GSM 02.17, v. 3.2.0, Mar. 1990.
Sudame et al., "On Providing Support For Protocol Adaptation In Mobile Wireless Networks", Mobile Networks And Applications 6, 2001, pp. 43-55.
Sweeny, "IBM, Motorola Join To Offer Mobile Data", Communications Week, Feb. 5, 1990, vol. 286, pp. 2, 84.
Takats et al., "A Network Management Architecture For Satellite Based Personal Communications", IEEE—ICUPC '92 Proceedings, Sep. 29, 1992-Oct. 2, 1992, pp. 395-401.
Tan et al., "A Fast Handoff Scheme For Wireless Networks", Proceedings Of The 2nd ACM International Workshop On Wireless Mobile Multimedia (Seattle, WA), 1999.
Tan et al., "Mobicast: A Multicast Scheme For Wireless Networks", Mobile Networks And Applications 5, 2000, pp. 259-271.
Tanno et al., "Multiplexing Of Communication Ports On Unix Terminals For Packet Radio Networks", IEEE—ICUPC '92 Proceedings, Sep. 29, 1992-Oct. 2, 1992, pp. 417-420.
Technical Manual Callmaster/Smart MT-270, 1982.
Todd et al., "Low Power Rendezvous In Embedded Wireless Networks", Proceedings Of The 1st ACM International Symposium on Mobile Ad Hoc Networking & Computing (Boston), Sessions D, 2000, pp. 107-118.

Todd et al., "Space And Frequency Diversity Measurements of The 1.7 GHz Indoor Radio Channel For Wireless Personal Communications", IEEE—ICUPC '92 Proceedings, Sep. 29, 1992-Oct. 2, 1992, pp. 87-91.
Toh, "A Hybrid Handover Protocol For Local Area Wireless ATM Networks", Mobile Networks And Applications 1, 1996, pp. 313-334.
Troe, "Mobile-Data Packet-Networks", Electro International Conference Record, New York, Apr. 16, 1992-Apr. 18, 1991, pp. 510-513.
Tsukamoto et al., "Mobility Management Of Transport Protocol Supporting Multiple Connections", Proceedings Of The Second International Workshop On Monthly Management & Wireless Access Protocols (Philadephia, PA), Sessions 4, 2004, pp. 83-87.
Ubiquity 1000 Cellular Communications System—Technical Information, May 18, 1994.
Ubiquity 1000 Cellular Communications System For Your IBM ThinkPad™ 750, User's Guide, 1994.
Valko et al., "On The Analysis Of Cellular IP Access Networks", Sixth JFIP International Workshop On Protocols For High Speed Networks (Salem), Aug. 25, 1999-Aug. 27, 1999.
Velocci, "Orbcomm Nears Full Operational Status", Aviation Week & Space Technology, Nov. 23, 1998, vol. 149, No. 21, pp. 46-78.
Vijayan et al., "The Dynamic Behavior Of Handoff Algorithms", IEEE—ICUPC '92 Proceedigns, Sep. 29, 1992-Oct. 2, 1992, pp. 39-43.
Vinton, "Cellular Market Booms, But Competition Looms", Business Communications Review, Aug. 1990, vol. 20, No. 8, p. 73-77.
Vizard, "Standards For UPT Introduction and Evolution", IEEE—ICUPC '92 Proceedings, Sep. 29, 1992-Oct. 2, 1992, pp. 74-78.
Wang et al., "On Frequency-Hop Multiple Access Sequence", IEEE—ICUPC '92 Proceedings, Sep. 29, 1992-Oct. 2, 1992, pp. 177-181.
Wang et al., "Tracking A Head-Mounted Display In A Room-Sized Environment With Head-Mounted Cameras", Proc. Of Helmet-Mounted Displays II, Orlando, FL, Apr. 19, 1990-Apr. 20, 1990, vol. 1290 SPIE.
Wang, "The Hierarchical Structure Of Tracing Strategy For Universal Personal Communication Systems", IEEE—ICUPC '92 Proceedings, Sep. 29, 1992-Oct. 2, 1992, pp. 242-246.
Want et al., "The Active Badge Location System", ACM Transactions On Information Systems, Jan. 1992, vol. 10, No. 1, pp. 91-102.
Webb, "Voice And Data Privacy Using Chaotic Time Sequences", IEEE—ICUPC '92 Proceedings, Sep. 29, 1992-Oct. 2, 1992, pp. 33-38.
Wilber-Ham et al., "Universal Personal Telecommunication (UPT) Service And Architecture Overview", IEEE—ICUPC '92 Proceedigns, Sep. 29, 1992-Oct. 2, 1992, pp. 64-68.
Williams, "It's Telecom All The Way For A Rejuvenated Ericsson (LM Ericsson of Sweden Sticks To Telecommunications Business)", Electronic Business Buyer, Jul. 10, 1989.
Wilson et al., "CDMA Versus Dynamic TDMA For Access Controls In An Integrated Voice/Data PCN", IEEE—ICUPC '92 Proceedings, Sep. 29, 1992-Oct. 2, 1992, pp. 267-272.
Winters et al., "The Capacity Of Wireless Communication Systems Can Be Substantially Increased By The Use Of Antenna Diversity", IEEE—ICUPC '92 Proceedings, Sep. 29, 1992-Oct. 2, 1992, pp. 28-32.
Wolter, "Multiplexing On The Downlink Of A TDMA-Based Radio System", IEEE—ICUPC '92 Proceedings, Sep. 29, 1992-Oct. 2, 1992, pp. 258-261.
Wolterink, "Handoff, A Necessary Feature In Wireless Office Systems", IEEE—ICUPC '92 Proceedings, Sep. 29, 1992-Oct. 2, 1992, pp. 369-374.
Wu et al., "AMRIS: A Multicast Protocol For Ad Hoc Wireless Networks", Proceedings of IEEE MILCOMM '99 (Atlantic City, NJ), 1999, pp. 1-5.
Yamagishi et al., "A Low-Voltage 6-GHZ-Band CMOS Monolithic LC-Tank VCO Using A Tuning-Range Switching Technique", IEEE MTT-S Digest, 2000, pp. 735-738.
Yu, "IS-41 For Mobility Management", IEEE—ICUPC '92 Proceedings, Sep. 29, 1992-Oct. 2, 1992, pp. 158-162.

Cellular Digital Packet Data System Specification Release 10—Book 1, N/A, Jul. 19, 1993.
Cellular System Dual-Mode Station—Base Station Compatibility Standard, EIA/TIA/IS-54, May 1, 1990.
ESTI Radio Equipment And Systems (RES); Digital Equipment Cordless Telecommunications (DECT) Common Interface Part 1: Overview, ETS 300 175-1, Oct. 1, 1992.
ESTI Radio Equipment And Systems (RES); Digital Equipment Cordless Telecommunications (DECT) Common Interface Part 2: Physical Layer, ETS 300 175-2, Oct. 1, 1992.
ESTI Radio Equipment And Systems (RES); Digital Equipment Cordless Telecommunications (DECT) Common Interface Part 4: Data Link Control Layer, ETS 300 175-4, Oct. 1, 1992.
ESTI Radio Equipment And Systems (RES); Digital Equipment Cordless Telecommunications (DECT) Common Interface Part 6: Identities And Addressing, ETS 300 175-6, Oct. 1, 1992.
ESTI Radio Equipment And Systems (RES); Digital Equipment Cordless Telecommunications (DECT) Common Interface Part 7: Security Features, ETS 300 175-7, Oct. 1, 1992.
ESTI Radio Equipment And Systems (RES); Digital Equipment Cordless Telecommunications (DECT) Common Interface Part 8: Speech Coding And Transmission, ETS 300 175-8, Oct. 1, 1992.
ESTI Radio Equipment And Systems (RES); Digital Equipment Cordless Telecommunications (DECT) Common Interface Part 9: Public Access Profile, ETS 300 175-9, Oct. 1, 1992.
ETSI Handbook Guide To The Application Of The PNE Rule To The Drafting And Presentation Of ETSI Standards v 1.3, May 1990.
Fast And Scalable Handoffs For Wireless Internet Works, Proceedings Of The 2nd Annual International Conference On Mobile Computing And Networking (Rye, NY), 1995, pp. 56-66.
File History of U.S. Appl. No. 08/027,140, Bates Nos. BCMITC000089531-664, Mar. 1993.
File History of U.S. Appl. No. 08/101,254, Bates Nos. BCMITC0000793836-978, Aug. 1993.
File History of U.S. Appl. No. 08/114,872, Bates Nos. QBB220620-1242, Aug. 1993.
File History of U.S. Appl. No. 08/431,077, Bates Nos. BCMITC000079534-862, Apr. 1995.
File History of U.S. Appl. No. 08/487,609, Bates Nos. BCMITC0000792166-658, Jun. 1995.
File History of U.S. Appl. No. 08/513,648 ('983 file history), Bates Nos. BCMITC000071666-72400, Aug. 1995.
File History of U.S. Appl. No. 09/060,287 ('311 file history), Bates Nos. BCMITC000071327-71665, Apr. 1998.
Lee, Mobile Cellular Telecommunications Systems, 1989, Bates Nos. QBB147008-463.
L. Kleinrock and F.A. Tobagi, "Packet Switching in Radio Channels; Part IV—Stability Considerations and Dynamic Control In Carrier Sense Multiple Access," IEEE Transactions on Communications, vol. COM-25', No. 10, Oct. 1977.
M. B. Pursley, "The Role of Spread Spectrum in Packet Radio Networks," Proceedings of the IEEE, vol. 75, No. 1, Jan. 1987.
J. O. Onunga and R. W. Donaldson, "Performance Analysis of CSMA with Priority Acknowledgements (CSMA/PA) on Noisy Data Networks with Finite User Population," IEEE Transactions on Communications, vol. 39, No. 7, Jul. 1991.
L. Kleinrock and J. Silvester, "Spatial Rouse in Multihop Packet Radio Networks," Proceedings of the IEEE, vol. 75, No. 1, Jan. 1987.
International Standard ISO/DIS 8802-2.2, Jun. 1, 1992.
A. S. Tanenbaum, "Computer Networks," Prentice Hall, Second Edition, Dec. 1998.
D.E. Comer, "Internetworking with TCP/IP", Prentice Hall, Dec. 1991.
Biba, *A Hybrid Wireless MAC Protocol Supporting Asynchonous and Synchronous MSDU Delivery Services*, IEEE P802.11/91-92.
Cheah, *A Proposed Architecture and Access Protocol Outline for the IEEE 802.11 Radio LAN Standards, Part II*, Document IEEE P802.11/91-54.
Cox, *A Radio System Proposal for Widespread Low-Power Tetherless Communications, IEEE Transactions on Communications*, vol. 39, No. 2 (Feb. 1991).
Natarajan et al., *Battery Efficient Operation of Radio MAC Protocol*, Document IEEE P802.11/91-102.

Rypinski, *Power-Drain Considerations for Full Time and Sleep Mode Radio Receivers*, Document IEEE P802.11/91-99.
Robert Meier's Masters Thesis, *Mobile Computer Network Architecture* (May 1993).
*Digital European Cordless Telecommunications Reference Document* (Mar. 1991).
Haine, *A New Radio Access Protocol and Network Architecture for Mobile Packet Data* 41$^{st}$ IEEE Ventricular Technology Conference, Jul. 1991.
Owen, *The DECT Radio Interface*, Colloquium on CT2/CA1 And DECT Cordless Telecommunications (1990).
Tuttlebee, *Cordless Telecommunications in Europe* (1990).
Radio Equipment And Systems (RES); Digital ESTI Radio Equipment And Systems (RES); Digital Equipment Telecommunications (DECT) Common Interface Part 5: Network Layer, ETS 300 175-5, Oct. 1, 1992.
Recommended Minimum Performance Standards For 800 MHz Dual mode Mobile Stations, EIA/TIA/IS-55, Dec. 1, 1991, Bates Nos. QBB149924-150025.
Service Accessibility—Change Request, GSM 02.11 v 4.0, Feb. 6, 1992.
Service Accessibility—GSM 02.11 v 4.3.0, Oct. 1992.
Service Accessibility—GSM 02.11 v 4.5.0, Apr. 1993, Bates Nos. QBB153507-515.
Balston, Cellular Radio Systems, 1993.
Lo et al., "An Estimate of Network Database Transaction Volume to Support Personal Communications Services," IEEE - ICUPC. '92 Proceedings, pp. 236-241, Sep. 29, 1992-Oct. 2,1992.
Lo, "A 1.5-V 900-MHz Monolithic CMOS Fast-Switching Frequency Synthesizer for Wireless Applications," Symposium on VLSI Circuits of Technical Papers, pp. 238-241, 2000.
Alvarez, A Wide-Bandwidth Low-Voltage PLL for PowerPC Microprocessors, Symposium on VLSI Circuits Digest of Technical Papers, 1994.
"The Second Overseas Radio Wave Utilization System Investigation Committee Report", Kaigai Denpa Rioy Shisutemu Chosadan Hokokusho, Dai2kai, Showa, 1987, Abstract.
Jane Generic Design Specification, Bates No. E 00 0745C-0778C.
Katarina Standard Cell Specification, Bates No. E 00 0087C-0242C.
Katie Gate Array Specification, Bates No. E 00 1498C-1620C.
Mobitex Operators Association, "Mobitex Terminal Specification to be Used With Cantle Mobitex Radio Network Issue R1A 8000 bps," Feb. 26, 1990.
Radio Data Link Access Procedure published by Motorola, Mar. 1991.
Notice Regarding Issuance of Initial Determination and Recommended Determination on Remedy and Bond, Oct. 10, 2006.
Rebuttal Exper Report of Ray Nettleton Regarding Validity of U.S. Patent Nos. 5,714,983 and 6,374,311 (redacted version), Dec. 15, 2005.
Invalidity Expert Report of Dr. John Proakis (redacted version), Dec. 5, 2005.
Mobitex System Description MTS02.1.
Mobitex Network Layer for Terminals Appendix B MTS09A.2.
GMS 07.01 v 3.13.0, Feb. 1991.
Qualcomm Incorporated's Sixth Supplemental Objections and Responses to Complainant's First Set of Interrogatories (Nos. 1-15), Dec. 9, 2005.
Yu, "Overview of EIA/TIA IS-41", IEEE 1992.
Qualcomm Incorporated's Sixth Supplemental Objections and Responses to Complainant's First Set of Interrogatories (Nos. 1-15), Dec. 9, 2005.
Kishine et al., "A 2.5 Gb/s Clock and Data Recovery IC With Tunable Jitter Characteristics for use in LAN's and WAN's", IEEE J. of Solid-State Circuits, Jun. 1999, vol. 34, No. 6, pp. 805-12.
Kral et al., "RF-CMOS Oscillators With Switched Tuning", Custom IC Conference, Santa Clara, CA, May 1998, pp. 555-558.
Kral, "a. 2.4 GHz CMOS Frequency Synthesizer", UCLA Integrated Circuits and Systems Laboratory, May 1998.
Second Supplemental Expert Report of Dr. John Proakis (redacted version), Feb. 9, 2006.
Expert Report of Duane Rabe, Mar. 14, 2008.
Initial Expert Report of Tim A. Williams, Ph.D., Mar. 14, 2008.

Fisher, "Dual mode mobile unit for next generation digital narrow channel cellular telephone system," 38th IEEE Vehicular Tech. Conf., pp. 543-547, 1988.
Decision of Appeals 2007-1493, -1494, -1495, -1496, -1497, -1498, -1499, -1514, -1573, 2008-1004, -1009, -1010, -1012, -1013, -1015, -1018, -1019 in the United States Court of Appeals for the Federal Circuit, *Kyocera Wireless Corporation, et al. v. International Trade Commission and Broadcom Corporation*, on appeal from the United States International Trade Commission in Investigation No. 337-TA-543, Decided Oct. 14, 2008.
EIA/TIA Interim Standards, "Cellular System Dual-Mode Station - Base Station Compatibility Standard," Revision A, Mar. 1991, EIA/TIA/IS-54-A.
EIA/TIA Interim Standards, "Cellular System Dual-Mode Station - Base Station Compatibility Standard," Rivision B. Apr. 1992, EIA/TIA/IS-54-B.
Intel 8088 data sheet, Aug. 1990.
M68HJC11 Reference Manual, Rev. 3.0, 1991.
Zilog Z80 Product Specification, Jan. 1978.
Decision of Appeal 2007-1164 in the United States Court of Appeals for teh Federal Circuit, *Broadcom Corporation v. International Trade Commission and Qualcomm Incorporated*, on appeal from the United States International Trade Commission in Investigation No. 337-TA-543, Decided Sep. 19, 2008.
Mobitex Operators Association, "Mobitex Terminal Specification to be Used With Cantle Mobitex Radio Netowrk Issue R1A 8000 bps," Feb. 26, 1990.
Mobitex Operators Association, "Addendum Battery-Saving Protocol for Portable Terminals," Aug. 17, 1990.
Radio Data Link Access Procedure published by Motorola, Mar. 1991.
Notice Regarding Issuance of Initial Determination and Recommended Determination on Remedy and Bond, Oct. 10, 2006.
Rebuttal Expert Report of Ray Nettleton Regarding Validity of U.S. Patent Nos. 5,714,983 and 6,374,311 (redacted version), Dec. 15, 2005.
Invalidity Expert Report of Dr. John Proakis (redacted version), Dec. 5, 2005.
Mobitex Network Layer for Terminals Appendix B MTS09A.2.
GSM 07.01 v 3.13.0, Feb. 1991.
Qualcomm Incorporated's Sixth Supplemental Objections and Responses to Complainant's First Set of Interrogatories (Nos. 1-15), Dec. 9, 2005.
Qualcomm Incorporated's Sixth Supplemental Objections and Responses to Complainant's First Set of Interrogatories (Nos. 1-15), Dec. 9, 2005.
Kishine et al., "A 2.5 Gb/s Clock and Data Recovery IC With Tunable Jitter Characteristics for use in LAN's and WAN's", IEEE J. of Solid-State Circuits, Jun. 1999, vol. 34, No. 6, pp. 805-812.
Kral et al., "RF-CMOS Oscillators With Switched Tuning", Custom IC Conference, Santa Clara, CA, May 1998, pp. 555-558.

Kral, "A 2.4 GHz CMOS Frequency Synthesizer", UCLA Integrated Circuits and Systems Laboratory, Mar. 1998.
Second Supplemental Expert Report of Dr. John Proakis (redacted version), Feb. 9, 2006.
Rubbermark, Generic Design Specification Jane Pocket Telephones, Dec. 22, 1992, Bates No. E 00 0745C-0778C.
Katarine Standard Cell Specification, Aug. 12, 1992, Bates No. E 00 0087C-0242C.
Katie Gate Array Specification, Jan. 24, 1992, Bates No. E 00 1498C-1620C.
Mobitex System Description MTS02.1, Feb. 19, 1990.
Yu, "Overview of EIA/TIA IS-41," IEEE 1992, pp. 220-224, Oct. 19-21, 1992.

* cited by examiner

*Primary Examiner* — Philip J Sobutka
(74) *Attorney, Agent, or Firm* — McAndrews, Held & Mallow, Ltd.

(57) ABSTRACT

Improved apparatus for a radio communication system having a multiplicity of mobile transceiver units selectively in communication with a plurality of base transceiver units which, in turn, communicate with one or more host computers for storage and manipulation of data collected by bar code scanners or other collection means associated with the mobile transceiver units. A network controller and an adapter which has a simulcast and sequential mode provide selective interface between host computers and base transceivers. A scheme for routing data through the communication system is also disclosed wherein the intermediate base stations are organized into an optimal spanning-tree network to control the routing of data to and from the RF terminals and the host computer efficiently and dynamically. Additionally, redundant network and communication protocol is disclosed wherein the network utilizes a polling communication protocol which, under heavy loaded conditions, requires that a roaming terminal wishing to initiate communication must first determine that the channel is truly clear by listing for an entire interpoll gap time. In a further embodiment, a criterion used by the roaming terminals for attaching to a given base station reduces conflicts in the overlapping RF regions of adjacent base stations.

203 Claims, 26 Drawing Sheets

□ Terminal
○ Base Station

NETWORK SUPPORTING ROAMING, SLEEPING TERMINALS

CROSS-REFERENCE TO RELATED APPLICATIONS

The present application is a continuation of application Ser. No. 09/318,668 filed May 25, 1999 which is a continuation of U.S. application Ser. No. 08/545,108, filed Oct. 19, 1995, now U.S. Pat. No. 5,940,771, which is a continuation of: 1) U.S. application Ser. No. 07/947,102, filed Sep. 14, 1992, now abandoned; and 2) U.S. application Ser. No. 07/907,927, filed Jun. 30, 1992, now abandoned. application Ser. No. 07/947,102 is also a continuation in part of application Ser. No. 07/907,927 which is a continuation in part of: 1) U.S. application Ser. No. 07/857,603, filed Mar. 30, 1992, now abandoned, which is a continuation in part of U.S. application Ser. No. 07/700,704, filed May 14, 1991, now abandoned, which is itself a continuation in part of U.S. application Ser. No. 07/699,818, filed May 13, 1991, now abandoned; 2) PCT Application No. US92/03982, filed May 13, 1992, now abandoned; 3) U.S. application Ser. No. 07/769,425, filed Oct. 1, 1991, now abandoned; and 4) U.S. application Ser. No. 07/802,348, filed Dec. 4, 1991, now abandoned, which is a continuation in part of U.S. application Ser. No. 07/790,946, filed Nov. 12, 1991, now abandoned.

BACKGROUND OF THE INVENTION

The present invention in a preferred implementation relates to improvements in radio data communication systems wherein a number of mobile transceiver units are to transmit data to a number of base stations under a wide range of operating conditions. The invention is preferably to be applicable as an upgrade of an existing data capture system wherein a number of hand-held transceiver units of an earlier design are already in the field representing a substantial economic investment in comparison to the cost of base stations, accessories and components. In installations spread over an extensive area, a large number of mobile portable transceiver units may be employed to gather data in various places and multiple base stations may be required. In a variety of such installations such as warehouse facilities, distribution centers, and retail establishments, it may be advantageous to utilize not only multiple bases capable of communication with a single host, but with multiple hosts as well.

An early RF data collection system is shown in Marvin L. Sojka, U.S. Pat. No. 4,924,462 assigned to the assignee of the present application. This patent illustrates (in the sixth figure) a NORAND® RC2250 Network Controller which supports one base transceiver for communication with multiple mobile portable transceivers. The exemplary prior art device is capable of communicating with a host computer through an RS232C interface at up to 19,200 baud in asynchronous mode. In order for an optional RS422 interface to be substituted for an RS232C interface, the unit must be opened and substitute circuitry components installed within it.

Additionally, depending upon the application and the operating conditions, a large number of base stations may be required to adequately serve the communication system. For example, a radio data communication system installed in a large factory may require dozens of base stations in order to cover the entire factory floor.

In earlier RF data communication systems, the base stations were typically connected directly to a host computer through multi-dropped connections to an Ethernet communication line. To communicate between an RF terminal and a host computer, in such a system, the RF terminal sends data to a base station and the base station passes the data directly to the host computer. Communicating with a host computer through a base station in this manner is commonly known as hopping. These earlier RF data communication systems used a single-hop method of communication.

In order to cover a larger area with an RF data communication system and to take advantage of the deregulation of the spread-spectrum radio frequencies, later-developed RF data communication systems are organized into layers of base stations. As in earlier RF data communications systems, a typical system includes multiple base stations which communicate directly with the RF terminals and the host computer. In addition, the system also includes intermediate stations that communicate with the RF terminals, the multiple base stations, and other intermediate stations. In such a system, communication from an RF terminal to a host computer may be achieved, for example, by having the RF terminal send data to an intermediate station, the intermediate station send the data to a base station, and the base station send the data directly to the host computer. Communicating with a host computer through more than one station is commonly known as a multiple-hop communication system.

Difficulties often arise in maintaining the integrity of such multiple-hop RF data communication systems. The system must be able to handle both wireless and hard-wired station connections, efficient dynamic routing of data information, RF terminal mobility, and interference from many different sources.

Furthermore, particular advantages have been identified in the use of RF communication links such as allowing remote terminals to "roam", free from hardwired cable connections. In basic configurations, a single host computer communicates along some hard-wired link to an RF base station which would maintain an RF communication link to a single roaming terminal. As long as the roaming terminal stays within range of the RF base station and no other roaming terminals are needed, a very simple network configuration and communication protocol can be used. However, when faced with hundreds of roaming terminals which move in and out of the range of multiple RF base stations, networking and protocol problems emerge.

To solve these problems, attempts have been made to decrease the number of base stations by increasing the base stations range; however, the range of the often battery-powered roaming terminals cannot match the increased range of the wall-socket-powered RF base stations. Moreover, by increasing the range, collisions due to propagation times also increase, slowing down the overall communication time.

Other attempts have been made to increase the number of RF base stations so as to cover the entire roaming area. Although this solves the range problems associated with a single RF base station, additional problems result. First, roaming terminals which are in an overlapping range region between RF base stations communicate with one base station but receive unwanted communication from the other. Second, each roaming terminal often receives unwanted communication from other roaming terminals. Third, each roaming terminal often transmits to a base station while that base station is receiving transmissions from another roaming terminal which is out of transmission range and therefore cannot be detected. As a result, collisions in transmission result.

Additionally, as the number of RF base stations increase, communication pathways from the source to destination become more and more complex. In a network with fixed spatial locations of base stations, host computers and remote terminals, these communication pathways from a source to a destination can easily be determined. In an environment in which the spatial layout of the network continually changes, however, determining the most efficient pathways becomes very difficult. This is because the most efficient pathway from a source to a destination continually changes due to: 1) the movement of the roaming terminals; 2) the relocation of RF base stations; and 3) the occasional break down of RF base stations and host computers.

Communication networks are also known which are often partially or completely disabled upon the break down of a single element of the network. This often leads to difficulty in detecting the fault and to long periods of down-time.

SUMMARY OF THE INVENTION

The present invention provides an improved network controller to serve as a consolidation link between one or more host computers and one or more base transceiver units, each of which may be communicative with many mobile portable transceiver units being moved about a warehouse complex for the collection of data. The network controller invention provides a front panel display with three operator-available control keys for selections of function and up or down scrolling through choices provided on the front panel display.

The invention will allow incorporation with existing base transceivers as well as with high-speed spread spectrum and synthesized radio networks at the same time. The invention allows the creation of a radio communication system with multiple host devices using differing communication protocols. Higher speed host device interfaces may be used as a result of the inclusion of the invention in an existing radio communication system. The invention provides means for the coupling of large networks of serially interconnected base transceivers over a single twisted pair of wires.

The invention provides a plurality of communication ports for interconnection to one or more host computers and one or more base transceiver systems or units. The communication ports available for connection with the host computers may be configured to provide selective interfaces without any requirement for rewiring or other hardware modification. A first port of the controller may be selected to interface with a host computer by either RS232 or V.35 means. The selection of interface means may be performed by the end user with choices made on the front panel control keys of the device.

A second port of the invention may be selected to provide interface means by a choice of RS232, RS422, OR RS485 means or through a NORAND® Radio One Node Network proprietary interface. This second port may be communicative with a second host computer or with existing installed base units when RS232 means are selected, or with existing base units when RS422 means are selected. In addition, the second port may be configured to communicate with a network of a new generation base units, either by RS485 interface protocol, or by the NORAND® Radio One Node Network proprietary interface.

The third port of the invention, like the second port hereof, may be selectively configured to communicate by RS232, RS422, RS485 or NORAND® Radio One Node Network proprietary interface means. For both the second and third ports, as well as for the host port, configuration of the port is accomplished by selection of the port on the front panel of the invention controller with the select key and then selection of the desired interface configuration through appropriate use of the up and down keys to scroll to the correct means to be selected. Because the invention permits internal, software-controlled, selection of the desired interface means for each port, the end user may easily self configure the unit for a particular use, thereby providing a highly versatile device. In addition, the configuration choice means is simplified for the user, because the choices are conveniently displayed on the front panel display and a choice can be made from a scrollable list.

The introduction of the selectable RS485 interface in the present invention enables the controller to be interfaced to a network of new generation base station units which may comprise several base transceiver units configured on a single network circuit.

The inclusion of the selectable NORAND® Radio one Node Network proprietary interface means for the second and the third ports provides means for incorporation of new generation base transceiver units having particularized wiring and control requirements.

A diagnostic port configured for RS232 interface means is provided to provide selective communication, either remotely through modem means, or through direct coupling, with diagnostic and reprogramming apparatus.

The invention is provided with an application specific integrated circuit used in combination with a control processor unit capable of a speed of 16.667 mhz with direct memory access functionality available at is communication ports. Internal memory components to be coupled to the central processor unit and application specific integrated circuit will comprise nonvolatile electrically erasable programmable read only memory elements, dynamic random access memory elements, and nonvolatile FLASH memory elements which permit erasure by application of +12VDC to prescribed pins.

Power supply means are supplied exteriorly to the invention in order to make the invention standardized for United States, European and other countries' local power company output characteristics.

The present invention also solves many of the problems inherent in a multiple-hop data communication system. The present invention comprises an RF Local-Area Network capable of efficient and dynamic handling of data by routing communications between the RF Terminals and the host computer through a network of intermediate base stations.

In one embodiment of the present invention, the RF data communication system contains one or more host computers and multiple gateways, bridges, and RF terminals. Gateways are used to pass messages to and from a host computer and the RF Network. A host port is used to provide a link between the gateway and the host computer. In addition, gateways may include bridging functions and may pass information from one RF terminal to another. Bridges are intermediate relay nodes which repeat data messages. Bridges can repeat data to and from bridges, gateways and RF terminals and are used to extend the range of the gateways.

The RF terminals are attached logically to the host computer and use a network formed by a gateway and the bridges to communicate with the host computer. To set up the network, an optimal spanning tree is created to control the flow of data communication. The roots of the spanning tree are at the gateways; the branches are the bridges; and non-bridging stations, such as RF terminals, are the leaves of the tree. Data are sent along the branches of the newly created optimal spanning tree. Nodes in the network use a backward learning technique to route packets along the correct branches.

In another embodiment a method of beginning a data exchange over an RF communication link is disclosed wherein the sending device initially identifies the fact that the RF communication link is clear during a period at least as long as the maximum interpoll gap. Thereafter, a request for poll frame is transmitted by the sending device.

In addition, a method used by a remote terminal having an RF range for selectively attaching itself to one of a plurality of RF base stations. Each of these base stations has an associated cost, a preset priority, and a preset number. The remote terminal receives a message from each base station and discards those which fall below a predetermined minimum threshold level. The remote terminal will attach itself to one of the plurality of base stations based on the cost, signal strength, preset priority, and preset number.

In another embodiment, a method for selecting and redundantly replacing a root device when it breaks down from among a plurality of potential root devices is disclosed. Each of the potential root devices has a single, assigned preset number. The potential root device with the lowest assigned preset number is initially selected. Whenever the selected root device breaks down, one of the potential root devices will be selected based on the lowest assigned preset number without considering the preset number of the currently selected root device.

In addition, high system clock rates are required in rf roaming terminals to provide for the decoding of barcode scans at a rate that is acceptable to a user of the system. However, the high clock rates used for decoding also may cause the generation of an excessive amount of digital noise in and around the rf terminals. This noise can get into the rf terminal and interfere with communication, resulting in a reduction in the effective communication range. This problem is solved by using a dual system clock rate. The terminal is operated normally at a slow system clock rate, of the order of 2400 baud, to minimize the generation of digital noise, and is switched to a fast clock rate such as 9600 baud during barcode scanning to allow the data obtained from the barcode scan to be processed at a higher rate. This lets the rf data link coexist with the need for and the hardware support for barcode scan decoding.

It is therefore an object of the invention to provide a radio communication system which permits the interconnection of one or two host computer devices to a multiplicity of base transceiver units which may include both prior art existing installed units and new generation units capable of spread spectrum or synthesized radio transmission.

It is a further object of the invention to provide a radio communication system network controller which may allow interconnection of a multiplicity of devices which are operating with non-uniform electrical interface characteristics.

It is a further object of the invention to provide a radio communication system network controller which may be configured for varying interface requirements by operation of a limited number of front panel keys.

It is a further object of the invention to provide a radio communication system network controller which will allow utilization of single twisted pair networks of serially networked base transceiver units, each of which being communicative with a large number of individual mobile data collection transceiver units.

Another object of the present invention is to route data efficiently, dynamically, and without looping. Another object of the present invention is to make the routing of the data transparent to the RF terminals. The RF terminals, transmitting data intended for the host computer, are unaffected by the means ultimately used by the RF Network to deliver their data.

It is a further object of the present invention for the network to be capable of handling RF terminal mobility and lost nodes with minimal impact on the entire RF data communication system.

It is another object of the present invention to provide a communication protocol between the base stations and roaming terminals for optimizing the utilization of the RF rang of each base station.

It is a further object of the present invention to provide an adaptive communication network with inherent redundancy.

It is another object of the present invention to provide a communication protocol for use in a network of host computers, base stations and roaming terminals which is not susceptible to collisions with "hidden" communications.

It is yet another object of the present invention to provide a communication protocol which minimizes collisions in the overlapping regions of different RF base stations.

DESCRIPTION OF THE DRAWING FIGURES

Figure 16:
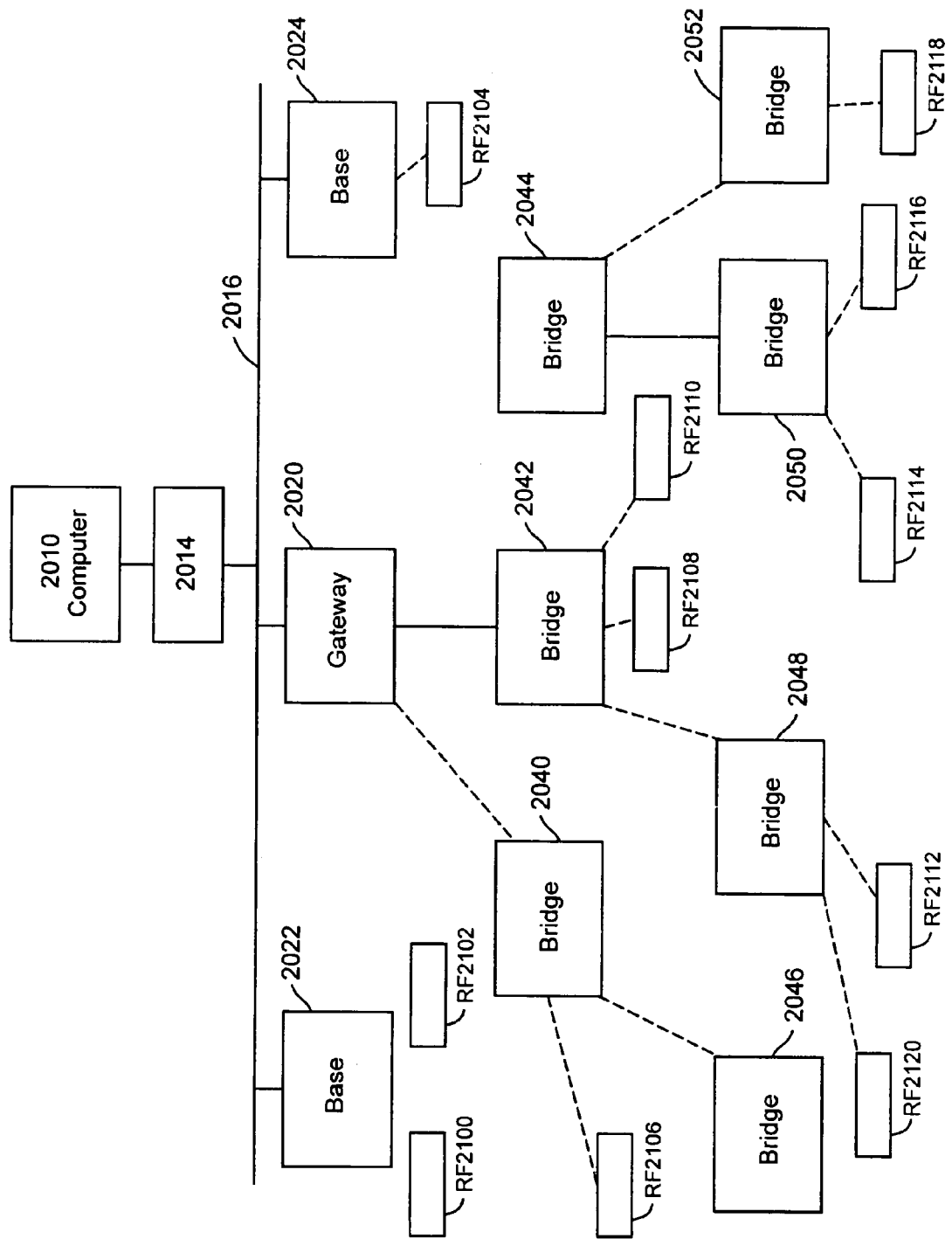

FIG. 16 is a functional block diagram of an RF data communication system incorporating the RF local-area network of the present invention.

Figure 17:
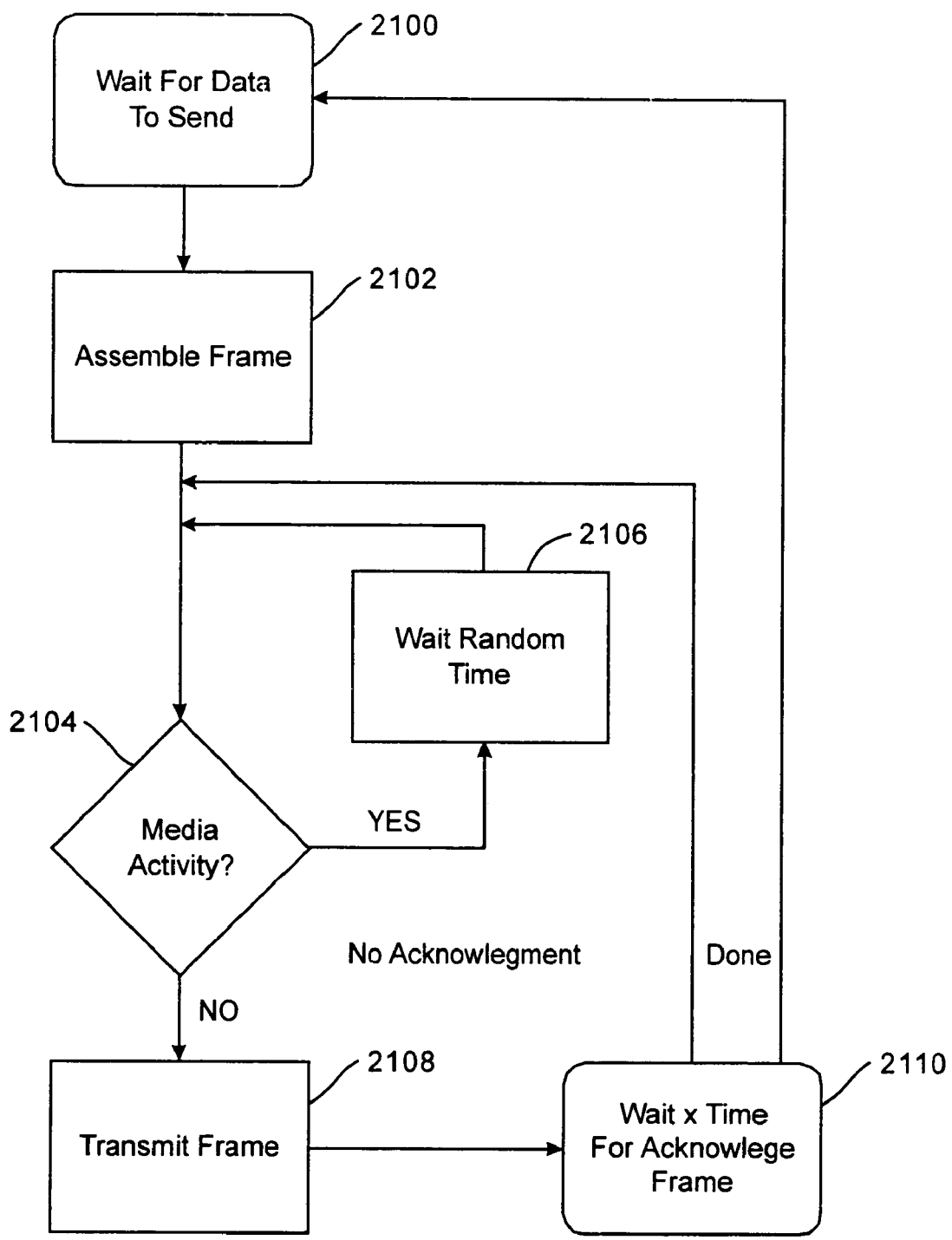

FIG. 17 is a diagram of the method steps of a common-spectrum multiple-access (CSMA) Non-Persistent protocol which may be used by the nodes and RF terminals to communicate with the network.

Figure 18:
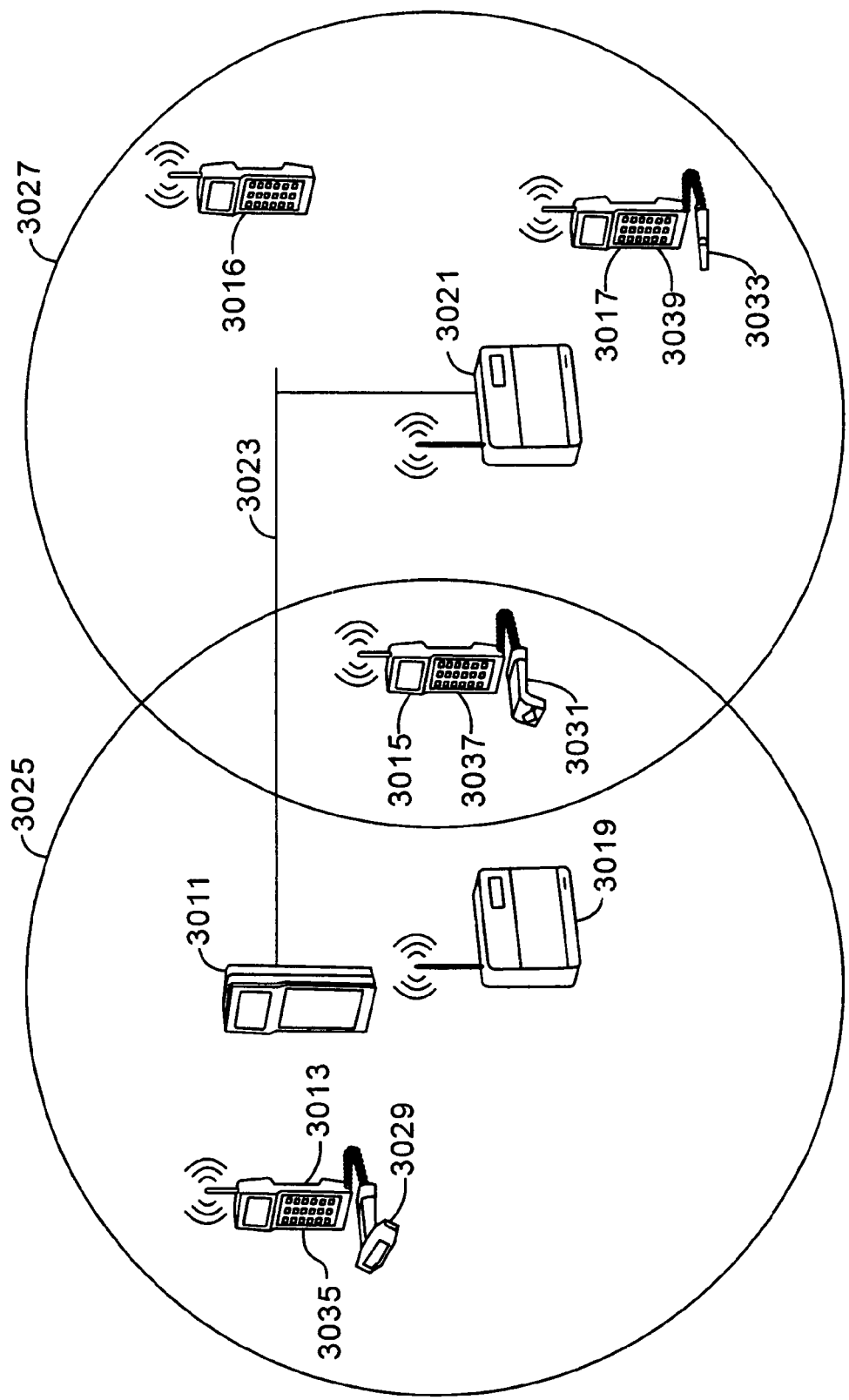
Figure 18A:
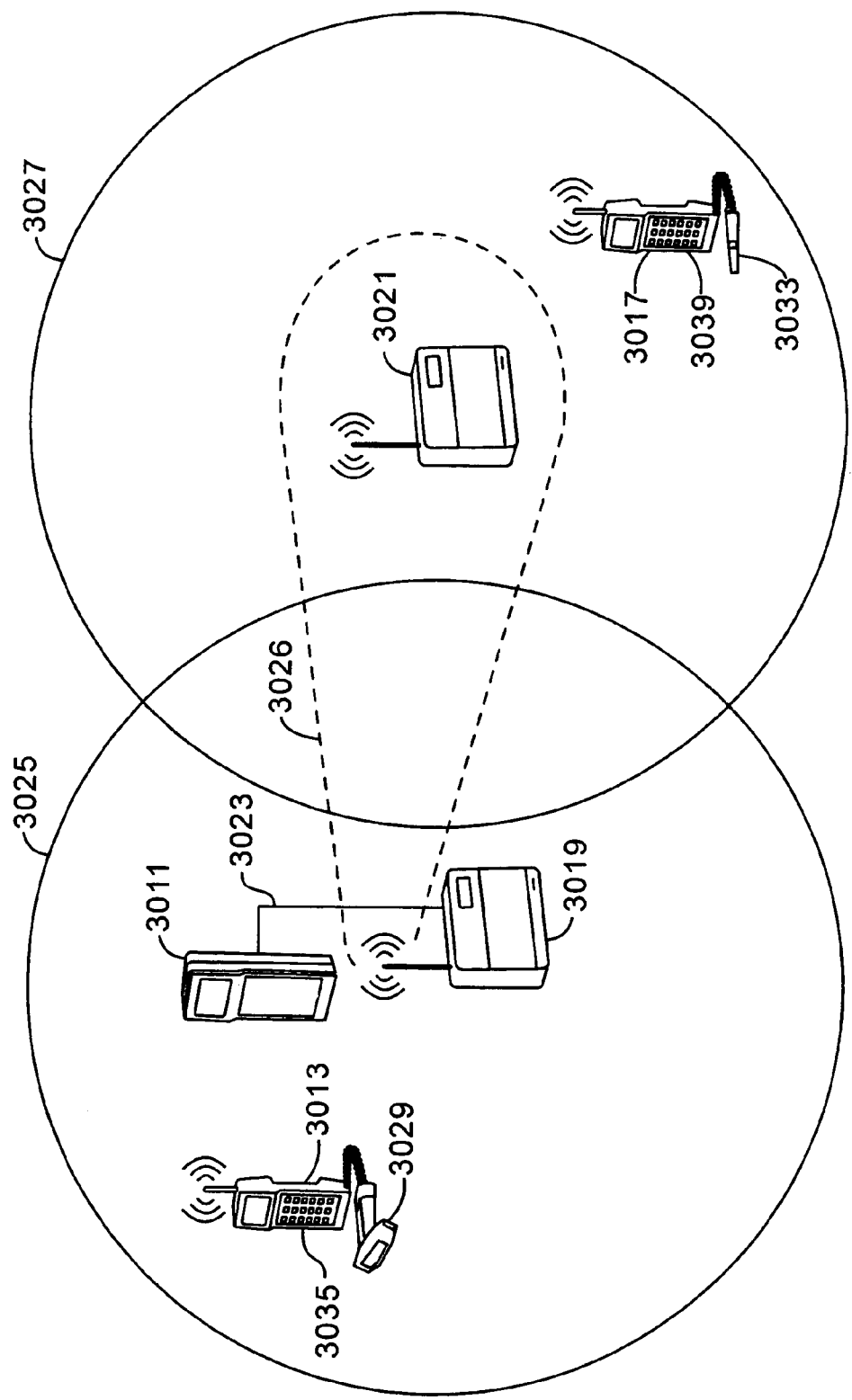

FIG. 18 is a diagram which illustrates the basic communication pathways and spatial relationships between a host computer, base stations and roaming terminals of the present invention;

FIG. 18A illustrates the use of a programmable directional antenna system in the communication system of FIG. 18.

Figure 20:
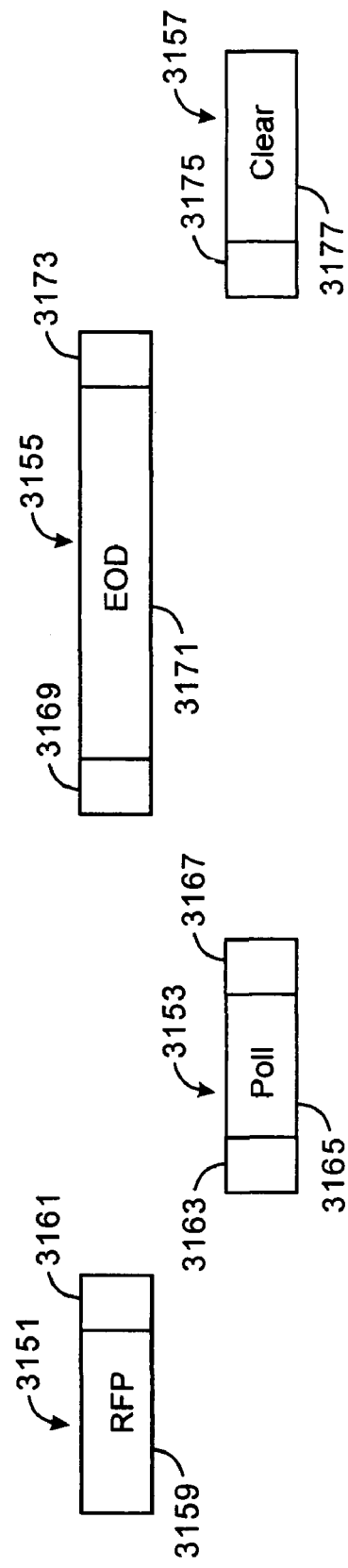
Figure 19:
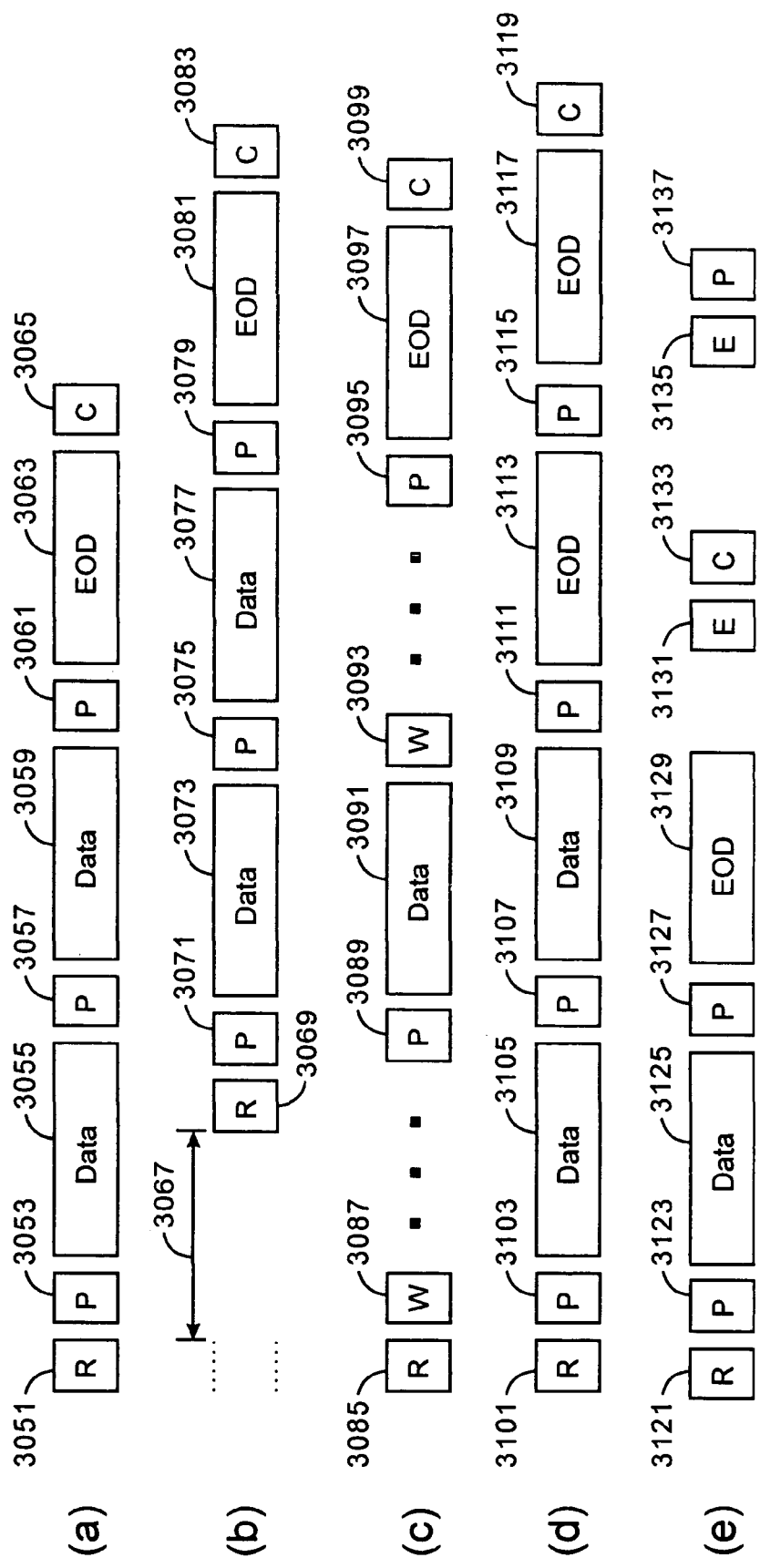
Figure 21:
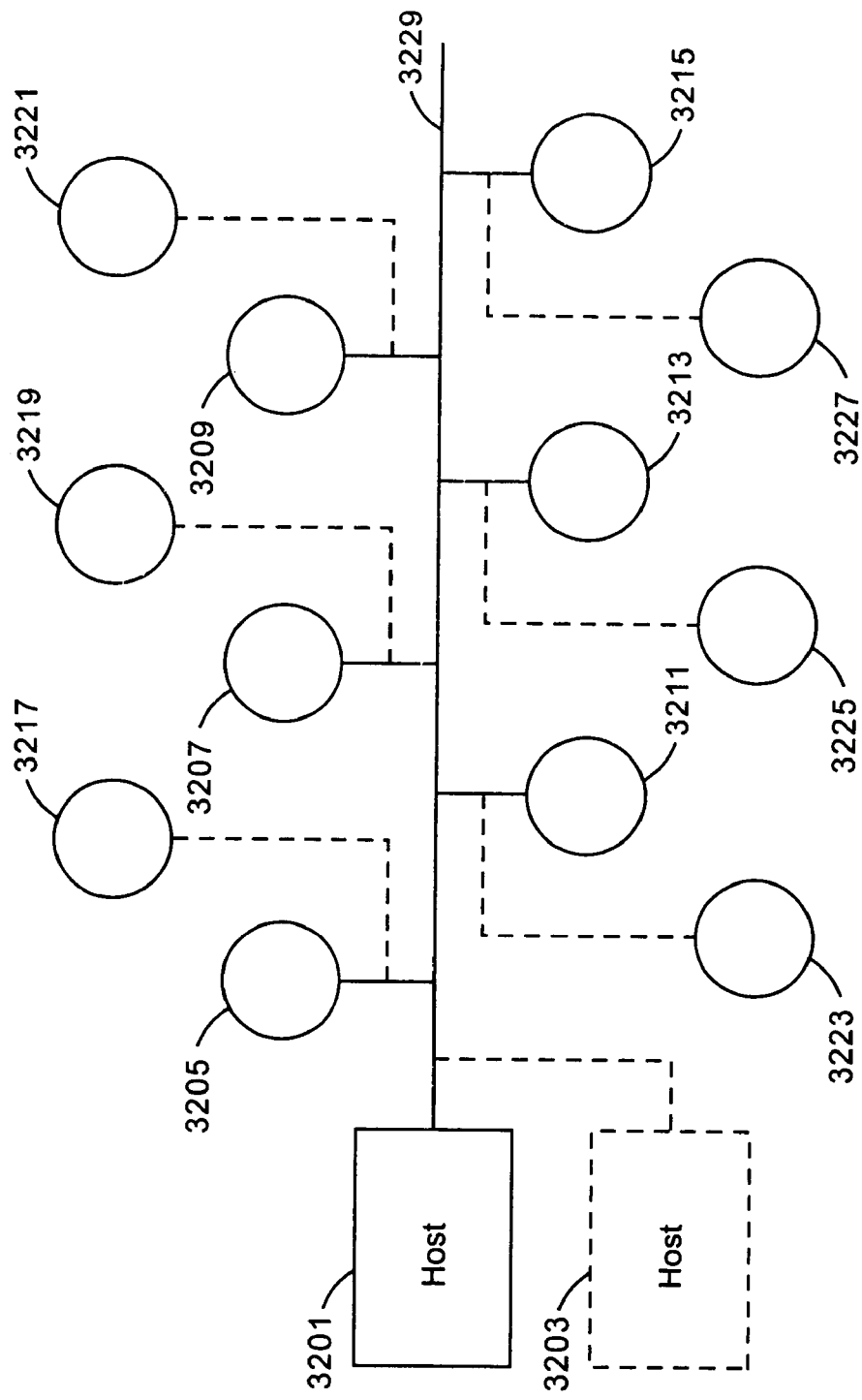
Figure 22:
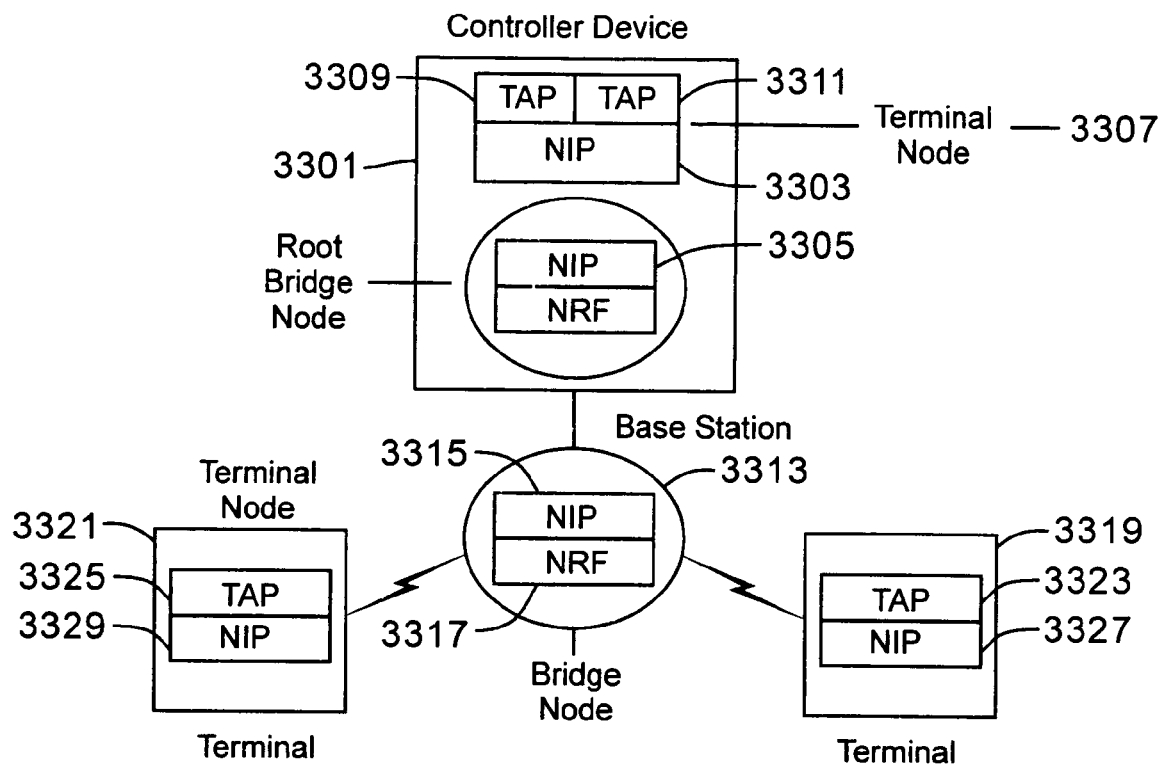
Figure 23:
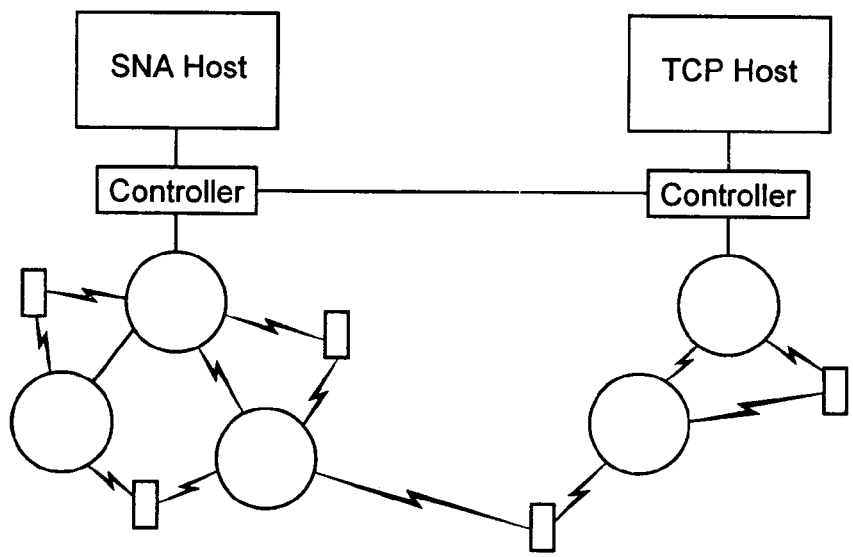
Figure 24:
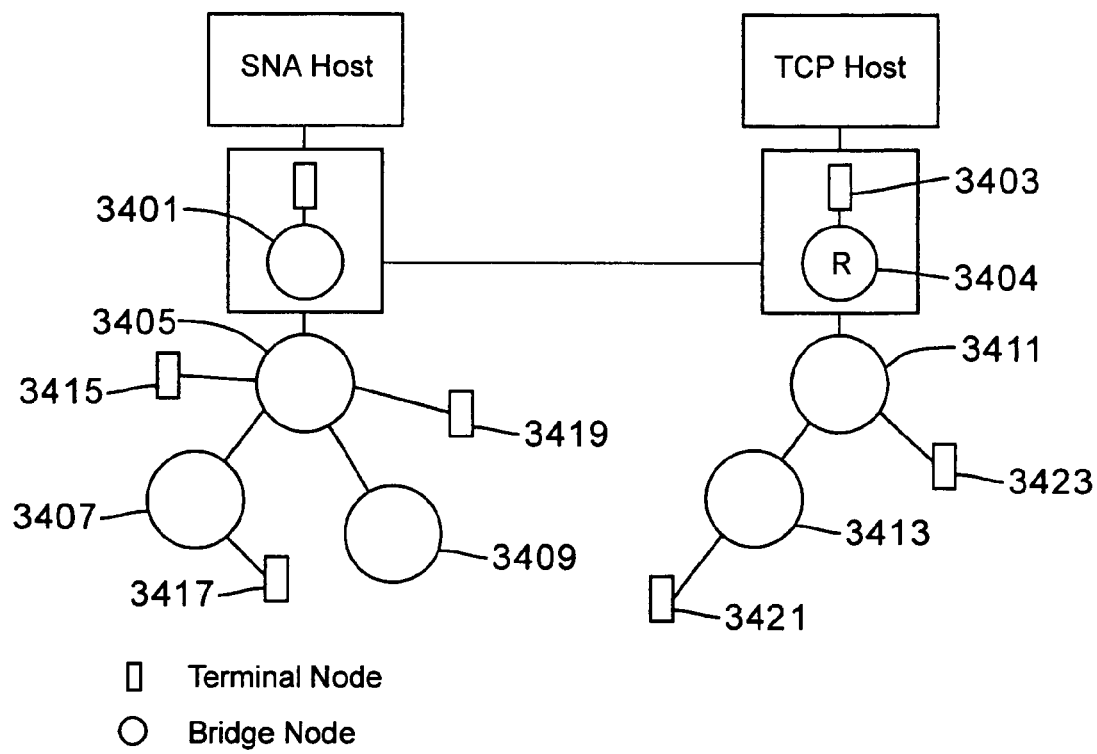
Figure 25:
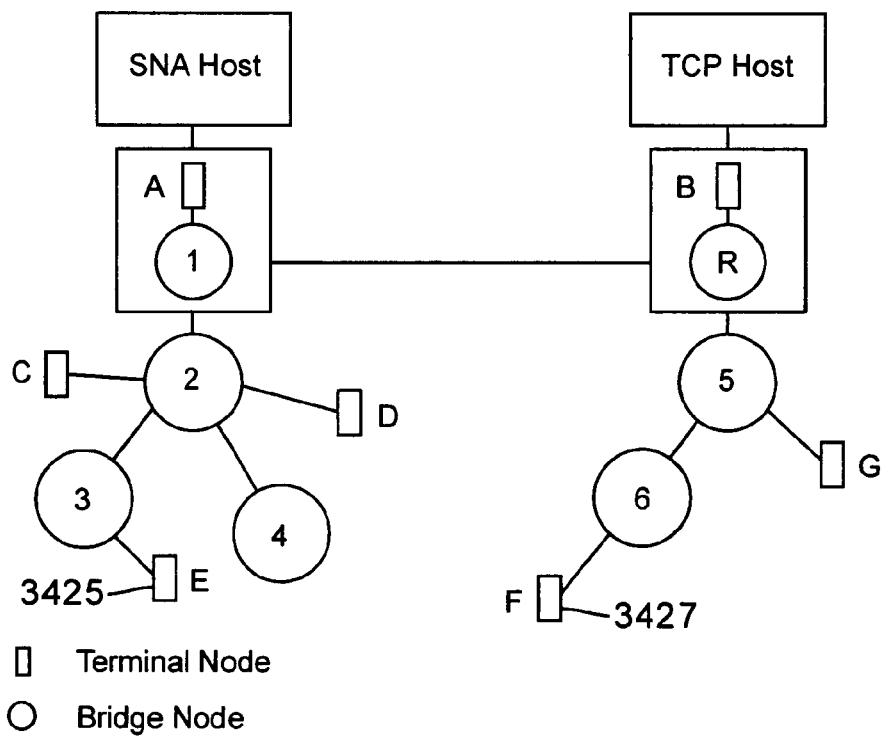
Figure 26:
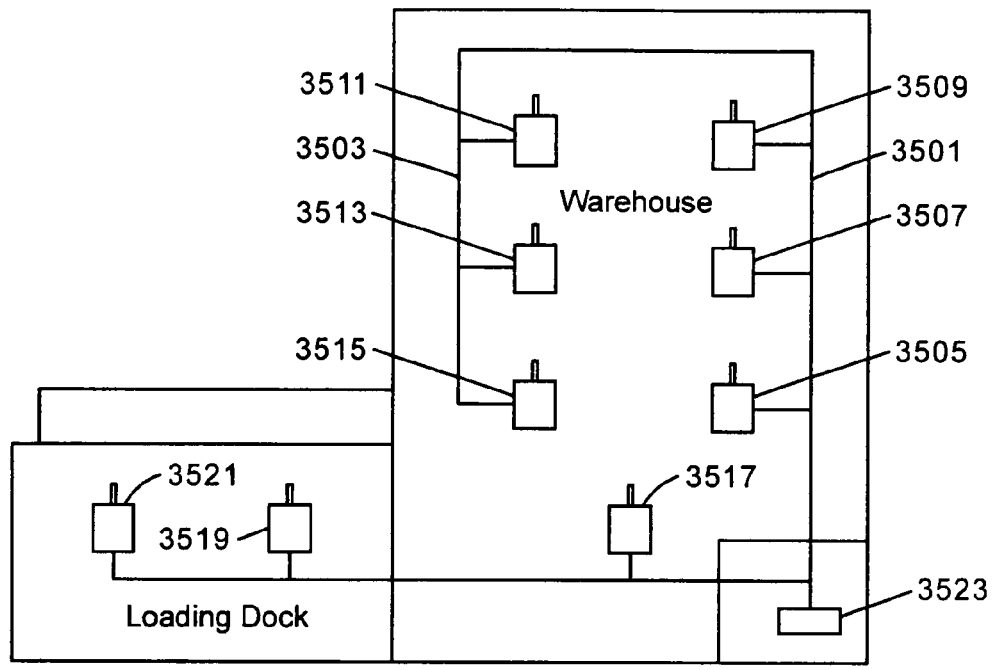
Figure 27:
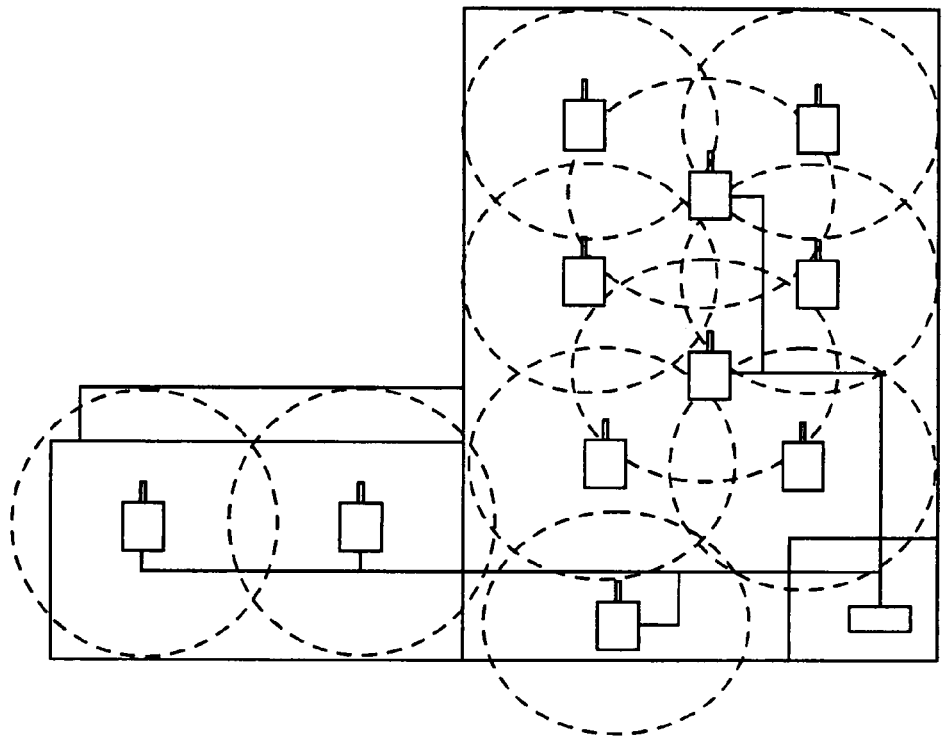
Figure 28:
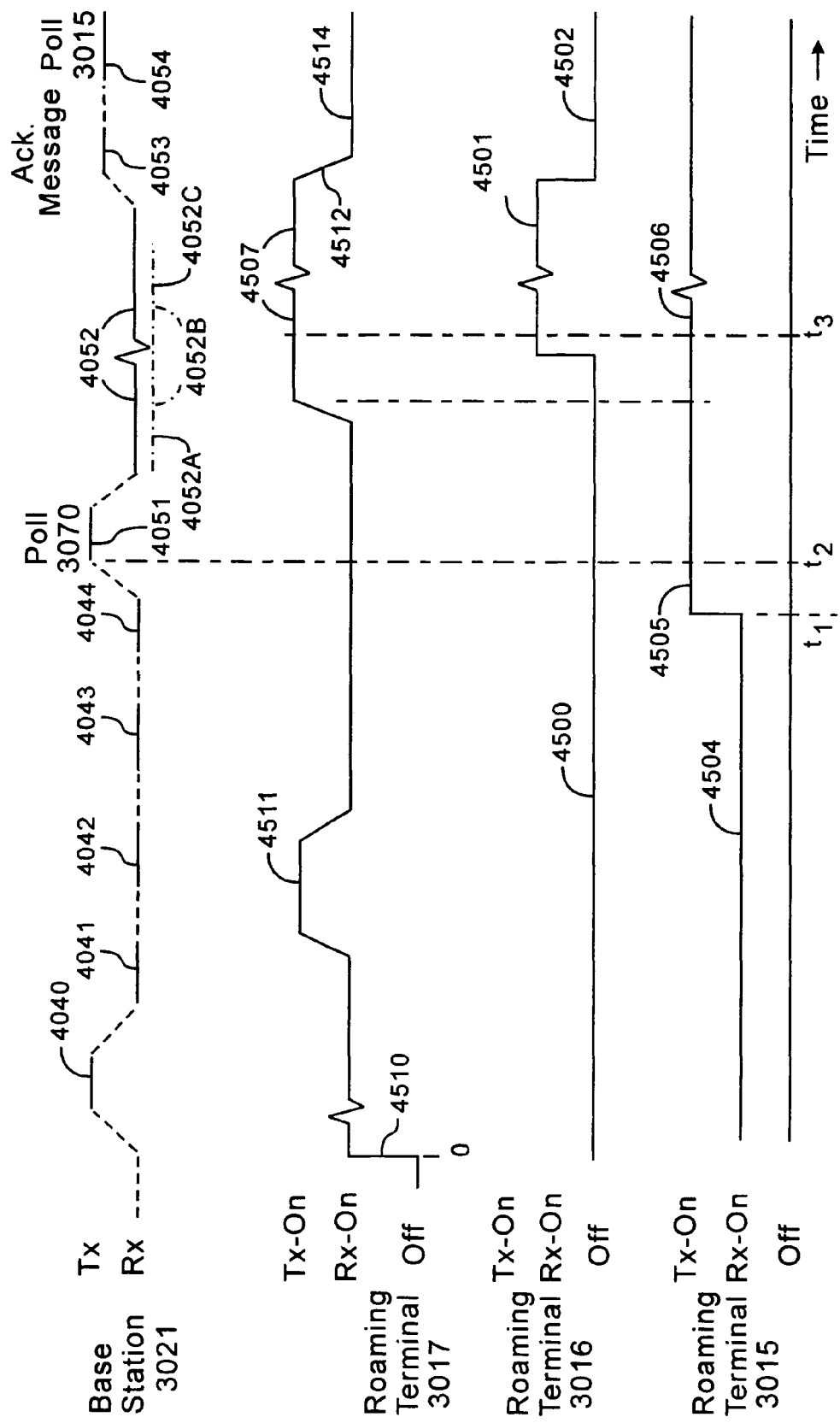
Figure 29:
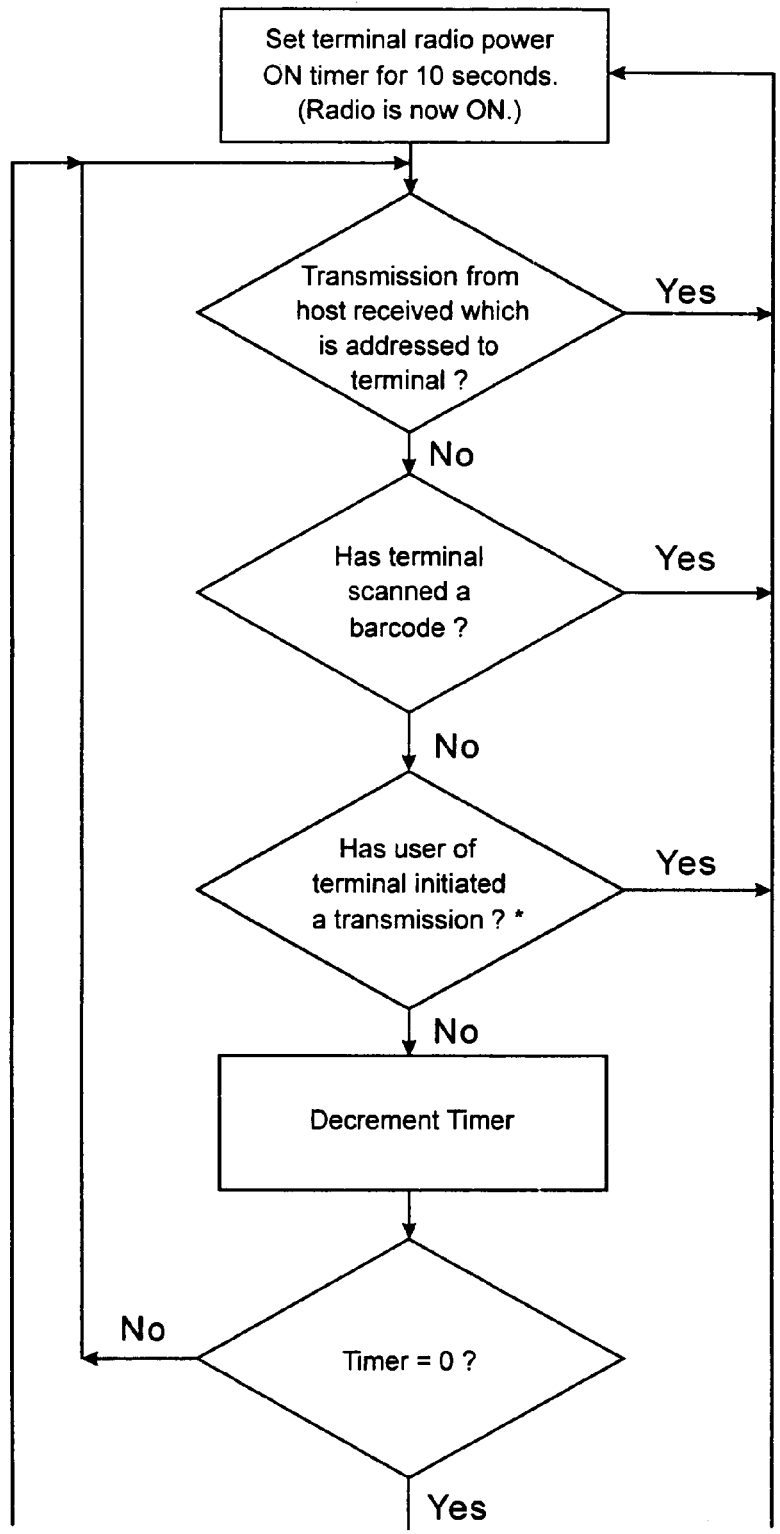
Figure 30:
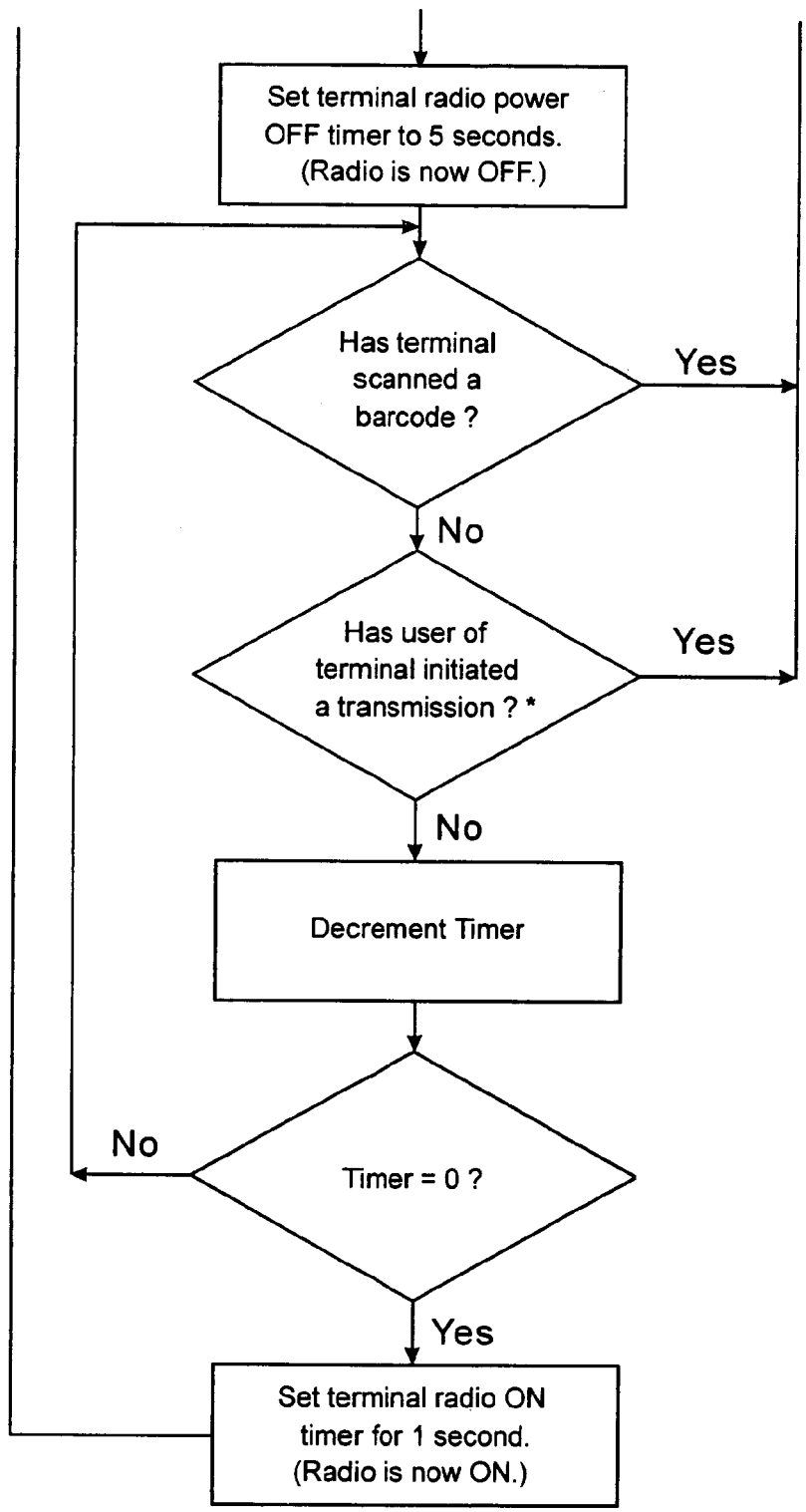

FIG. 19 is a timing diagram illustrating several possible communication exchanges between any base station and roaming terminal of FIG. 18;

FIG. 20 is a detailed view of a portion of the timing diagram shown in FIG. 19 which illustrates the interframe gap blocking function;

FIG. 21 is a block diagram of a redundant communication interface between several base stations and host computers of the present invention;

FIG. 22 illustrates the relationship between devices, nodes, terminal access points (TAP), network interface points (NIP) and network routing functions (NRF);

FIGS. 23 and 24 illustrate how physical devices are organized into logical nodes in a spanning tree;

FIG. 25 illustrates one example of direct routing used in the preferred embodiment;

FIG. 26 illustrates the SST Multi-drop LAN using "linear" topology;

FIG. 27 demonstrates how wireless routing can reduce the amount of wiring in a warehouse facility;

FIG. 28 illustrates an embodiment of a radio data communication system having roaming terminals which are periodically inactive and active (for power conservation) wherein a roaming terminal remains active when a signal from a base station is received, and remains active for a fixed time following conclusion of a communication session with a base station;

FIGS. 29 and 30 together comprise a flow chart showing a power saving standby or sleep mode feature of the roaming terminals.

DETAILED DESCRIPTION OF THE INVENTION

Figure 1:
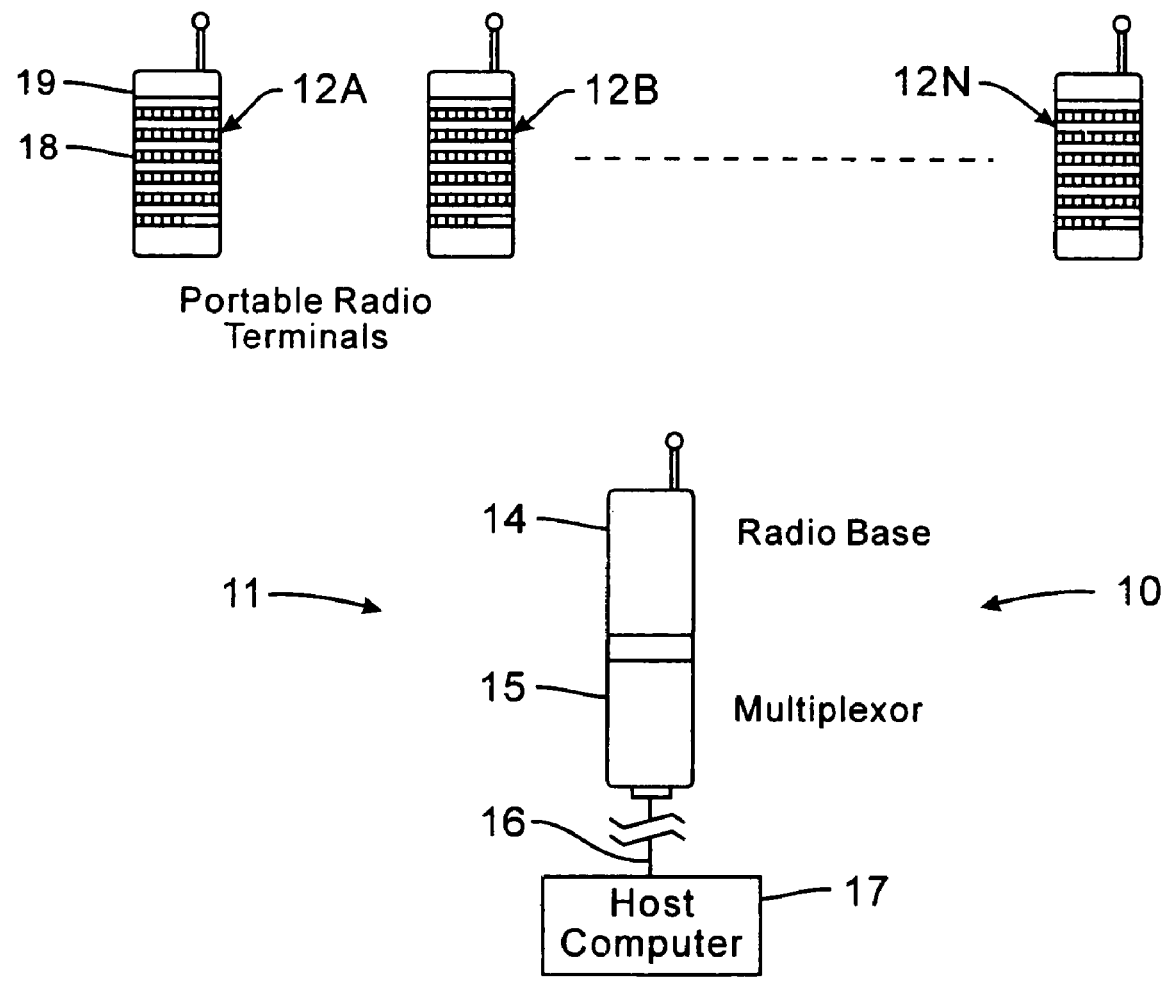
FIG. 1 is a block diagram of the prior art data communication system.

FIG. 1 shows an existing radio frequency data transmission system 10 wherein a base station transceiver means 11 has a number of mobile transceiver units such as 12A, 12B, . . . , 12N in radio communication therewith.

By way of example, the base station may be comprised of a radio base unit 14 such as the model RB3021 of Norand Corporation, Cedar Rapids, Iowa, which forms part of a product family known as the RT3210 system. In this case, the radio base 14 may receive data from the respective mobile RF terminals, e.g. of type RT3210, and transmit the received data via a network controller and a communications link 16 (e.g. utilizing an RS-232 format) to a host computer 17.

The data capture terminals 12A, 12B, . . . , 12N may each be provided with a keyboard such as at 18, a display as at 19, and a bar code scanning capability, e.g., via an instant bar code reader such as shown in U.S. Pat. No. 4,766,300 issued Aug. 23, 1988, and known commercially as the 20/20 High Performance Bar Code Reader of Norand Corporation.

Figure 2:
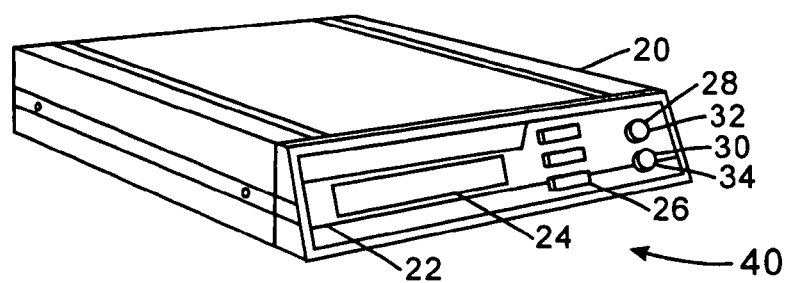
FIG. 2 is a perspective view of the intelligent network controller of the present invention.

FIG. 2 provides a perspective view of the invention 40 in the preferred embodiment case 20. Front panel 22 is provided with display 24 and select key 26, up key 28 and down key 30. Power indicator 32 comprises a low power green light emitting diode which is energized when power is supplied to the invention 10. Error condition indicator 34 is a yellow LED which is software controlled to be energized if the invention 10 is in error condition.

Figure 3:
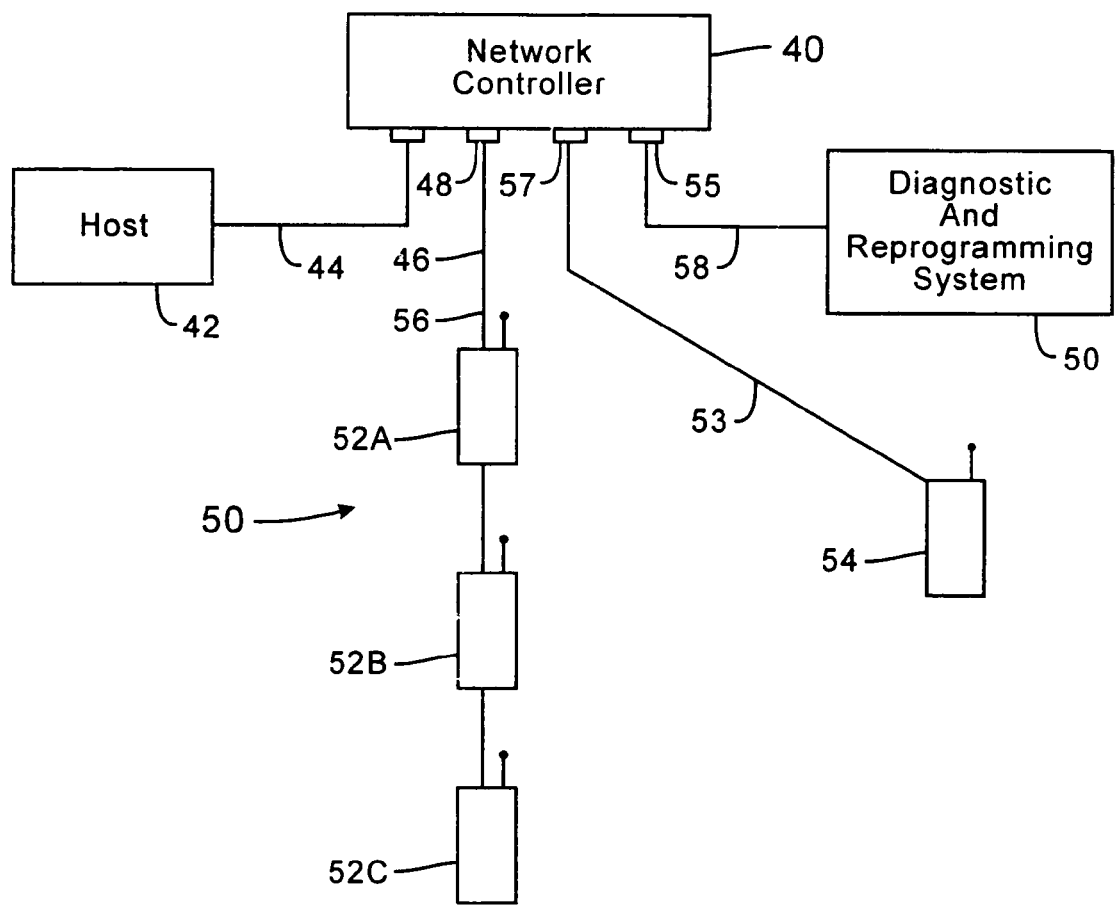
FIG. 3 is a schematic representation of an exemplary radio communication system utilizing the network controller.

FIG. 3 discloses a diagrammatic illustration of a radio communication system in accordance with the present invention. Invention network controller 40 is coupled to host computer 42 such that data may be interchanged between the devices over host communications link 44, which may be either in an RS232C format or selectively in an RS422 format. The host communication link 44 couples to controller 40 at host port 46.

First communication port 48 of controller 40 provides means for coupling of network 50 to controller 40. Network 50 comprises a number of base RF transceiver units 52A, 52B and 53B, each of which may be selectively employed in the radio frequency communication of data from mobile transceiver units. It is to be understood that base transceiver units 52 are designed and equipped to be operable in the exchange of data with network controller 40 over network link 56 such that each base transceiver unit 52A, 52B, or 53C may independently exchange data with network controller 40 through first communication port 48. When first communication port 48 is intended for operation with a network such as network 50 of base transceiver units 52A, 52B and 53C, for example, network controller 40 is selectively operated to provide an RS485 interface at first communication port 48. First communication port 48 may be alternately selected to operate as an RS232C interface, as an RS422 interface, as a proprietary NORAND® Radio One Node Network interface or as a high speed V.35 interface. The selection of interface to be provided at first communication port 48 is front panel controlled, that is, the user may operate front panel keys 28, 30 and 26 (See FIG. 2) to direct the proper interface to be provided at first communication port 48.

Base transceiver units 52A, 52B, and 52C are coupled to network link 56 by serial means, rather than parallel means, and each may be caused to transmit or to receive independently from the others while additionally being communicative with network controller 40 in a randomly chosen fashion.

It is further to be understood that interface translation is provided within controller 40 such that data communicated at first communication port 48 may be directed to host 42 at port 46 via properly chosen interface means as is required by the host 42 with which communication is intended.

Like first communication port 48, second communication port 57 may be internally switched among interface choices of these types: RS232C, RS422, V.35, RS485 and proprietary NORAND® Radio One Node Network interface. In the illustrated arrangement of FIG. 3, for example, second communication port 57 is coupled over third link 53 to previously installed base transceiver 54, which heretofore had been used in a prior art system as is illustrated in FIG. 1. Because of limitations of base transceiver 54, it must communicate via RS232C interface format and therefore, second communication port 57 must be selected to operate in RS232C interface mode. However, when second communication port 57 is desired to communicate with a network via RS485 interface, front panel keys 26, 28 and 30 may be manipulated by the user to provide the RS485 interface availability at second communication port 57. Likewise, second communication port 57 may be selected to operate as an RS422 interface, as a V.25 interface, or as the proprietary NORAND® Radio One Node Network interface.

Diagnostic port 55 provides a fourth communication pathway for network controller 40, providing an asynchronous port operable at 300 to 19,200 baud as an RS232C interface. When desirable, diagnostic port 55 may be coupled by diagnostic link 58 to diagnostic device 60 for purposes of error diagnosis of controller 40 by diagnostic device 60, or for reprogramming of memory devices within controller 40 when desired. It is contemplated that diagnostic device 60 comprises a 16-bit microprocessor commonly known as a personal computer or "PC". The mode of coupling between diagnostic device 60 and network controller 40 may be direct or through remote means by use of a modem.

Figure 4:
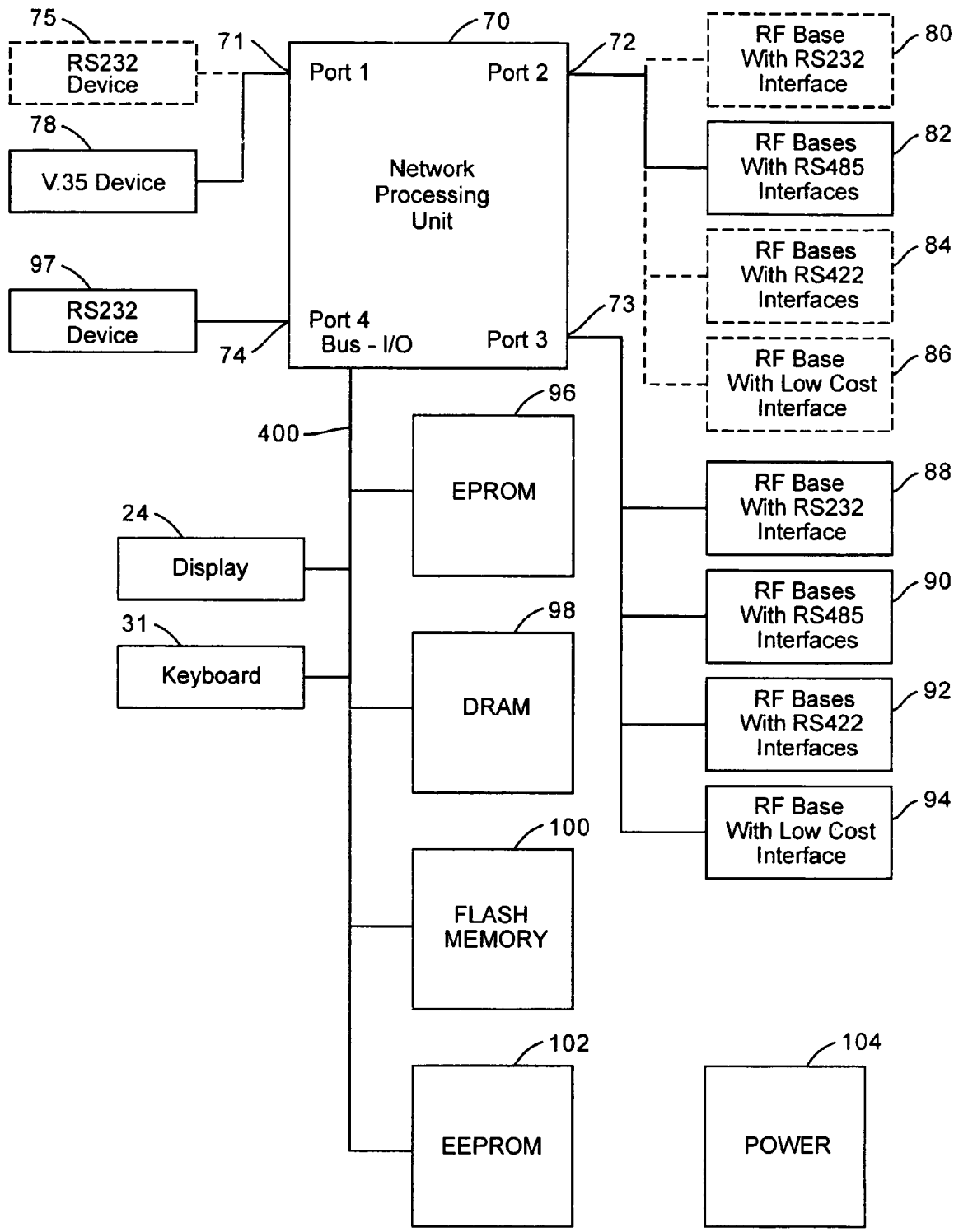
FIG. 4 is a diagrammatic illustration of the control circuitry elements of the network controller.

Referring now to FIG. 4, a central processing unit 70 is provided with at least four data communication ports, illustrated at numerals 71, 72, 73, and 74. First data communication port 71 may be selectively coupled to RS232 interface member 76 or V.35 interface member 78. The choice of whether RS232 interface member 76 or V.35 interface member 78 is chosen is dependent upon the operating characteristics presented by the host computer, such as host computer 42 of FIG. 3, with which network controller 40 will communicate. The choice of whether first communication port 71 is coupled to interface member 76 or to interface member 78 depends on the front panel selection made by the user by keys 26, 28, and 30 shown in FIG. 2.

Second communication port 72 may be selectively coupled to RS232 member 80 or to RS485 interface member 82 or to RS422 interface member 84 or to NORAND® Radio One Node Network proprietary interface member 86. By use of front panel keys 26, 28, and 30 of FIG. 2, the user may select second communication port 72 to be coupled to any one of interface members 80, 82, 84, and 86.

Third communication port 73 is identical to second communication port 72 in functionality, being selectively couplable to RS232 interface member 88, to RS485 interface member 90, to RS422 interface member 92 or to NORAND® Radio One Node Network proprietary interface member 94.

In the preferred embodiment of the invention 40, central processing unit 70 of FIG. 4 comprises a Motorola™ 68302 integrated chip cooperative with an application specific integrated circuit. Central processing unit 70 employs novel features allowing the bidirectional use of a data communicative line of the Motorola™ 68302 chip and a single clock signal line to eliminate the need for coder-decoder members to be associated with the Motorola™ 68302 chip while allowing the use of only one pair of signal wires to be coupled to the RS485 interfaces 82 and 90 of FIG. 4.

Fourth communication port 74 of central processing unit is coupled to asynchronous RS232 interface member 97 to be available for interconnection of a diagnostic device therewith.

Also coupled to central processing unit 70 are display member 24 and keyboard member 31 with which keys 26, 28, and 30 of front panel 22 (FIG. 2) are interactive.

Memory elements including EPROM element 96, DRAM unit 98, FLASH memory unit 100 and EEPROM element 102 are intercoupled with each other and with central processing unit 70.

Power supply member 104 is selectively attachable to invention network controller 40. In order to avoid the necessity of different models of network controller 40 depending on the local electrical power utility's operating characteristics, power supply 104 is provided in optional models depending on the country in which it is to be used, power supply 104 being capable of providing satisfactory output power to network controller 40 regardless of the voltage or frequency of the input source provided to power supply 104.

Figure 6:
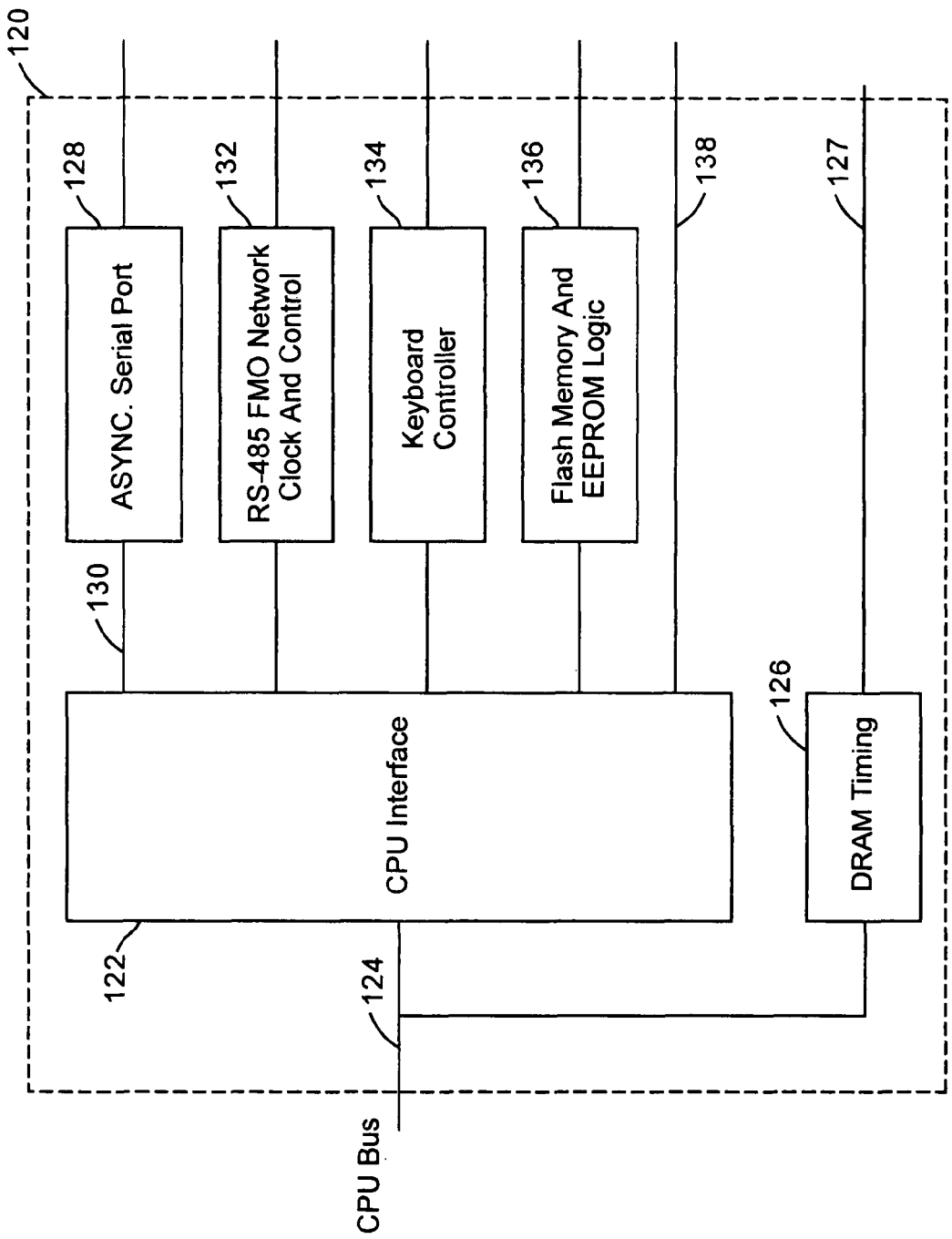
FIG. 6 is a diagrammatic illustration of the application specific integrated circuit of the network controller.

The application specific integrated circuit (ASIC) used in the invention network controller 40 is disclosed in FIG. 6 and is identified by the numeral 120. ASIC 120 comprises a central processor unit interface 122 member which is coupled to the central processor unit bus by CPU bus link 124 which extends from ASIC 120. Also coupled to the CPU bus link 124 is dynamic random access memory (DRAM) timing element 126, which provides network controller 40 with timing signals for the DRAM member 98 illustrated in FIG. 4 when memory refresh of the DRAM 98 is indicated. DRAM timing element 126 is also coupled exteriorly to the ASIC 120 to DRAM member 98 by DRAM link 127.

Central processing unit interface 122 is coupled to asynchronous signal processing element 128 by signal path 130. Asynchronous signal processing element 128 comprises a baud rate generator cooperative with a universal asynchronous receiver-transmitter.

Also coupled to central processing unit interface 122 is network clock and control member 132 which comprises a programmable network clock generator which can be selectively programmed to generate an optional clock speed for a network to be coupled through RS485 interfaces 82 and 90 seen in FIG. 4. Network clock and control member 132 also provides detection means for detections of failure conditions on a linked network and provides control signals to system components in response thereto, including interrupt signals to programmable interrupt coordinator circuitry included in central processing interface 122. Network clock and controller member 132 provides data encoding by the FMO standard, then the encoded data may be operated upon by RS485 interfaces 82 and 84 and transmitted and received by single twisted pair means to multiple serially networked base transceiver units exemplified by base transceiver unit 52A, 52B, and 52C illustrated in FIG. 3.

Keyboard controller element 134 is coupled to central processing unit interface and provides a link exterior to ASIC 120 to keyboard 31 (See FIG. 3).

FLASH memory/EEPROM logic control member 136 is coupled to central processing unit interface 122 and comprises control functions for FLASH memory element 100 and EEPROM memory element 102 of FIG. 3.

Central processing unit interface 122 is also coupled by line 138 to latches exterior to ASIC 120.

It is to be understood that the base transceiver units 52A, 52B, and 52C illustrated in FIG. 3 are communicative with mobile transceiver units by electromagnetic radio means. The mobile transceiver units may be associated with bar code scanning devices such as the NORAND® 20/20 High Performance Bar Code Reader whereby the scanning devices scan an object having a bar code associated therewith and collect information stored in the bar code, which information is then transmitted through the mobile transceiver units to base transceiver units such as base transceiver units 52A, 52B, and 52C or base transceiver unit 54 of FIG. 3. The bar code data received by said base transceiver units is then transmitted in the example of FIG. 3, over network 50 by base transceiver units 52A, 52B, or 52C, or over link 53 by base transceiver unit 54, to network controller 40 which performs the routing and delivery of the data to the stationary data processor, or processors, such as shown for example, by host 42 of FIG. 3.

Description of FIGS. 7 through 11

Figure 7:
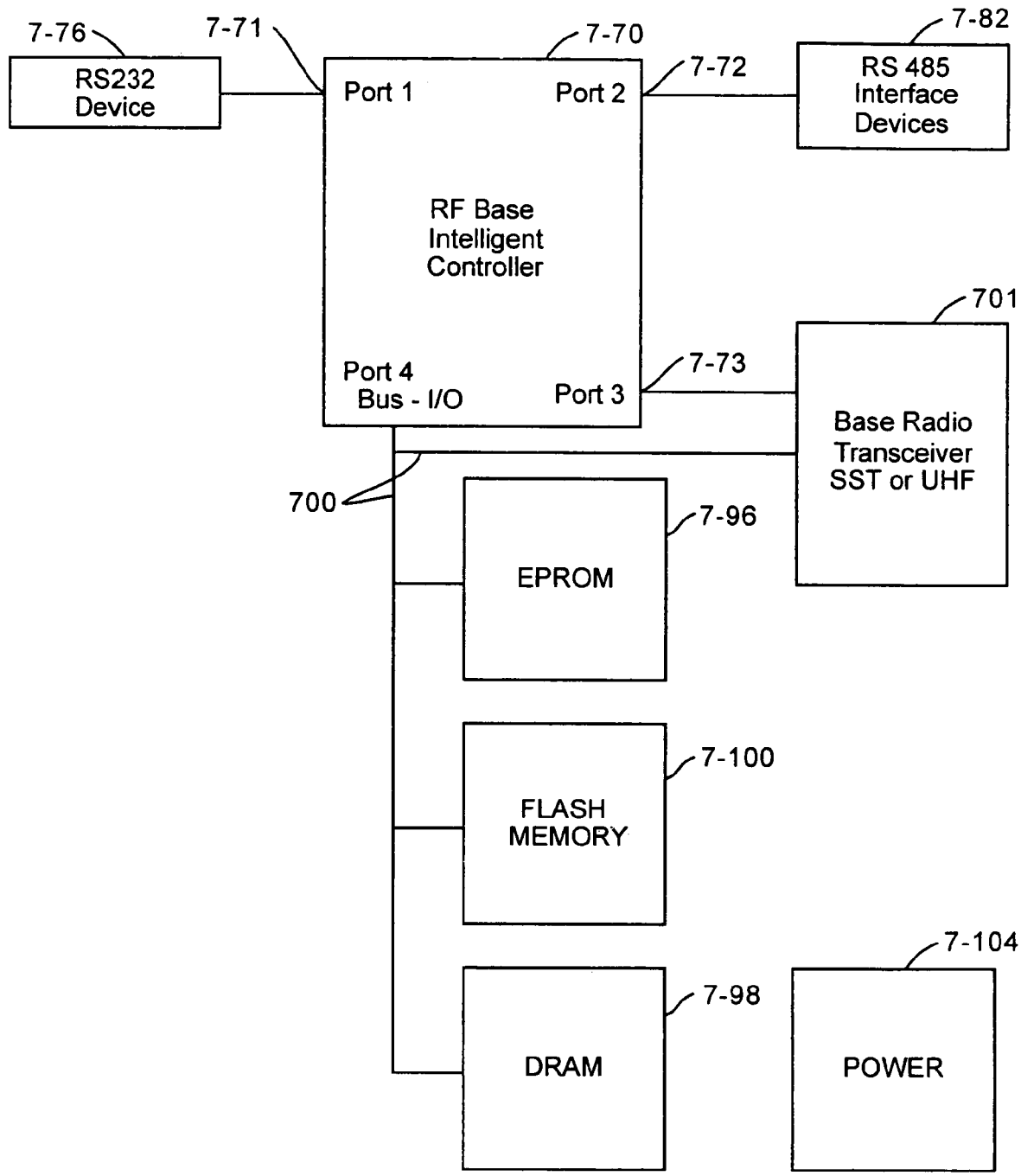
FIG. 7 is a block diagram showing an exemplary implementation of intelligent network controller and router transceiver units such as the network transceiver units of FIG. 3.

FIG. 7 shows a block diagram of a particularly preferred intelligent base transceiver unit known as the RB4000. It will be observed that the components correspond with components of the network controller of FIG. 4, and similar reference numerals (preceded by 7-) have been applied in FIG. 7. Thus, the significance of components 7-70 through 7-73, 7-76, 7-82, 7-96, 7-98, 7-100 and 7-104 will be apparent from the preceding description with respect to FIGS. 4 and 6, for example. I/O bus 700 may be coupled with a spread spectrum transmission (SST) or ultra high frequency (UHF) transceiver 701 which may correspond with any of the transceivers of units 52A, 52B, 52C or 54 previously referred to. The network controller 70 could have a similar RF transceiver coupled with its data port 72 or 73 and controlled via input/output bus 400, e.g. for direct RF coupling with router transceivers such as 901, 901, FIG. 9.

Figure 8:
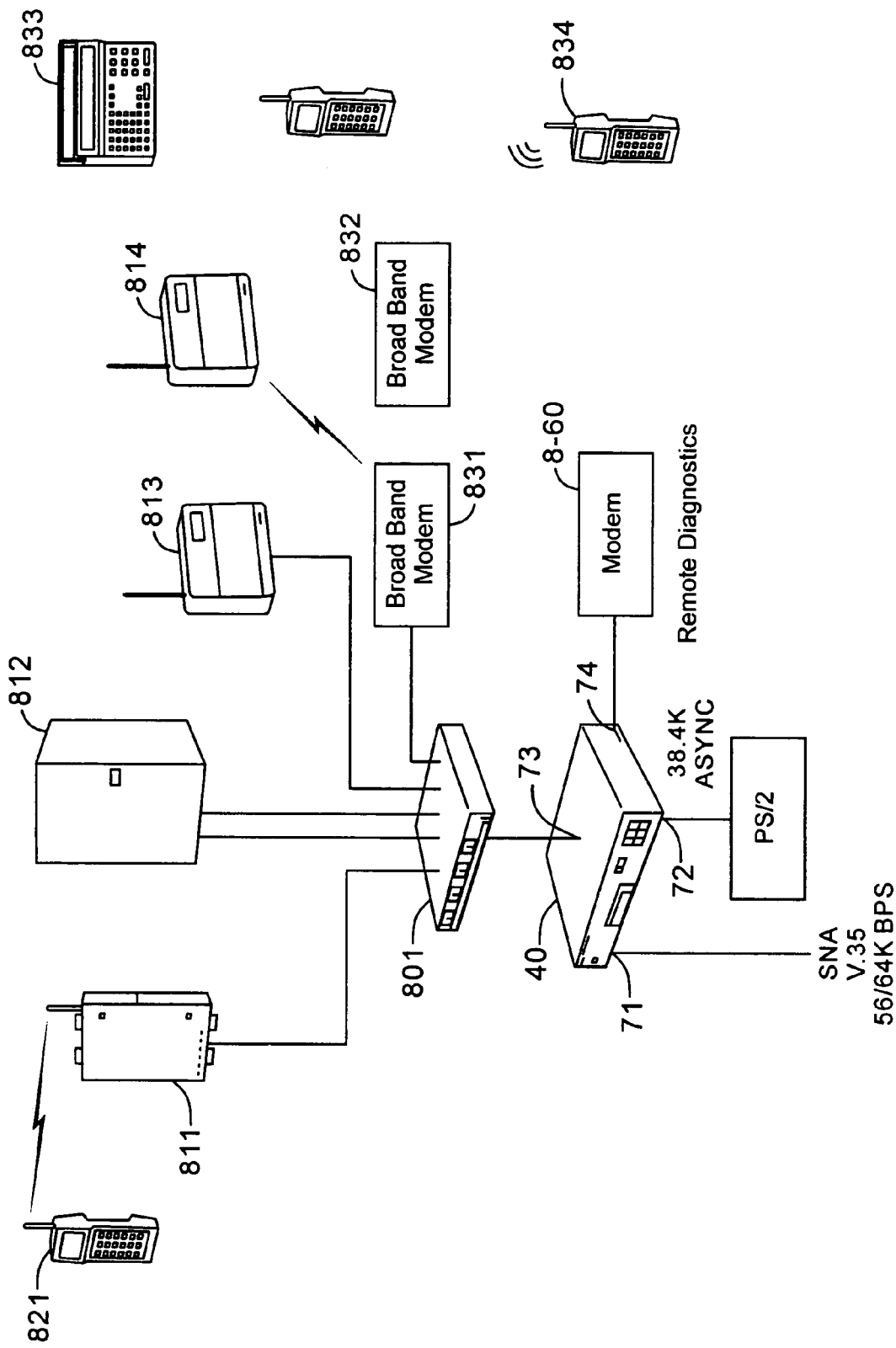
FIG. 8 is a diagram of an RF system utilizing a network controller according to FIGS. 2-6, with one of its network ports configured for communication with a second host, and another of its ports coupled with a multiplicity of RF transceivers via an adapter unit.

Referring to FIG. 8, a network controller 40 is shown with port 71 configured for interface with a host port type SNA V. 35 56K/64K bits per second. Port 72 is shown as configured for communication with a personal computer of the PS/2 type operating asynchronously at 38.4K bits per second. Port 74 is coupled with a modem 8-60 providing for remote diagnostics and reprogramming of the network controller 40.

Port 73 of network controller 40 is shown as being connected with an adapter component 801 known as the MBA3000. A specification for the MBA3000 if found in APPENDIX A following this detailed description. In the operating mode indicated in FIG. 8, the adapter 801 serves to couple controller 40 sequentially with four radio base transceiver units such as indicated at 811 through 814. Component 811 is a commercially available radio base known as the RB3021 which utilizes features of Sojka U.S. Pat. No. 4,924,462 and of Mahany U.S. Pat. No. 4,910,794 both assigned to the present assignee, and the disclosures of which are hereby incorporated herein by reference in their entirety. Base station 811 may communicate with a multiplicity of hand-held RF data terminals such as indicated at 821. Details concerning base transceiver units 812 and 813, 814 are found in the attached APPENDICES B and C, respectively. Base 814 is indicated as being coupled with the adaptor 801 via RF broadband modems 831 and 832. Base units 813 and 814 may communicate with a variety of mobile transceiver units such as those indicated at 833 and 834 which are particularly described in APPENDICES D and E.

Figure 9:
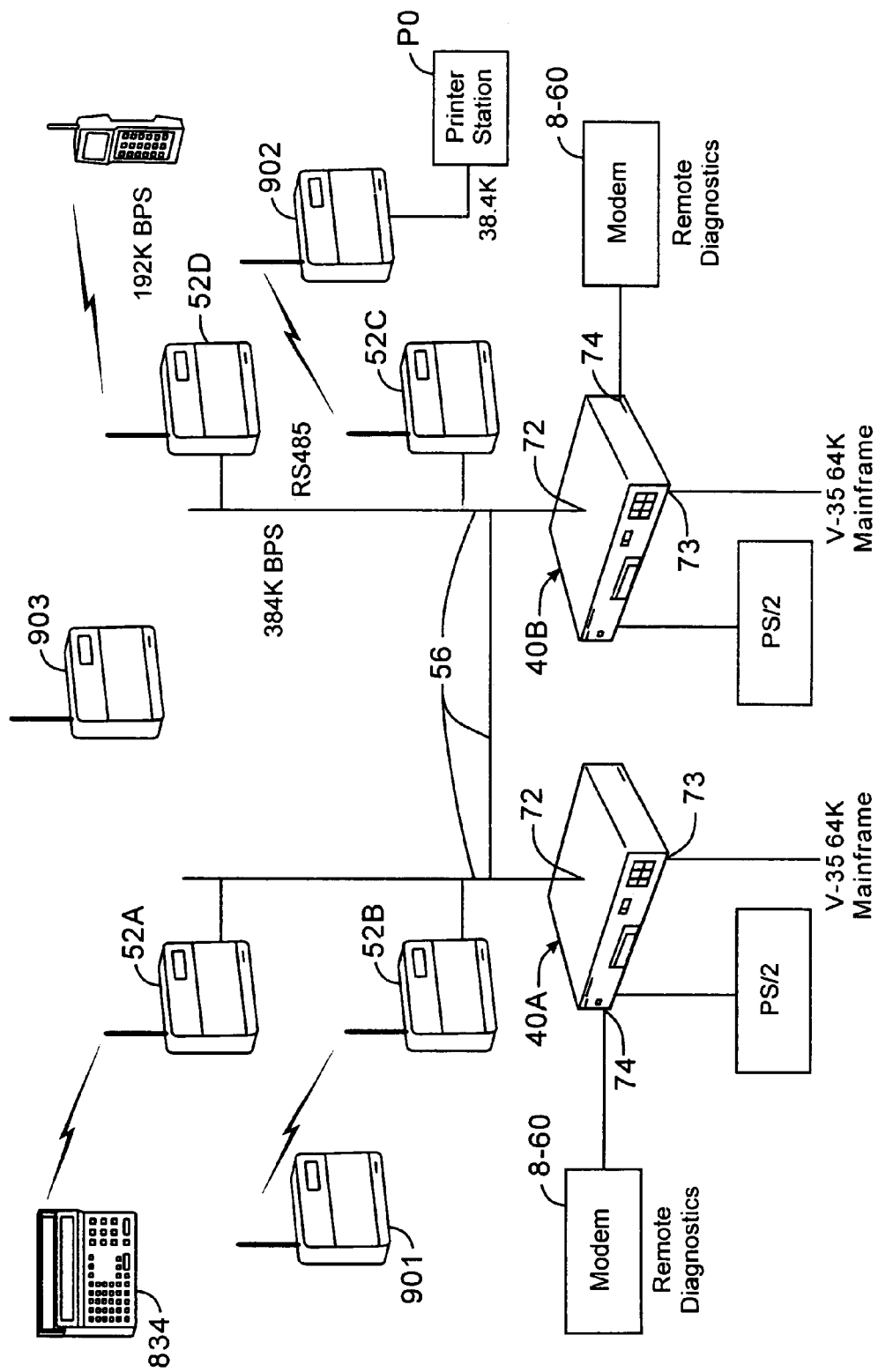
FIG. 9 is a diagram illustrating the use of two network controllers according to FIGS. 2-6, configured for dual host computers each, and having their relatively high data rate extended distance network ports coupled with a multiplicity of intelligent network and router transceiver units implemented according to FIG. 7.

FIG. 9 shows two network controllers 40A and 40B each with its host ports configured as with the controller 40 of FIG. 8. In this example, the second ports 72 of the controllers 40A and 40B are configured for communication a relatively high data rate relatively along a distance network channel 56 which may have the characteristics of the serial channel 56 of FIG. 3, for example, an RS485 channel operating at 384 kilobits per second (384K bps). Network base transceivers 52A, 52B and 52C may correspond with the correspondingly numbered transceiver units of FIG. 3, for example, and the network may have additional network transceivers such as 52D. Furthermore, the network transceivers may have RF coupling with router transceiver units such as indicated at 901, 902 and 903. Router transceiver unit 902 is illustrated as a RB4000 intelligent transceiver such as represented in FIG. 7 and having its input/output bus 700 coupled with a peripheral.

Figure 10:
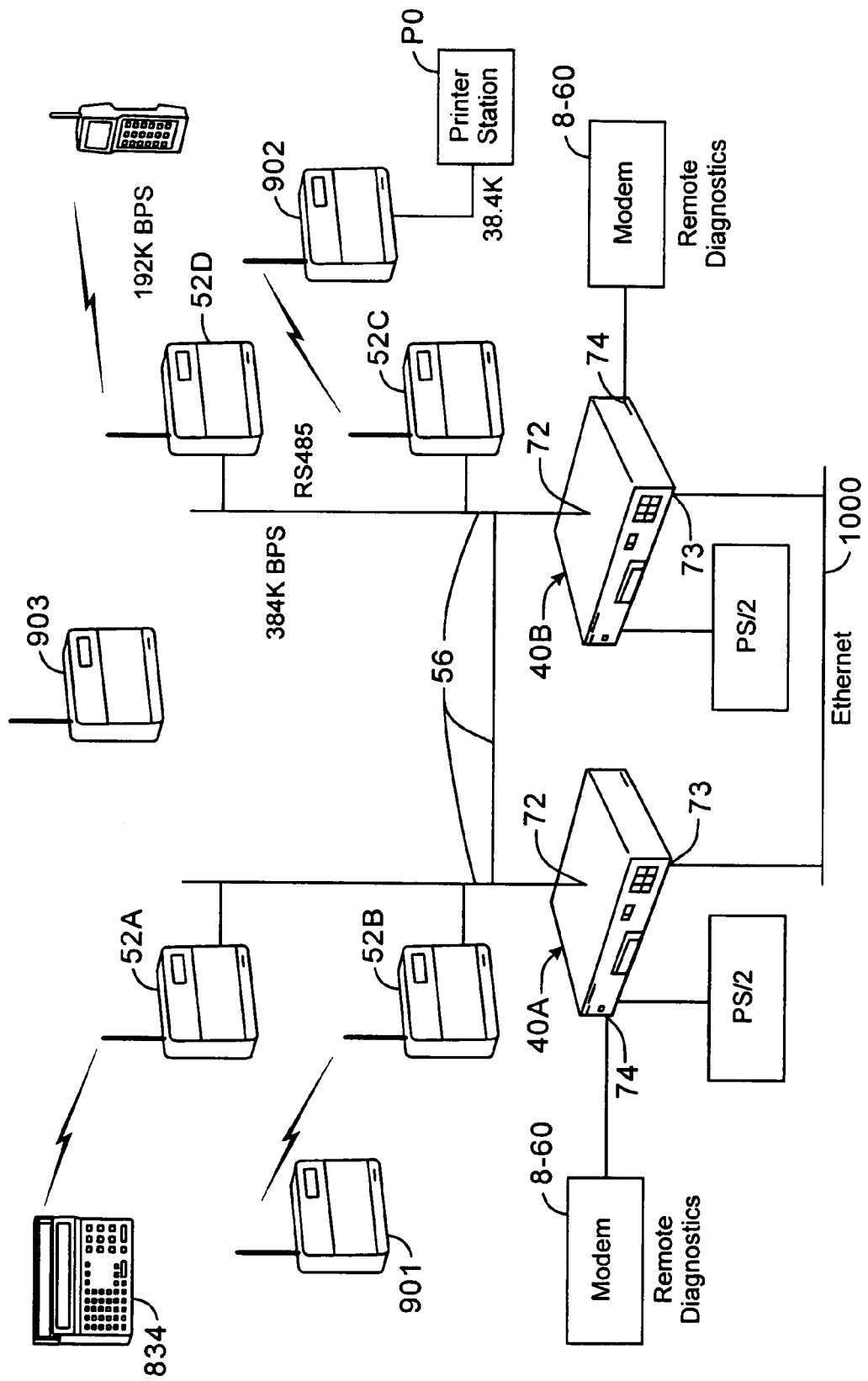
FIG. 10 is a diagram similar to FIG. 9 but showing the pair of coupled network controllers interfaced to a common relatively high data rate system having multiple hosts (e.g.) a local area network of the Ethernet type or equivalent e.g. fiber optic type.

FIG. 10 is entirely similar to FIG. 9, for example, except that ports 72 of the controllers 40A and 40B are coupled with separate serial type high data rate network channels, and ports 73 of the respective network controllers are coupled to a very high speed network e.g. in the megabit per second range such as an Ethernet local area network 1000. Suitable interfaces are indicated at 1001 and 1002.

Figure 11:
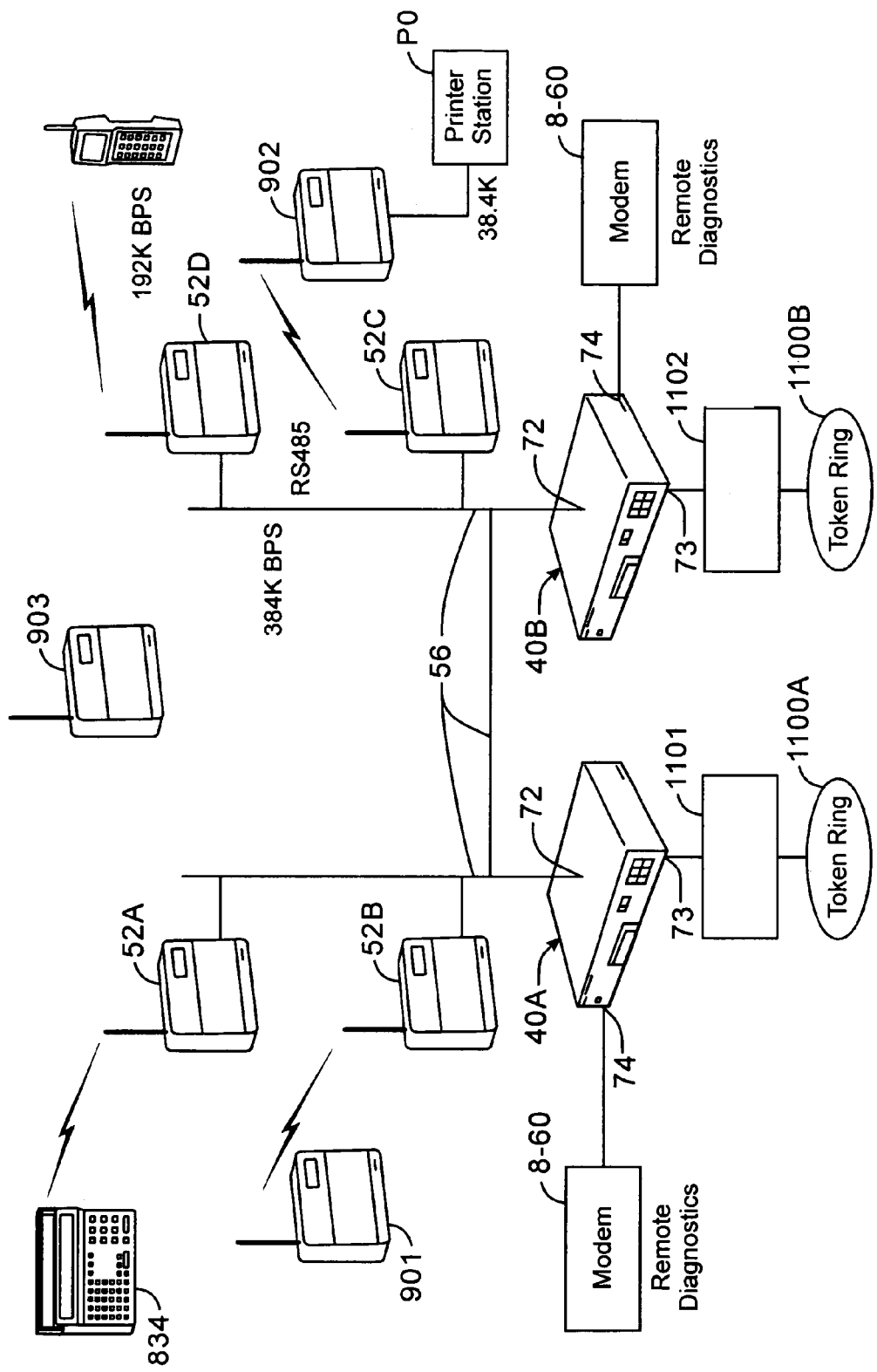
FIG. 11 is a diagram similar to FIG. 10 but indicating the network controllers being coupled to respective different high data rate multiple host systems (e.g., token ring type local area networks or other individual networks e.g., fiber optic loop networks of the collision-sense multiple-access type).

FIG. 11 is entirely similar to FIG. 9 except that the ports 73 of the network controllers 40A and 40B are coupled with respective local area ring type networks which may be separate from each other and each have two or more hosts such as represented in FIG. 9 associated with the respective ring networks such as token rings 1100A and 1100B. Suitable interface means are indicated at 1101 and 1102.

Figure 12:
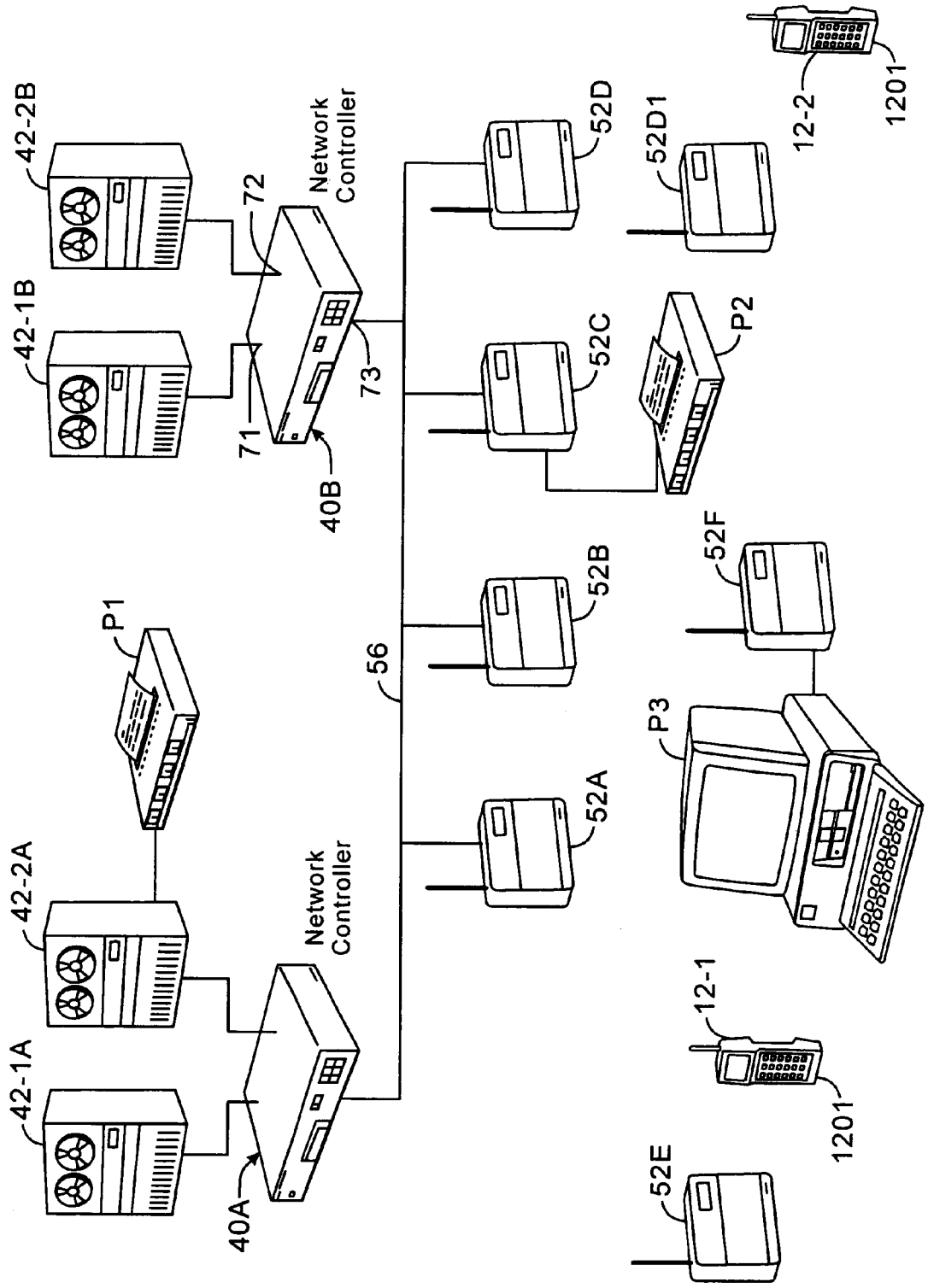
FIG. 12 is a view similar to FIG. 9 but intended to diagrammatically indicate a distribution of network and router transceivers and other elements of an on-line RF data collection system over an extensive area of a facility e.g. of one of the types previously mentioned.

Description of FIG. 12

FIG. 12 shows, for example, two network controllers 40A and 40B, each with two host computer units such as 42-1A. Host 42-2A is shown with a printer or other peripheral P1 which may generate bar codes, for example, for replacement of damaged bar codes or the like. Another printer P2 is shown associated with base 52C, again for example, for producing bar code labels where those are needed in the vicinity of a base station. In a large warehouse, relatively large distances may be involved for a worker to return to a printer such as P1 to obtain a new bar code label. Thus, it may be very advantageous to provide a printer P2 at the base station 52C which may be relatively close to a processing location which requires printed labels, e.g. a processing location in the vicinity of hand-held terminal 12-2 in FIG. 12. A base 52F may have a peripheral P3 associated therewith such as a large screen display, a printer or the like which may supplement the capabilities of a hand-held terminal, for example printing out new bar code labels at a convenient location, or providing a full screen display, rather than the more limited screen display area of the hand-held terminal 12-2.

If, for example, a base radio 52D which might be located at the ceiling level of a warehouse became inoperative at a time when qualified repair personnel were not immediately available, with the present system it would be feasible to provide a substitute base radio or base radios, for example, as indicated at 52D1 located at table level or the like.

With the present system, the base radio stations do not necessarily forward data communications received from a given terminal to a particular host. For example, hand-held terminal 12-2 may request a path to printer P2, and such a path may be created via base stations 52D1 and 52C. Station 52C upon receipt of the message form terminal 12-2 would not transmit the message to a host but would, for example, produce the desired bar code label by means of printer P2. Further, terminal 12-2 may have provision for digitizing a voice message which might, for example, be addressed to terminal 12-1. The system as illustrated would be operable to automatically establish a suitable path for example, via stations 52D1, 52C, 52B, 52E and 12-1 for the transmission of this voice message in digital form. Successive segments of such a voice message would be stored, for example, by the terminal 12-1, and when the complete message was assembled, the segments would be synthesized into a continuous voice message for the user of terminal 12-1 e.g. by means of a speaker 1201 also useful for sending tone signals indicating valid bar code read, etc.

In accordance with the present invention, a hardware system such as illustrated in FIG. 12 may be physically laid out and then upon suitable command to one of the network controllers such as 42-2B, the entire system would be progressively automatically self-configured for efficient operation. For example, controller 40B could successively try its communications options with its output ports such as 71-73, determining for example, that host processors were coupled with ports 71 and 72, one operating on a 38.4 kilobit per second asynchronous basis and the other presenting a SNA port for the V.35 protocol at 64 kilobits per second. For example, on host, 42-1B might be a main frame computer, while the other host 42-2B might be a PS/2 type computer system. The controller 40B having thus automatically configured itself so as to be compatible with the devices connected to ports 71 and 72, could proceed to transmit via port 73 a suitable inquiry message to the network channel 56. Each of the base stations could operate, for example, on a collision-sense multiple-access (CDMA) basis to respond to the inquiry message from the controller 40B, until each of the successive bases on the network had responded and identified itself. Each base, for example, would have a respective unique address identification which it could transmit in response to the inquiry message so as to establish its presence on the network.

The controller 40B could then transmit auto configure commands to the successive bases in turn, instructing the bases to determine what peripherals and router bases such as 52D1, 52E and 52F were within the range of such base, and to report back to the controller. For example, bases such as 52C and 52F could determine the nature of peripherals P2 and P3 associated therewith so as to be able to respond to an inquiry form a terminal such as 12-2 to advise the terminal that a bar code printer, for example, was within direct RF range.

In the case of a breakdown of a component of the system such as 52D, it would merely be necessary to place a router device such as 52D1 at a convenient location and activate the unit, whereupon the unit could send out its own broadcast inquiry which, for example, could be answered by the base stations 52C and 52F, station 52C in turn, advising a relevant host or hosts of the activation of a substitute router station. Thus, the system is conveniently re-self-configured without the necessity for a technician familiar with the particular configuration procedure. As another example, where the base stations are operating utilizing spread spectrum transmission, the introduction of barriers (such as a new stack of inventory goods) to such transmission between a given base such as 52A and various terminals, could result in the base 52A contacting router and 52E, for example, with a request to become active with respect to the blocked terminals.

Figure 13:
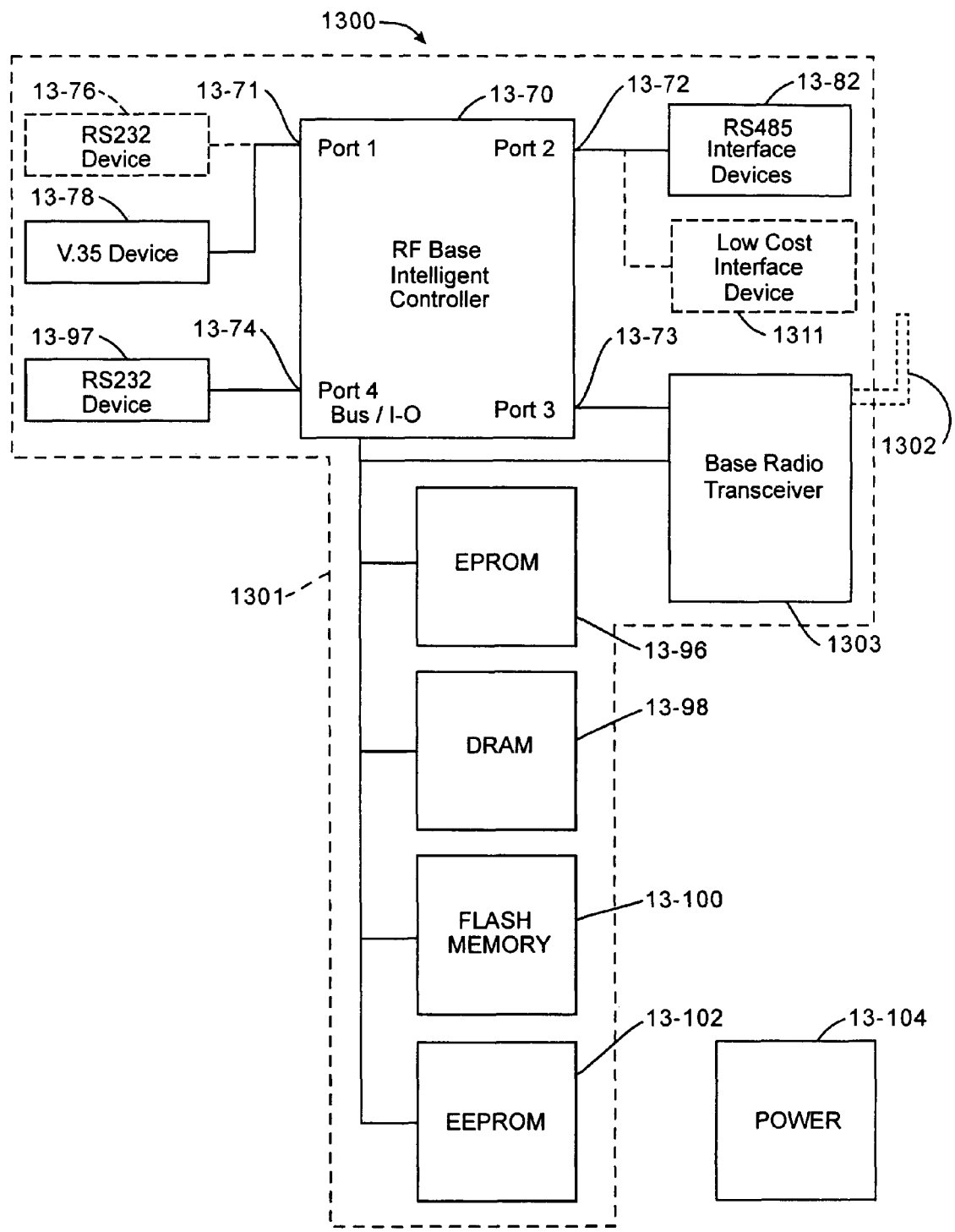
FIG. 13 shows an intelligent controller and radio base unit which unifies controller and radio components such as shown in FIG. 7 into a single housing of the size represented in FIGS. 2 and 5.

Description of FIG. 13

FIG. 13 shows and intelligent integrated controller and radio base unit 1300 which is integrated into a single housing or case 1301 corresponding to the case or housing 20 of FIG. 2. the housing 1301 may be provided with an external antenna as diagrammatically indicated at 1302 with suitable RF coupling to the radio circuitry indicated at 1303. Components 13-70 through 13-74, 13-76, 13-78, 13-96, 13-97, 13-98, 13-100, and 13-102 may correspond with the correspondingly numbered components described with reference to FIG. 4.

Supplementary Discussion

In accordance with the present disclosure, a network controller, or integrated network controller and radio unit is coupled to one or more host computers via a standard interface such as commonly encountered in practice (e.g. RS232, V. 35, Ethernet, token ring, FDDI, and so on). In this way, no specialized interface or adapter is required for the host.

Since the preferred network controller can connect to two hosts, if one host is detected to have failed, or in the event of a system crash, loss of communication link, or the like, the network controller can automatically switch to the second host. The second host may be a truly redundant system, or may be a simpler computer of the PC type (a so-called personal computer) that can simply store transactions until the main host is restored. As another example, a single host may have a second port coupled to a second port of the controller especially if a communication link failure may be a problem. For example, two ports of the network controller may be coupled by separate modems with separate phone lines, leading to separate ports of a single mainframe computer, for example an IBM3090. In a fully redundant system, two ports of a network controller may be connected respectively to two mainframe computers such as the IBM3090.

The disclosed network controller can also connect one radio network to two hosts using RS232 or V.35 ports or to many hosts using a local area network such as Ethernet, token ring, or FDDI. A number of the disclosed network controllers (for example, up to thirty-two) can be connected together to interface many hosts to a single radio network. The hand-held portable terminals in such a network can then talk to any of the hosts they choose.

For example where one port of the disclosed network controller is coupled via its RS232 interface to a mainframe computer such as the IBM3090, another of its ports may be coupled via an FDDI network with a super computer e.g. the Cray X-MP. Then mobile and/or portable terminals can access either the main frame or the super computer, or in general, any of the hosts that are connected to the network controller.

As indicated in FIG. 9, four hosts can be on one network. Referring to FIGS. 10 and 11, a multiplicity of hosts may be coupled with each local area network so as to be in communication with one or more of the disclosed network controllers. Furthermore, a single disclosed network controller can control two radio networks such as the one indicated at 50 in FIG. 3. Where each network such as 50 is limited to thirty-two devices, the number of devices is doubled with the use of two radio networks. Two such radio networks may also be utilized for the sake of redundancy, with a provision for automatic switch-over from one radio network to the second if a problem develops on the first. Two radio networks may also facilitate the use of different radio technologies in one installation.

The various multi-drop local area networks referred to herein, for example at 7-82 in FIG. 7 and as represented at 56, 56A, 56B, FIGS. 9 through 12, and at 13-82 in FIG. 13 may comprise HDLC based local area networks operating at up to 2.5 megabits per second and using biphase space encoding (FMO) for clock recovery from data.

The components 86 and 94, FIG. 4, and component 13-11, FIG. 13, provides a low-cost base radio interface using three pairs of twisted conductors. One pair provides a bidirectional RS485 data line. Another pair is used for the clock and has an RS422 electrical configuration, and is one directional from the radio to the controller. The third twisted pair is also RS422 and is used to communicate from the controller to the radio transceiver to effect mode selection.

Since it is advantageous to operate the network and router RF transceiver units so as to be compatible with existing mobile data collection terminals such as shown in APPENDIX D1 et seq., a preferred mode of operation is based on the RTC protocol as disclosed in the aforementioned incorporated Mahany and Sojka patents and the following pending applications:

(1) U.S. Ser. No. 07/389,727 filed Aug. 4, 1989, now issued as U.S. Pat. No. 5,070,536 on Dec. 3, 1991.

(2) European Published Patent Application EPO 353759 published Feb. 7, 1990.

(3) U.S. Ser. No. 07/485,313 filed Feb. 26, 1990.

The disclosures of applications (1), (2) and (3) are hereby incorporated herein by reference in their entirety.

Figure 5:
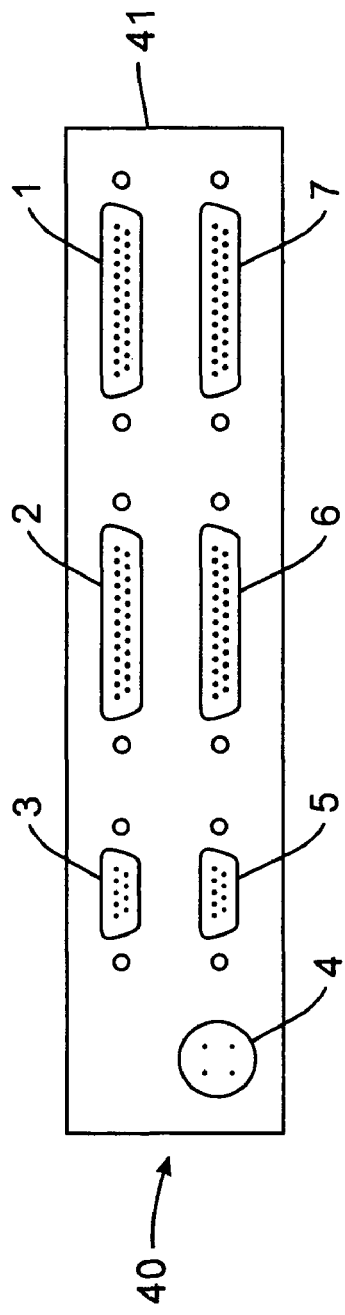
FIG. 5 is a rear elevation view of the network controller.

An aspect of the invention resides in the provision of a network controller having port means selectively configurable for coupling in first mode with network RF transceiver units at a relatively high data rate such as 100 kilobits per second or higher, and for coupling in a second mode with network transceiver units at a relatively low data rate such as about twenty kilobits per second. Preferably a single port means such as 2, 3, or 5, 6, FIG. 5, can be software configured to interface selectively in the first mode or in the second mode. It is presently less expensive to use connectors per port rather than a single 37-pin connector for example.

Where a network controller such as 40 operates two high data rate networks, for example, one network of RF base transceivers could operate with the RTC protocol, and the second network could operate according to a different protocol such as that disclosed in pending application Ser. No. 07/660,618 filed on or about Feb. 25, 1991, in its entirety. It will be apparent that many modifications and variations may be effected without departing from the scope of the teachings and concept of the present disclosure.

Figure 14:
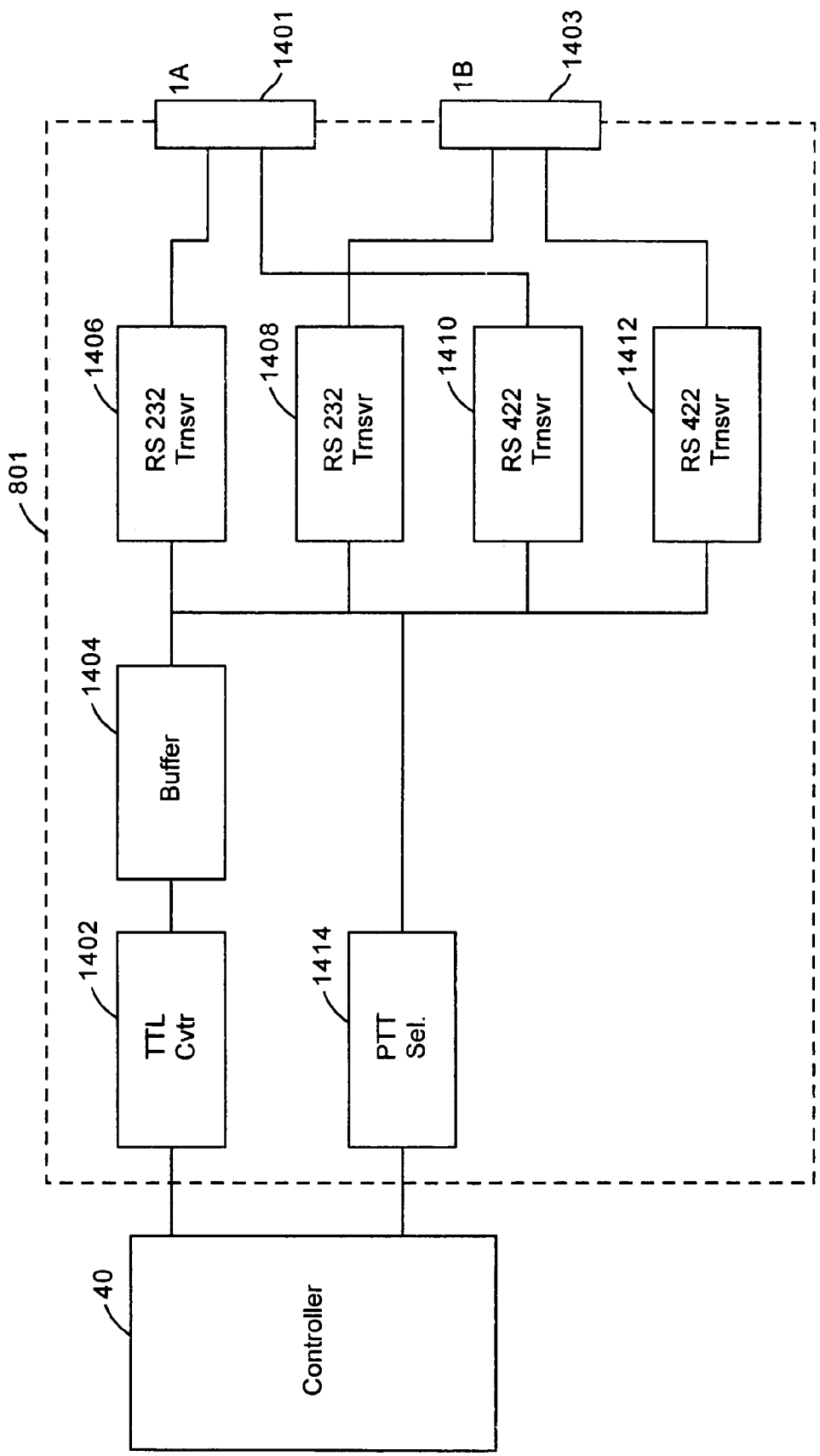
FIG. 14 shows a diagrammatic illustration of the signal processing for two of four parts of communication ports of the multiple base adapter of the RF data collection system illustrated in FIG. 8.
Figure 15:
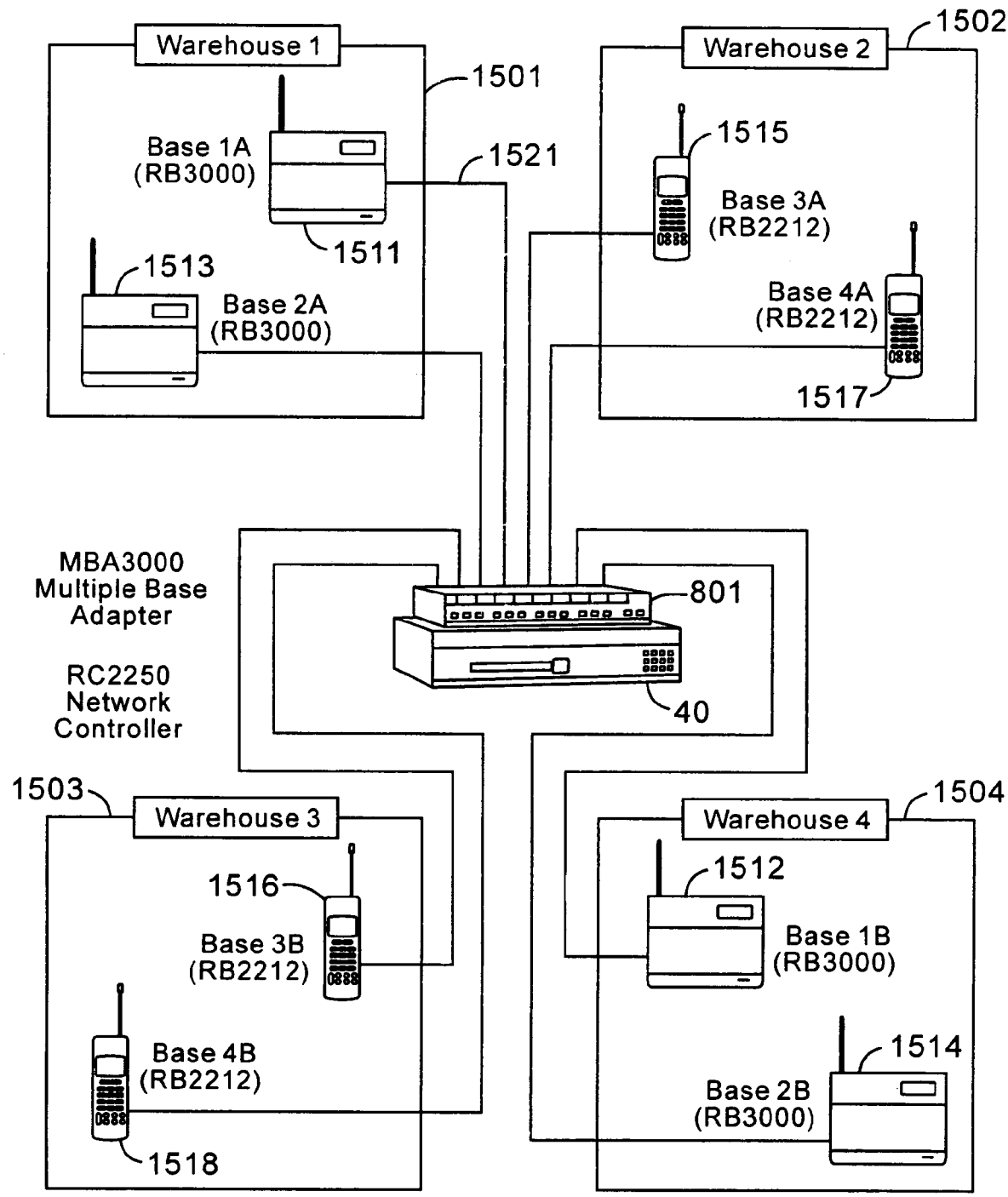
FIG. 15 is a diagram of parts of an RF data collection system utilizing a network controller according to FIGS. 2-6 and a multiple base adapter according to FIG. 14, with eight base transceiver units coupled to the multiple base adapter.

Description of FIGS. 14 and 15

FIG. 14 is a block diagram of the circuitry for one pair of communication ports 1401 and 1403 of adapter 801 (FIG. 8) for use in coupling to base transceiver units. Three additional pairs of communication parts for coupling to six additional base transceiver units are provided in the preferred embodiment of adapter 801 as exemplified by the MBA3000. Multiple Base Adapter further described in Appendix A. It is to be understood that the circuit components coupled to each additional pair of communication ports of adapter 801 is identical to that shown for first port pair 1A/1A, that is ports 1401 and 1403 of FIG. 14. The adapter 801 provides means for connecting the controller 40 (FIG. 8) at its port 73 to a multiplicity of radio base units illustrated in FIG. 8 as, for example, 811, 812, 813, 814, including in selected pairs. In the preferred embodiment of adapter 801, up to eight radio base units may be coupled through use of adapter 801 to a network controller 40, to be controlled by controller 40 in selected pairs thereof. The controller 40 may control the radio base units such as 811, 812, 813, 814, (FIG. 8) in simulcast mode, that is, with all base radios interrogating mobile transceiver units such as 821, 833, and 834 of FIG. 8 simultaneously, or with the base units being employed in pairs to interrogate the mobile transceiver units.

Referring again to FIG. 14, the network controller 40 provides transmit data and baud rate select signals to adapter 801. Within adapter 801, the controller outputs are converted to TTL levels by TTL converter 1402 and they are then provided to buffer 1404 which provides the signals to paired RS232 transceivers 1406 and 1408, and to paired RS422 transceivers 1410 and 1412 which deliver the converted signals to ports 1401 and 1403 respectively. By this means, the controller's output signals are provided to a pair of output ports 1401 and 1403 in both RS232 and RS422 interface at the same time. An additional three output-port-pairs are provided which may be denominated 2A/2B, 3A/3B and 4A/4B, which ports are controlled and operated identically to ports 1A/1B identified in FIG. 14 as ports 1401 and 1402. The RS232 transceivers 1406 and 1408 and RS422 transceivers 1410 and 1412 and ports 1401 and 1403 are illustrative of all circuitry coupled to port pairs of adapter 801.

Similarly, signals provided to adapter 801 by base radios coupled to the output port pairs, e.g. ports 1401 and 1403 of FIG. 14, are first converted to TTL levels by the RS232 transceivers 1406 and 1408 or by the RS422 transceivers 1410 and 1412, depending upon which interface is presented by a pair of base radios at port 1401 and 1403, the TTL signals the signals to RS 232 interface to be delivered to controller 40. A selection unit 1414 provides a push-to-talk selection signal to the RS232 transceivers 1406 and 1408 and to the RS422 transceivers 1410 and 1412 to provide PTT selection signals at ports 1401 and 1403 in both RS232 and RS422 format. It is to be understood that similar selection units are associated with remaining port pairs 2A/2B, 3A/3B. 4A/4B so that the ports may be independently operated.

The adapter 801 of FIG. 8 is exemplified by the MBA3000 multiple base adapter unit manufactured by the NORAND Corporation of Cedar Rapids, Iowa as shown in Appendix A. Because of the operation of the MBA3000 multiple base adapter by dual methods in either RS232 or RS422 signal environments, the MBA3000 may be incorporated into systems having existing installed base radios which present only and RS232 interface or it may be incorporated into systems having base radios some of which operate at RS422 and some at RS232.

FIG. 15 illustrates a preferred arrangement of controller 40 and adapter 801 when used in an environment with multiple base radios in multiple warehouse environments. Controller 40 is coupled to adapter 801 which is coupled to paired bases 1511, 1512; 1513, 1514; 1515, 1516; and 1517, 1518; which are located in warehouses 1501, 1502, 1503 and 1504. By geographical separation in warehouse 1501, for example, base radios 1511 and 1513 provide substantial coverage of warehouse 1501 such that a mobile transceiver being used within warehouse 1501 would be communicated with by either base radio 1511 or 1513. By the use of adapter 801, controller 40 may cause interrogation simultaneously by base radios 1511, 1512, 1513, 1514, 1515, 1516, 1517, 1718, or it may cause sequential interrogation by radio pairs 1511/1512, 1513/1514, 1515/1516, or 1517/1518 in succession. When a mobile transceiver responds by RF communication means with a base radio, e.g., base radio 1511, the response is transmitted by base radio 1511 through coupling 1521 to adapter 801 which automatically converts the incoming response to RS232 interface as necessary, to make it suitable for reception by controller 40.

Through a system as exemplified in FIG. 15, data collection from a number of roving mobile transceivers may be initiated by a network controller 40 through a four-warehouse environment. When base transceiver units 1511 and 1512 have been unsuccessful in establishing communication with the desired mobile transceiver unit, controller 40 will then cause bases 1513 and 1514 to attempt communication and if bases 1513 and 1514 are unsuccessful, controller 40 will proceed through the other base radio pairs, namely 1515/1516 and 1517/1518, as needed, to establish communication with the desired mobile transceiver unit. Details regarding base transceiver units 1511, 1512, 1513, and 1514 are found in Appendix B. Details regarding base transceiver units 1515, 1516, 1517, and 1518 are found in Appendix D.

The adapter 801 is provided to operate in either simulcast or sequential mode. In the normal or simulcast mode, adapter 801 allows the use of one to eight bases, where the bases are configured as four pairs of two bases. In this mode the adapter 801 simulcasts to a single base pair at a time and the four sets of base pairs are selected using a dynamic time-division multiplexing method. The user can configure the adapter 801 to use any of the eight base ports, using simulcasting or time-division multiplexing to best advantage.

There are two sets of base transceiver units, referred to as set A (identified as 1A, 2A, 3A, and 4A) and set B (identified as 1B, 2B, 3B, and 4B). Within a set, the base transceiver units are selected by time-division multiplexing.

It can be seen in FIG. 15, that there are four pairs of base transceiver units defined as pairs 1A/1B, 2A/2B, 3A/3B, 4A/4B. Each base transceiver unit of a base pair is simulcasted to at the same time.

The hardware of the adapter 801 allows the selection of the base pairs (pair 1A/1B through 4A/4B) using control lines from the controller 40. Adapter 801 transmits to both base transceiver units of a base pair at the same time and receives independently from each base simultaneously.

The use of adapter 801 allows an extension of the number of base transceiver units that can be used in a facility to allow for adequate coverage, it is important to understand how the base transceiver units operate when simulcasting is used, and when time-division multiplexing is used.

The adapter 801 distributes signals transmitted by controller 40 to base transceiver pairs at the same time, so if there is an overlap in the coverage for the two base transceiver units, there may be some interference. The amount of interference depends on the relative signal strengths; if the strength is similar in one spot the chance of interference is larger that if the signal strengths are different. This type of interference could be avoided in some configurations by splitting coverage areas of pairs of base transceiver units. Another method of covering the overlap area is to place another base (not one of the base pairs) to cover the overlap area. The radio signals from the mobile transceiver unit may be picked up fully or partially by either or both base transceiver units of a given pair. However the adapter 801 first tries to receive from one base transceiver unit, for example base 1511, and if unsuccessful, it then switches to try to receive from a second base transceiver unit, for example base transceiver unit 1513. If the information is successfully received from the first base transceiver unit, the information from the second base transceiver unit is ignored. Thus he controller assures data does not get sent to the host data processor in duplicate.

The user may couple from one to eight base transceiver units to the adapter 801 and can then configure those base transceiver units as required to meet the installation's needs. Any combination of ports of the adapter 801 can be used. Thus the user can take advantage of the ability to simulcast or sequentially (via time-division multiplexing) access the base transceiver units 1511, 1512, 1513, 1514, 1515, 1516, 1517, and 1518.

The attached Appendix E provides an exemplary computer program listing for preferred control instruction for the system disclosed herein.

Description of FIGS. 16 and 17

FIG. 16 is a functional block diagram of an alternate embodiment of an RF data communication system of the present invention. The RF data communication system has a host computer 2010, a network controller 2014 and base stations 2022 and 2024 attached to a data communication link 2016. Also attached to the data communication link 2016 is a gateway 2020 which acts as the root node for the spanning tree of the RF data network of the present invention. A bridge 2042 is attached to the gateway 2020 through a hard-wired communication link and bridges 2040 and 2044 are logically attached to gateway 2020 by two independent RF links. Additional bridges 2046, 2048, 2050 and 2052 are also connected to the RF Network and are shown in FIG. 16.

FIG. 16 further shows RF terminals 2100 and 2102 attached to base station 22 via RF links and RF terminal 2104 attached to base station 2024 via an RF link. Also, RF terminals 2106, 2108, 2110, 2112, 2114, 2116, 2118, and 2120 can be seen logically attached to the RF Network through their respective RF links. The RF terminals in FIG. 16 are representative of non-bridging stations. In alternate embodiments of the present invention, the RF Network could contain any type of device capable of supporting the functions needed to communicate in the RF Network such as hard-wired terminals, remote printers, stationary bar code scanners, or the like. The RF data communication system, as shown in FIG. 16, represents the configuration of the system at a discrete moment in time after the initialization of the system. The RF links, as shown, are dynamic and subject to change. For example, changes in the structure of the RF data communication system can be caused by movement of the RF terminals and by interference that affects the RF communication links.

In the preferred embodiment, the host computer 2010 is an IBM 3090, the network controller 2014 is a NORAND RC3250, the data communication link 2016 is an Ethernet link, the nod s 2020, 2022, 2024, 2040, 2042, 2044, 2046, 2048, 2050 and 2052 are intelligent bas transceiver units of the type RB4000, and the RF terminals 2100, 2102, 2104, 2106, 2108, 2110, 2112, 2114, 2116, 2118 and 2120 are of type RT3210.

To initialize the RF data communication system, the gateway 2020 and the other nodes are organized into an optimal spanning tree rooted at the gateway 2020. An optimal spanning tree assures efficient routing of information without looping. To form the optimal spanning tree, in the preferred embodiment the gateway 2020 is assigned a status of ATTACHED and all other bridges are assigned the status UNATTACHED. The gateway 2020 is considered attached to the spanning tree because it is the root node. Initially, all other bridges are unattached and lack a parent in the spanning tree. At this point, the attached gateway node 2020 periodically broadcasts HELLO packets. The HELLO packets can be broadcast using known methods of communicating via Radio Frequency or via a direct wire link. In the preferred embodiment of the present invention, spread-spectrum communication is used for the RF communication.

HELLO packets contain 1) the address of the sender, 2) the distance that the sender is from the root, 3) a destination address, 4) a count of bridges attached to the broadcasting node, and 5) a list of any necessary system parameters. Each node in the network is assigned a unique network service address and a node-type identifier to distinguish between different nodes and different node types. The distance of a node from the root node is measured in hops. The gateway root is considered to be zero hops away from itself.

The unattached bridges are in a LISTEN state. During the LISTEN state, a bridge will listen to the HELLO messages that are broadcast. By listening to the HELLO messages, bridges can learn which nodes are attached to the spanning tree. The unattached bridges analyze the contents of the HELLO messages to determine whether to request attachment to the broadcasting node. In the preferred embodiment, a bridge attempts to attach to the node that is logically closest to the root node. In the preferred embodiment, the logical distance is based upon the number of hops needed to reach the root node and the bandwidth of those hops. The distance the attached node is away from the root node is found in the second field of the HELLO message that is broadcast.

In another embodiment of the present invention, the bridges consider the number of nodes attached to the attached node as well as the logical distance of the attached node from the root node. If an attached node is overloaded with other attached nodes, the unattached bridge may request attachment to a less loaded node.

After attaching to an attached node, the newly attached bridge (the child) must determine its distance from the root node. To arrive at the distance of the child from the root node, the child adds the broadcast distance of its parent to the distance of the child from its parent. In the preferred embodiment, the distance of a child from its parent is based on the bandwidth of the data communication link. For example, if the child attaches to its parent via a hard-wired link (bandwidth 26,000 baud), then the distance of that communication link equals one hop. However, if the child attaches to its parent via an RF link (bandwidth 9600 baud), then the distance of that communication link equals 3 hops.

Initially, only the root gateway node 2020 is broadcasting HELLO messages and only nodes 2040, 2042 and 2044 are within range of the HELLO messages broadcast by the gateway. Therefore, after the listening period has expired, nod s 2040, 2042 and 2044 request attachment to the gateway node 2020. The unattached nodes 2040, 2042, and 2044 send ATTACH.request packets and the attached gateway node 2020 acknowledges the ATTACH.request packets with local ATTACH.confirm packets. The newly attached bridges are assigned the status ATTACHED and begin broadcasting their own HELLO packets, looking for other unattached bridges. Again, the remaining unattached nodes attempt to attach to the attached nodes that are logically closest to the root node. For example, node 2048 is within range of HELLO messages from both nodes 2040 and 2042. However, node 2040 is three hops, via an RF link, away from the gateway root node 2020 and node 2042 is only one hop, via a hard-wired link, away from the gateway root node 2020. Therefore, node 2048 attaches to node 2042, the closest node to the gateway root node 2020.

The sending of HELLO messages, ATTACH.request packets and ATTACH.confirm packets continues until the entire spanning tree is established. In addition, attached bridges may also respond to HELLO messages. If a HELLO message indicates that a much closer route to the root node is available, the attached bridge sends a DETACH packet to its old parent and an ATTACH.request packet to the closer node. To avoid instability in the system and to avoid overloading any given node, an attached bridge would only respond to a HELLO message if the hop count in a HELLO packet is greater than a certain threshold value, CHANGE_THRESHOLD. In the preferred embodiment, the value of the CHANGE_THRESHOLD equals 3. In this manner, an optimal spanning tree is formed that is capable of transmitting data without looping.

Nodes, other than the gateway root node, after acknowledging an ATTACH.request packet from a previously unattached node, will send the ATTACH.request packet up the branches of the spanning tree to the gateway root node. As the ATTACH.request packet is being sent to the gateway root node, other nodes attached on the same branch record the destination of the newly attached node in their routing entry table. When the ATTACH.request packet reaches the gateway root node, the gateway root node returns an end-to-end ATTACH.confirm packet.

After the spanning tree is initialized, the RF terminals broadcast WHO'S THERE packets with a global destination address to solicit HELLO packets from any attached nodes. To avoid multiple nodes responding to a given WHO'S THERE packet, the nodes wait a BACKOFF period of time before responding. In the preferred embodiment, the BACKOFF time is weighted for each attached node based on the current load on the node and the distance from the root node. For example, if a node is heavily loaded and/or far away from the gateway root node, the node waits a longer time to respond than nodes lightly loaded and closer to the gateway root node. Of course, the weighing scheme can vary greatly depending upon the desired goal.

After receiving HELLO messages from attached nodes, an RF terminal sends an ATTACH.request packet to attach to the node logically closest to the root. For example, RF terminal 2110 is physically closer to node 2044. However, node 2044 is three hops, via an RF link, away from the gateway root node 2020 and node 2042 is only one hop, via a hard-wired link, away from the gateway root node 2020. Therefore, RF terminal 2110, after hearing HELLO messages from both nodes 2042 and 2044, attaches to node 2042, the closest node to the gateway root node 2020. Similarly, RF terminal 2114 hears HELLO messages from nodes 2048 and 2050. Nodes 2048 and 2050 are both four hops away from the gateway root node 2020. However, node 2048 has two RF terminals 2110 and 2112 already attached to it while node 2050 has only one RF terminal 2116 attached to it. Therefore, RF terminal 2114 will attach to node 2050, the least busy node of equal distance to the gateway root node 2020.

The attached node acknowledges the ATTACH.request with a local ATTACH.confirm packet and sends the ATTACH.request packet to the gateway root node. Then, the gateway root node returns an end-to-end ATTACH.confirm packet. In this manner, the end-to-end ATTACH.request functions as a discovery packet enabling the gateway root node, and all other nodes along the same branch, to learn the address of the RF terminal quickly. This process is called backward learning. Nodes learn the addresses of terminals by monitoring the traffic from terminals to the root. If a packet arrives from a terminal that is not contained in the routing table of the node, an entry is made in the routing table, The entry includes the terminal address and the address of the node that sent the packet. In addition, an entry timer is set for that terminal. The entry timer is used to determine when RF terminals are actively using the attached node. Nodes maintain entries only for terminals that are actively using the node for communication. If the entry timer expires due to lack of communication, the RF terminal entry is purged from the routing table.

The RF links among the RF terminals, the bridges, and the gateway are often lost. Therefore, a connection-oriented data-link service is used to maintain the logical node-to-node links. In the absence of network traffic, periodic messages are sent and received to ensure the stability of the RF link. As a result, the loss of a link is quickly detected and the RF Network can attempt to establish a new RF link before data transmission from the host computer to an RF terminal is adversely affected. In an alternate embodiment of the present invention, rapidly moving terminals could have the flexibility to attach to more than one node. This would help insure that a data link to the host computer was always available even during periods when the RF terminal was highly mobile.

Communication between terminals and the host computer is accomplished by using the resulting RF Network. To communicate with the host computer, an RF terminal sends a data packet to the bridge closest to the host computer. Typically, the RF terminal is already attached to the bridge close t to the host computer. However, RF terminals are constantly listening for HELLO messages from other bridges and may attach to, and then communicate with, a bridge in the table of bridges that is closer to the particular RF terminal.

FIG. 17 is a flow chart of the method steps for implementing a CSMA Non-Persistent protocol. In FIG. 17, the RF terminals and the intermediate RF nodes use a CSMA-based protocol with stateless ARQ (automatic repeat request) to transmit the data packets. At step 2100, the RF terminal is idle and is waiting either for user input or for other conditions to send data to the RF Network. After assembling the data at step 2102, the RF terminal then checks to see if there exists any media activity on the RF Network at step 2104. Any existing media activity may interfere with the quality of the transmission from the RF terminal. Accordingly, if there exists media activity, the RF terminal, at step 2106, waits a random time before attempting to transmit the data. If there is no media activity, the RF terminal, at step 2108, transmits the data and, at step 2110, waits for an acknowledgement from an attached node. If the node acknowledges successful receipt of the data, the RF terminal returns to step 2100 to wait for additional data to send. However, if there is no acknowledgement within a fixed period of time, the RF terminal returns to step 2104 to check for media activity and attempts to retransmit the data if there is no media activity.

Under certain operating conditions, duplicate data packets can be transmitted in the RF Network. For example, it is possible for an RF terminal to transmit a data packet to its attached node, for the node to transmit the acknowledgement frame, and for the RF terminal not to receive the acknowledgement. Under such circumstances, the RF terminal will retransmit the data. If the duplicate data packet is updated into the database of the host computer, the database would become corrupt. Therefore, the RF Network of the present invention detects duplicate data packets. To ensure data integrity, each set of data transmissions receives a sequence number. The sequence numbers are continuously incremented, and duplicate sequence numbers are not accepted by the gateway root node.

When a bridge receives a data packet from a terminal directed to the host computer, the bridge forwards the data packet to the parent node on the branch. The parent node then forwards the data packet to its parent node. The forwarding of the data packet continues until the gateway root node receives the data packet and sends it to the host computer. Similarly, when a packet arrives at a node from the host computer directed to an RF terminal, the node checks its routing entry table and forwards the data packet to its child node which is along the branch destined for the RF terminal. It is not necessary for the nodes along the branch containing the RF terminal to know the ultimate location of the RF terminal. The forwarding of the data packet continues until the data packet reaches the final node on the branch, which then forwards the data packet directly to the terminal itself.

Communication is also possible between RF terminals. To communicate with another RF terminal, the RF terminal sends a data packet, using the CSMA Non-Persistent protocol, to its attached bridge. When the bridge receives the data packet from a terminal directed to the host computer, the bridge checks to see if the destination address of the RF terminal is located within its routing table. If it is, the bridge simply sends the message to the intended RF terminal. If not, the bridge forwards the data packet to its parent node. The forwarding of the data packet up the branch continues until a common parent between the RF terminals is found. Then, the common parent (often the gateway node itself) sends the data packet to the intended RF terminal via the branches of the RF Network.

During the normal operation of the RF Network, RF terminals can become lost or unattached to their attached node. If an RF terminal becomes unattached, for whatever reason, its routing entry is purged and the RF terminal broadcasts a WHO'S THERE packet with a global destination address to solicit HELLO packets from any attached nodes. Again, to avoid having multiple nodes respond to a given WHO'S THERE packet, the nodes wait a BACKOFF period of time before responding. After receiving HELLO messages from attached nodes, the RF terminal sends an ATTACH.request packet to the attached node closest to the root. That attached node acknowledges the ATTACH.request with a local ATTACH.confirm packet and sends the ATTACH.request packet onto the gateway root node. Then, the gateway root node returns an end-to-end ATTACH.confirm packet. If an RF terminal was previously attached along another branch of the spanning tree, the ATTACH.request packet intended for the gateway root node may be intercepted by an intermediate node with a valid routing entry for the terminal. In such a case, the intermediate node would send the end-to-end ATTACH-.confirm packet.

Bridges can also become lost or unattached during normal operations of the RF Network. If a bridge becomes lost or unattached, all routing entries containing the bridge are purged. The bridge then broadcasts an ATTACH.request with a global bridge destination address. Attached nodes will broadcast HELLO packets immediately if they receive an ATTACH.request packet with a global destination address. This helps the lost node re-attach. Then, the bridge enters the LISTEN state to learn which attached nodes are within range. The unattached bridge analyzes the contents of broadcast HELLO messages to determine whether to request attachment to the broadcasting node. Again, the bridge attempts to attach to the node that is logically closest to the root node. After attaching to the closest node, the bridge begins broadcasting HELLO messages to solicit ATTACH.requests from other nodes or RF terminals.

In alternate embodiments, the RF Networks contain multiple gateways. By including a system identifier in the address field of the nodes, it is possible to determine which nodes are connected to which networks. In other embodiments peer-to-peer relationships exist between nodes. The routing algorithm is modified to include a distributed Bellman-Ford type of spanning tree algorithm.

Description of FIGS. 18 through 27

FIG. 18 is a diagram which illustrates the basic communication pathways and spatial relationships between a host computer, base stations and roaming terminals of the present invention. Particularly, a host computer 3011 and roaming terminals 3013, 3015 and 3017 indirectly communicate through base stations 3019 and 3021. The base stations 3019 and 3021 receive communications via one link medium and relay those communications along another. Particularly, a "hard-wired" connection such as an IEEE 802.3 (ethernet) interface provides a link 3023 to host computer 3011, while radio frequency (RF) transmission provides the link to the roaming terminals 3013, 3015 and 3017.

If the remote terminals 3013, 3015 and 3017 are within the RF range of each other, they can use direct RF transmission as the link. If they are not within RF range, an indirect communication link must be found through the base stations 3019 and 3021. The RF range of the base stations 3019 and 3021 is illustrated in FIG. 18 by the respective circular boundaries 3025 and 3027. The boundaries 3025 and 3027 represent the maximum radial distance from the base stations 3019 and 3021 that RF communications can be maintained.

In one preferred embodiment, the host computer 3011 can be either an IBM AS400 or 3090 mainframe. The base stations 3019 and 3021 are NORAND RB4000 products and the roaming terminals 3015, 3017 and 3019 are NORAND RT1100 products.

Although only one host computer, two base stations and three roaming terminals are shown for simplicity, the use of additional host units, many more base stations and hundreds of roaming terminals are contemplated. Instead of the "hard-wired" ethernet interface, it is also contemplated that the entire link 3023, or any portion thereof, can be maintained using RF transmissions. In such situations, because of the range limitations associated with an RF link, it may be necessary for several base stations to relay communications between the host computer 3011 and the roaming terminals 3013, 3015 and 3017. Alternatively stated, the communications "hop" from one base station to the next until the destination is reached.

As the number of base stations increase, the number of possible "hopping" pathways also increase. A backward-learning, spanning tree algorithm is used so as to select the "hopping" pathway with the lowest "cost" to a given destination as detailed above. To summarize, a "cost" is assigned to every direct communication link in the network. This "cost" factor takes into account the communication bandwidth of a particular link. Next, the spanning tree algorithm using backward learning identifies the "hopping" pathway of lowest "cost" from any source to any destination. Whenever any direct link is faulty or a "hopping point" (a base station for example) is moved or breaks down, an alternate low "cost" pathway can be used. This provides an inherent redundancy to the network.

Referring back to FIG. 18, roaming terminals 3015, 3017 and 3019 collect data that must be communicated to the host computer 3011. This data is collected either via respective bar code readers 3029, 3031 and 3033 or keyboards 3035, 3037 and 3039. U.S. Pat. Nos. 4,910,794; 4,924,462; and 4,940,974 provide a further description of these readers and data collection. In addition, bar code reading requires high system clock rates in the roaming terminals during data gathering to provide decoding of bar code scans at an acceptable rate. However, the high clock rates also cause the generation of digital noise in and around the roaming terminals. This noise can effect transmission and reception at the roaming terminal causing a reduction in the effective communication rang. This problem is solved by using a dual clock rate. The terminal is operated normally at a slow system clock rate to minimize the generation of digital noise, and it is switched to a fast clock rate during bar code scanning to allow the data obtained from the bar code scan to be processed at a higher rate. This lets the rf data link coexist with the need for and the hardware support for bar code scan decoding.

The terminals 3015, 3017 and 3019 can also request information from the host computer 3011 or from other roaming terminals. Similarly, the host computer 3011 may desire to communicate with the roaming terminals 3015, 3017 and 3019 in order to download configuration information, database information or to send commands.

Before communication can be initially established, the roaming terminals 3013, 3015 and 3017 must first listen for hello-messages from the base stations 3019 and 3021. The base station 3019 and 3021 both send out hello-messages approximately once every second. The hello-messages identify the sending base station along with its current loading and associated "cost".

The roaming terminals 3013, 3015 and 3017 attempt to detect every possible hello-message from any base station within range. This requires that the hello-message listening period be at least as long as the maximum time between hello-messages sent by any single base station. For example, the terminals 3013 and 3017 would respectively receive a hello-message from the base stations 3019 and 3021, while the terminal 3015 would receive two hello-messages: one from the base stations 3019 and one from the station 3021. Only those hello-messages that meet a minimum "signal strength" threshold are further considered. All weaker hello-messages are ignored.

As spatially represent d in FIG. 18, upon receiving hello-messages from a single base station, the roaming terminals 3013 and 3017 can immediately initiate communication with the host computer 11 by "attaching" to their respectively identified base stations 3019 and 3021. The roaming terminal 3015, however, which received two sufficiently strong hello-messages signals, must select either base station 3019 or 3021 before "attaching".

To make this selection, the roaming terminal 3015 must initially consider the "cost". Specifically, terminal 3015 must select the base station which has the lowest "cost". If the "costs" are equal, terminal 3015 must select the base station whose received hello-message has the highest "signal strength". If the corresponding "signal strengths" also prove to be equal, the roaming terminal 3015 selects the base station with the highest user defined "priority". This priority can be preset by the user based on both the spatial layout and the nature of the components being used. Finally, if these factors all prove equal, the terminal 3015 merely selects the base station with the lowest "preset number". Each base station is randomly assigned a unique "preset number" upon its manufacture or during its installation onto the network.

Assuming that station 3019 and 3021 have the same "cost" and "signal strength" but that station 3019 has the highest user defined "priority", gravitation in the overlapping region occurs toward the base station 3019. In this way, the base station 3019 can better regulate communication in the overlapping RF regions with minimal channel contention.

More particularly, the user set "priority" assigned to a base station could also be determined based on the spatial layout of competing base stations. The higher "priority" base stations can be surrounded by lower "priority" base stations and vice versa in a pattern defined by the total area being covered so as to cause as much migration as possible onto the higher "priority" base stations and away from the lower "priority" base stations. Similarly, in determining high "priority", consideration can also be given to the base stations ordinarily containing high concentration of roaming terminals.

It is further contemplated that factors which indicate the current load on base stations 3019 and 3021 could also be considered in the selection by the roaming terminal 3015. First, if heavy loading is considered a negative factor, the roaming terminals 3013, 3015 and 3017 that pass within the overlapping region defined by boundaries 3025 and 3027 would gravitate toward base stations with the lightest load. Although this balances the loading between base stations, it causes greater channel contention problems in the overlapping regions. Second, if heavy loading is considered a positive factor, the roaming terminals would gravitate toward base stations with the heaviest load. In this manner, a heavily loaded base station could better manage communication when surrounded by lightly loaded stations.

As roaming terminals 3013, 3015 and 3017 move within the confines of boundaries 3025 and 3027, they often need to re-evaluate their base station selection. Instead of waiting until RF communication with their selected base station is entirely lost, the remote terminals 3013, 3015 and 3017 can periodically re-evaluate the "cost" and "signal strength" of either the hello-messages or any other RF transmission sent from other base stations. Upon selecting a new base station, the roaming terminals merely "attach" to their new selection. Furthermore, in addition to or in place of this periodic re-evaluation described in the preferred embodiment, a decline in the selected base station's "signal strength" might also be used as a factor for initiating a re-evaluation.

In a communication system such as that shown in FIG. 18, one or more of the base station may be selected to transmit an RTC heartbeat, which is the system synchronizing signal. Responses from terminals in the service area are monitored by all of the base stations that receive signals from the terminals. In most cases, terminals will be at different distances from each of the plurality of base stations, and the resulting differences in received signal strengths at the receiving terminals will eliminate the effects of signal collision by FM capture. However, in some instances, collisions will still occur at some base stations.

Base stations can be networked, as illustrated by communication link 3023, to allow the coordination of polling of terminals that have identified themselves to the base stations during their response intervals. The use of information about the strength of signals received at the base stations allows the network to adjust broadcast signal strengths so as to poll receiving terminals simultaneously with a minimum risk of collision. This provides a number of advantages. First, a smaller number of collisions will reduce the number of delays in response due to collisions. If contention polling is used, this means that the number of slots can be reduced, thus reducing overhead. The system also allows for simultaneous communication on a single frequency when two or more terminals are so located with respect to their base stations that the same-frequency communications will not interfere with each other. Finally, the system allows UHF and spread-spectrum communication systems to share the same local-area network.

FIG. 18A illustrates the use of a programmable directional antenna system in the communication system of FIG. 18. Specifically, the base stations 3019 and 3021 are not interconnected via a hard-wired communication link. Therefore, if the base station 3019 desires communication with the base station 3021, for example, the base station 3019 could increase its transmission power so as to extend the boundary 3025 to encompass the base station 3021. This not only wastes energy (which is especially important where the base stations are battery powered) but also creates greater overlapping regions of the boundaries 3025 and 3027 with boundaries of other base stations (not shown). This results in a greater number collisions, slowing down the communication channel.

A better approach for solving this problem is found in the use of a programmable, directional antennas. Specifically, when the base station 3019 desires communication, instead of increasing transmission power on the non-directional antenna system, the base station 3019 transmits using a directional antenna system which is aimed at the base station 3021. The broadcast area and range using the directional antenna is illustrated by a boundary 3026. In fact, in this arrangement, the base station 3019 may be able to decrease the transmission power and still maintain communication. Because the overall transmission area (encompassed by the boundary 3026) is relatively small and located between the base stations 3019 and 3021, interference with other peripheral base stations (not shown) is minimized.

Additionally, the aiming of the antenna and the power level of the transmission is programmably adjusted by the base stations. In this way, each base station having the location and required transmission power information can aim and transmit to any other base station in the communication system with maximum communication channel usage. Moreover, the transmission power might also be adjusted during a transmission so as to the maintain the communication at the lowest energy level possible. Such an adjustment would operate in a feedback fashion. Aiming might also be adjusted by the transmitting base station in this same manner.

In addition, the spanning tree routing table described above might be used to store the current location and power requirements for each base station. Alternately, the host computer might store the information for later access by the base stations.

FIG. 19 is a timing diagram illustrating several possible communication exchanges between any base station and roaming terminal of FIG. 18. For example, with specific reference to exchange (a), when roaming terminal 3013 desires to communicate with the host 3011 through the selected base station 3019, the terminal 3013 merely listens for a clear channel using a standard collision-sense multiple access (CSMA) approach and transmits a request for poll (RFP) frame 3051. The base station 3019 chooses to immediately respond by transmitting a polling (POLL) frame 3053. This POLL frame 3053 indicates to the terminal 3013 that the channel is currently clear to send data. The terminal 3013 sends data in frames of a preset size. If the frame size is smaller than the total block of data to be transmitted, multiple frames must be sent. In exchange (a), for example, three frames of data (DATA frames) 3055, 3059 and 3063 are required to transmit the entire data block.

In response to the POLL frame 3053, the terminal 3013 sends the first DATA frame 3055. A field in each DATA frame is used to indicate either that more DATA frames follow or that the current DATA frame is the last. A DATA frame containing the later indication is called an end of data (EOD) frame. Because the DATA frame 3055 is not the EOD frame, the base station 3019 expects more data to follow and sends a POLL frame 3057. The terminal 3013 again responds by sending the DATA frame 3059, and again, base station 3019 responds with another POLL frame 3061. Although not shown, this process can repeat until the EOD frame is encountered. Upon receiving the EOD frame 3063, the base station 3019 realizes that no further data needs to be transmitted. Instead of sending another POLL frame, the station 3019 sends a channel clear (CLEAR) frame 3065 and forwards the data toward the host computer 3011.

The standard CSMA protocol described in exchange (a) above only requires that the roaming terminal 3013 listen long enough to identify an "apparently clear channel" before sending an RFP frame. This does not require that the channel be truly clear, however. To clarify this distinction, although the terminal 3013 can easily determine that the base station 3019 is not transmitting to the roaming terminal 3015, it may be impossible for terminal 3013 to determine whether the terminal 3015 is transmitting to the base station 3019. This impossibility is based on the limited RF range of the roaming terminals 3013, 3015 and 3017. As shown in FIG. 18, because of their separation, the terminal 3015 appears "hidden" to the terminal 3013. Using the standard CSMA approach, the RFP frames sent out after identifying an "apparently clear channel" collide with "hidden" ongoing communications. During a period of light communication traffic ("lightly loaded conditions") on a given base station, such collisions prove to be statistically infrequent and thus pose no serious problems.

Under heavily loaded conditions, because such collisions prove to be statistically more frequent, a modified CSMA approach is used. This modified approach requires that the roaming terminals identify a "truly clear channel" before transmitting an RFP frame. This is accomplished by extending the up-front listening period of the roaming terminals to be slightly greater than the maximum possible time span between POLL or CLEAR frames (herein designated the "interpoll gap"). Referring specifically to FIG. 18 and exchange (b) in FIG. 19, the terminal 3013 listens for an interpoll gap time 3067. By listening through the entire interpoll gap time 3067, even though the terminal 3013 cannot directly identify an ongoing transmission from the "hidden" terminal 3015 to the base station 3019, the terminal 3013 indirectly concludes that such a communication has not taken place. This conclusion is based on the failure to receive a POLL or CLEAR frame directed to the "hidden" terminal 3015 from the base station 3019. Had such a POLL or CLEAR frame been received during the interpoll gap time 3067, the terminal 3013 would have concluded that a "hidden" communication had been ongoing. Thus, the terminal 3013 would transmit an RFP frame only after a CLEAR frame was received.

Upon identifying a "truly clear channel", the communication exchange (b) is identical to that of exchange (a) described above. To summarize, the terminal 3013 sends an RFP frame and base station 3019 responds with POLL frames 3071, 3075 and 3079 which respectively initiate DATA frames 3073 and 3077 and an EOD frame 81. Upon receiving the EOD frame 3081, the base station 3019 sends a CLEAR frame 3083 and enters a dormant, listening state.

Based on the communication traffic, the base stations 3019 and 3021 determine individually whether they are lightly or heavily loaded. Although this loading status is transmitted to the remote terminals in a reserved field of each hello-message, it is contemplated that this reserved field might also be placed within every POLL and CLEAR frame. Upon receiving the loading status, the roaming terminals 3013, 3015 and 3017 can appropriately choose either the standard or modified CSMA listening period protocol.

Although in exchanges (a) and (b) the base station 3019 responded immediately to the roaming terminal 3013 with POLL frames, this need not be the case. In fact, the base station 3019 may decide to service the remote terminal 3013 at some other time. Exchange (c) demonstrates this control. As shown, the terminal 3013 sends an RFP frame 3085. In response, the base station 3019 decides to send a wait for poll (WFP) frame 3087. This informs the terminal 3013 that the base station 3019 received the RFP frame 3085 and will poll at some later time. The terminal 3013 thereafter remains silent, awaiting a POLL frame 3089. When the base station 3019 sends the POLL frame 3089, the terminal 3013 responds by transmitting a DATA frame 3091. This is not an EOD frame therefore even though another POLL frame could be sent to retrieve the remaining DATA frames, the base station 3019 decides to send another WFP frame 3093. Again terminal 3013 waits. At some time later, the base station 3019 continues the data transfer by sending a POLL frame 3095. The terminal 3013 immediately responds with an EOD frame 3097. Finally, the base station 3019 sends a CLEAR frame signifying the channel is clear.

Exchange (d) illustrates the circumstance involving an incorrectly received DATA frame. Specifically, after sending an RFP frame 3101 and receiving a POLL frame 3103, the roaming terminal 3013 attempts to send a first data frame during a time period 3105 to the base station 3019. This first data frame is not correctly received so base station 3019 responds by sending a POLL frame 3107 which requests that the previously sent data frame be repeated. The terminal 3013 responds by resending the first data frame during a time period 3109. This time, the base station 3019 properly receives the first data frame and sends a POLL frame 3111 requesting the next DATA frame. The terminal 3013 responds by attempting to send the last DATA frame, the EOD frame, during a time period 3113. The base station 3019 responds to the incorrect reception by sending a further POLL frame 3115. The terminal 3013 resends the EOD frame during time period 3117 which is properly received by the base station 3019 and a CLEAR frame 3119 completes the communication exchange.

In exchange (e), after a successful exchange sequence of an RFP frame 3121, a POLL frame 3123, a DATA frame 3125 and a POLL frame 3127, communications break down. The terminal 3013 responds to the POLL frame 3127 by sending an EOD frame 3129 but receives no responsive CLEAR frame. Either the EOD frame 3129 was not received and a POLL frame requesting a resend was lost, or the EOD frame 3129 was correctly received and a CLEAR frame was lost. To determine which, the terminal 3013 sends an enquiry frame (ENQ) 3131 to the base station 3013. The base station 3019 responds by sending a CLEAR frame during time period 3133 indicating that a previously sent CLEAR frame must have been lost. Alternatively, if no response is detected in time period 3133, the terminal 3013 resends an ENQ frame 3135. The base station 3019 responds in a time period 3137 with a POLL or WFP frame signifying that the EOD frame 3129 has been lost.

The description of the communication protocol from the roaming terminals 3013, 3015 and 3017 and base stations 3019 and 3020 relating to FIG. 19 above applies equally to communications in the reverse direction. Similarly, communications from the base stations 3019 and 3020 toward the host computer 3011 are also governed by this protocol. One difference exists, however. For the portions of link 3023 which are hard wired (such as an ethernet interface), the segmentation of data into fixed frames is not needed. Therefore, after receiving a series of data frames (hereinafter called a "bracket of frames"), the base stations 3019 and 3020 will recombine the data into one complete block for transmission along hardwired portions of link 3023.

FIG. 20 is a detailed view of a portion of the timing diagram shown in FIG. 19 which illustrates the interframe gap blocking function. Specifically, if the roaming terminal 3013 desires communication with the selected base station 3019, the terminal 3013 initiates communication by transmitting an RFP frame 3151. Prior to the completion of this transmission, the base station 3019 responds by transmitting a POLL frame 3153. In turn, prior to the completion of this transmission, the terminal 3013 begins transmitting an EOD frame 3155. Similarly, prior to full receipt of this EOD frame 3155, the base station 3019 sends a CLEAR frame 3157. In this manner, the channel will remain "busy" during the entire communication exchange. Thus, during lightly loaded conditions, when the roaming terminals 3015 and 3017 are within RF range of such an exchange, they will not be able to find a "apparently clear channel" and therefore will not cause collisions by sending untimely RFP frames.

More specifically, the RFP frame 3151 is further divided into information fields 3159 and end of frame fields 3161. The POLL frame 3153 is divided into beginning of frame fields 3163, information fields 3165 and end of frame fields 3167. Similarly, the EOD frame 3155 is further divided into beginning of frame fields 3169, information fields 3171 and end of frame fields 3173. Finally, the CLEAR frame is divided into beginning of frame fields 3175 and information fields 3177. These overlapping end of frame and beginning of frame fields "block" the channel from being misinterpreted as being "clear".

For example, the terminal 3013 begins to transmit the RFP frame 3151 to the base station 3019. As soon as the beginning of the field 3161 is detected, the base station 3019 immediately responds with the field 3163 of the POLL frame 3153. It does not matter that fields 3161 and 3163 overlap because they carry no other information than to ensure that the channel will be "blocked". The interaction of fields 3161 and 3163 applies equally to the overlapping fields 3167 and 3169 and fields 3173 and 3175.

FIG. 21 is a block diagram of a redundant communication interface between several base stations and host computers of the present invention. In this embodiment, a host computer 3201 is redundantly backed-up by a dormant host computer 3203. If the host computer 3201 fails, the dormant host computer 3203 which monitors the host computer 3201 identifies the failure and takes over. Similarly, base stations 3205, 3207, 3209, 3211, 3213 and 3215 are redundantly backed-up by dormant base stations 3217, 3219, 3221, 3223, 3225 and 3227, respectively. A communication link 3229 which may consist in whole or in part of a hard-wired or RF link provides the communication pathway between these host computers and base stations. FIG. 24 depicts the same devices organized as nodes on branches of a spanning tree.

Also providing redundancy, the "root" base station, as defined by the spanning tree, is selected by the "preselect number" (described in reference to the attaching criterion related to FIG. 18 above). The non-dormant base station with the highest "preselected number" is initially designated to be the spanning tree "root". If that base station subsequently fails, either the corresponding dormant base station can take over the full functionality of the "root", or the non-dormant base station with the next highest "preselected number" can be designated as the new "root". In this manner, spanning tree redundancy is maintained.

In an alternate preferred embodiment, an SST (Spread Spectrum Terminal) network is used implements a hierarchical radio frequency network of, potentially roaming terminals used primarily for online data entry and occasionally for batch file transfers. The network is characterized by sporadic data traffic over multiple-hop data paths consisting of RS485 or ethernet wired links and single-channel direct-sequenced, spread-spectrum radio links. The network architecture is complicated by moving nodes, hidden nodes, sleeping nodes, transient radio links, and unidirectional radio links.

The SST network consists of the following types of devices: 1) hosts; 2) controllers; 3) base stations; and 4) terminals. A "host" or host computer, communicates with terminals in the SST network. A "controller" is a gateway which passes messages between the host and the terminals. A "base station" device is used as an interior node for extending the range of a controller. Base-station-to-controller or base-station-to-base-station links can be maintained either with hard-wired or radio communication. A "terminal" i.e., a Norand hand-held computer, printer, etc., interfaces through the SST network to the host via interior nodes.

The terminals, controllers, hosts and base stations are logically organized as nodes in an optimal spanning tree with a controller as the root node, internal nodes in base stations or other controllers on branches of the tree, and terminal nodes as possibly roaming leaves on the tree. With the exception of the root node, each child node is connected by a single logical link to a parent node. Like a sink tree, nodes closer to the root of the spanning tree are said to be "downstream" from nodes which are further away. Conversely, all nodes are "upstream" from the root. Packets are only sent along branches (i.e., logical links) of the spanning tree. Nodes in the network use a "backward learning" technique to route packets along branches of a spanning tree.

Devices in spanning tree are logically categorized as one of the following three node types: 1) roots; 2) bridges; or 3) terminals. A "root" is a controller device which functions as the root bridge of the network spanning tree. The spanning tree has a single root node. Initially, all controllers are root candidates. One and only one root node is determined for each autonomous network by using a priority-based root selection algorithm.

A "bridge" is an internal node in the spanning tree which is used to "bridge" terminal nodes together into an interconnected network. The root node is a bridge, and the term "bridge" may be used to refer to all non-terminal nodes or all non-terminal nodes except the root depending on the context. A bridge node consists of a network interface point and a routing function.

A "terminal" is a leaf node in the spanning tree. A terminal node can be viewed as the software entity that terminates a branch in the spanning tree. A terminal node consists of a network interface point and one or more terminal access points.

A controller device contains a terminal node(s) and a bridge node. The bridge node is the root node if the controller is functioning as the root bridge. A base station contains a bridge node. A base station does not contain a terminal node; a terminal device contains a terminal node. Additionally, a bridging entity refers to a bridge node or to the network interface point in a terminal device.

Network interface points are single network addressable entities which must exist in all nodes. A network interface point is equivalent to the software entity which is used to interface the SST network to a device or bridging node. Note that a controller device connected to a host computer a network interface point which references the host computer and a second discrete network interface point which references the bridging node in the controller. Each network interface point is identified by a unique network address. Unless otherwise specified, this document uses "network address" or simply "address" to refer to the identifier of a network interface point. Moreover, multiple network interface points may be referenced with multicast and broadcast addresses.

Terminal access point refers to a higher layer access point into the network. A terminal access point is defined by the concatenation of the network interface point address and the terminal access point identifier. A terminal device or controller device can have multiple terminal access points.

A logical port is defined by a physical port and a network interface point. This implies that a single device may have more than one physical port with the same network address. In this document "port" refers to a logical port.

A controller device 3301 has two NIP's 3303 and 3305. As an example, the NIP 3303 in a controller's terminal node 3307 is equivalent to the software entity which interfaces to a host computer. Two TAP's 3309 and 3317 attached to that NIP identify discrete applications (i.e., terminal emulation and file transfer applications directed to the host computer). A base station 3313 has a NIP 3315 and a NRF 3317, while terminals 3319 and 3321 have TAP's 3323 and 3325 and NIP's 3327 and 3329.

This network environment involves the following characterization features: 1) wired or wireless node connections; 2) network layer transparency; 3) dynamic/automatic network routing configuration; 4) terminals can move about the radio network without losing a data link connection; 5) ability to accommodate sleeping terminals; 6) ability to locate terminals quickly; 7) built-in redundancy; and 8) physical link independence (i.e., higher layer protocols must be consistent across heterogeneous physical links).

This SST network is functionally layered with a MAC (Medium Access Control) layer, bridging layer, data link or transport layer, and higher layers. The MAC layer is responsible for providing reliable transmission between ports on any two devices in the network (i.e. terminal-to-base station). The MAC has a channel access control component and a link control component. The two components are equivalent to the TSO media access control and data link control sublayers, respectively. The link control component facilitates reliable point-to-point frame transfers in the absence of collision detection and in the presence of errors. A detailed description of the MAC Control Byte used in the MAC layer is shown in attached Appendix G.

A polling protocol is used to restrict contention to request-for-poll (RFP) frames thus minimizing contention for data frames. This protocol uses several channel access control algorithms to regulate access to the communications channel. The algorithms are link-type dependent and incorporate a random backoff algorithm to prevent deadlock and instability in contention situations. Specifically, a p-persistent CSMA/CA (carrier sense multiple access with collision avoidance) protocol is used to gain access to an RS485 LAN. The collision avoidance scheme gives channel access priority to the recipient of a unicast frame, on lightly loaded spread spectrum radio links, a non-persistent CSMA algorithm is used to gain access to the communications channel. Under moderate to heavy channel utilization, an LBT/IBP (listen-before-talk with busy pulse) algorithm is used to gain access to the channel and minimize the effect of hidden nodes.

This bridging layer routes packets from terminals to the host, from the host to terminals, and from terminals to terminals along branches of the spanning tree. To accomplish this, the bridging layer uses a "HELLO protocol" to organize nodes in the network into an optimal spanning tree rooted at the root bridge. The spanning tree is used to prevent loops in the topology. Interior branches of the spanning tree are relatively stable (i.e. controllers and relay stations do not move often). Terminals, which are leaves on the spanning tree, become unattached and must be reattached, frequently. Additionally, the bridging layer also: 1) maintains spanning tree links; 2) propagates lost node information throughout the spanning tree; 3) distributes network interface addresses. 4) organizes nodes into logical coverage areas on radio channels; and 5) The bridging layer provides a service for storing packets for SLEEPING terminals. Packets which cannot be delivered immediately can be saved by the bridging entity in a parent node for one or more HELLO times.

The data-link layer provides an end-to-end data path between data-link access points in any two nodes in the network. The data-link layer provides a connection-oriented reliable service and a connectionless unreliable service. The reliable service detects and discards duplicate packets and retransmits lost packets. The unreliable service provides a datagram facility for upper layer protocols which prove a reliable end to end data path. This layer provides services (ISO layer 2) for terminal-to-host application sessions which run on top of an end-to-end terminal-to-host transport protocol. However, the data-link layer provides transport (ISO layer 4) services for sessions contained within the SST network.

For terminal-to-terminal sessions contained within the SST network, the data-link layer provides transport layer services and no additional network or transport layer is required. In this case, the MAC, bridging, and data-link layers discussed above can be viewed as a data-link layer, a network layer, and a transport layer, respectively. For terminal-to-host-application sessions, higher ISO layers exist on top of the SST data-link layer and must be implemented in the terminal and host computer as required.

MAC frames contain a hop destination and hop source address in the MAC header. Bridging packets contain an end-to-end destination and source address in the bridging header. Data-link headers contain source and destination access point identifiers. A data-link connection is defined by the concatenation of the bridging layer source and destination address pairs and the destination and source data-link access points. One end of a connection is equivalent to a terminal access point and is specified as <access_point>@<network_address>, where aliases can be used for both. MAC and bridging addresses are consistent and have the same format.

All devices must have either a unique long identifier which is programmed into the device at the factory and/or an alias which is entered by the user or is well-known. The long address/alias is only used to obtain a short network address from the root node. A network address uniquely identifies the network interface point in each node. This network address is obtained from an address server in the root. The network interface point passes the network address to the MAC entity attached to each port on a device. Short addresses are used to minimize packet sizes.

A network address consists of a node type and a unique multicast, or broadcast node identifier. A node type identifier of all 1's is used to specify all node types while all 0's specifies a root address. Particularly, node identifier of all 1's is the default node identifier used until a unique node identifier is obtained.

In addition to source and destination addresses, each network packet contains a spanning tree identifier in the MAC header. A default spanning tree identifier is well-known by all nodes. A non-default spanning tree identifier can be entered into the root node (i.e., by a network administrator) and advertised to all other nodes in HELLO packets. The list of non-default spanning trees to which other nodes can attach must be entered into each node. A global spanning tree identifier is also well-known by all nodes, and is reserved for the identify of a spanning tree to which all nodes can attach.

The network node identifier of a root node is always all 0's and is well-known. All other nodes must obtain a unique network node identifier from a (RARP) Reverse Address Resolution Protocol server in the root node. A node identifier of all 1's is used until a unique identifier is obtained. To get a unique identifier, a node must send a RARP request packet to the RARP server. This packet contains the requesting node's unique long identifier and/or an alias for the long identifier. A network address is returned to the requesting node in a RARP response packet.

Nodes must obtain a new network address whenever a new root node is discovered and whenever an ADDRESS-TIMEOUT inactivity period expires without the node receiving a packet from the bridging entity in the root. A node can prevent its address from expiring by sending an empty ATTACH.request packet to the root.

The address server in the root associates an age factor with each allocated network address. The age factor is incremented each time an ADDRESS-TIMER expires. The age factor is reset to zero ("0") whenever the address is used. An address is available for use by a requesting node if it has never been used or if it has been inactive for a MAX-ADDRESS-LIFE timer period. MAX-ADDRESS-LIFE must be larger than ADDRESS-TIMEOUT to ensure that an address is not in use by any node when it becomes available for another node. If the root receives a RARP.request packet from a source for which an entry exists in the address queue, the root simply resets the age factor to zero and returns the old address.

More specifically, the bridging layer organizes nodes into an optimal spanning tree with a single root bridge at the root of the tree. The spanning tree identifier allows more than one logical tree to exist in the same coverage area. Spanning tree organization is facilitated with a HELLO protocol which selects a root node and enables nodes to determine the shortest path to the root before attaching to the spanning tree. All messages are routed along branches of the spanning tree.

Restricting each node to a single parent guarantees that there will be no loops in the logical topology.

Nodes in the network are generally categorized as "attached" or "unattached". Initially, only the root is attached. A single controller may be designated as the root or multiple root candidates (other controllers) may negotiate to determine which node is the root.

Attached bridge nodes are root candidates transmit HELLO packets at calculated intervals. The HELLO packets include:

1) the source address;
2) a broadcast destination address;
3) the distance (cost) to the root;
4) a "seed" value used to calculate the time of the next HELLO packet;
5) a hello slot displacement which specifies the displacement of the actual hello slot time from the calculated hello slot time or to indicate that the hello time was not calculated (i.e. was unscheduled);
6) a spanning tree identifier (LAN ID);
7) the priority of the root node (or root candidate);
8) the long, unique device identifier of the root node (or root candidate);
9) descendent count (optional);
10) a pending message list (optional); and
11) a detached-node list.

When desirable, terminals may discontinue its monitoring of the communication channel by going to sleep. The "sleep mode", which is also further described below in relation to FIGS. 28-30, involves the powering down of the transceiver circuitry of the terminal to conserve batter energy. Pending messages for these SLEEPING terminals are stored in lists in the parent node which include the network address for accessing the list d SLEEPING terminals.

In an alternative embodiment, the terminal initiating communication with a base station would identify the length of the message to be communicated. This identification could be made in request to send request for poll and packet. All "listening" terminals could then adjust the sleep time period so as to wake-up only after the transmission has ended.

Detached-node lists are also maintained to enable the spanning tree algorithms. These lists contain the addresses of nodes which have detached from the spanning tree. Each internal node learns which entries should be in its detached-node list from DETACH packets which are broadcast by internal nodes when a child is lost. Entries are also included in HELLO packets for DETACH-MSG-LIFE hello times.

Attached nodes broadcast short HELLO packets immediately if they receive an ATTACH.request packet with a global destination address; otherwise, attached nodes only broadcast HELLO packets at calculated time intervals in "HELLO-slots". Short HELLO packets do not contain a pending-message, long-root identifier, or a detached-node list. Short HELLO packets are set independently of regular HELLO packets and do not affect regular hello timing. The end-to-end ATTACH.request functions as a discovery packet, and enabling nodes in the path to the root node to quickly learn the address of the source node.

Unattached nodes (nodes without a parent in the spanning tree) are initially in an UNATTACHED state. During the UNATTACHED state, a node learns which attached bridge is closest to the root node by listening to HELLO packets. After the learning period expires an unattached nod sends an ATTACH.request packet to the attached node closest to the root. However, nod s without a network address must first send a RARP.request packet to the root to obtain a network address. The attached node adopts the unattached node as a child by acknowledging the ATTACH.request packet and forwarding it on to the root node. The root node returns the request as an end-to-end ATTACH.confirm packet if a response packet required (RPRQ) flag is set. If the newly attached node is a bridge, it calculates its distance to the root, by adding its link distance to the total distance of its new parent, and begins to transmit HELLO packets.

The UNATTACHED learning state ends after HELLO-RETRY hello time slots if HELLO packets have been received from at least one node. If no HELLO packets have been received the listening node waits (i.e. sleeps) and retries later.

An attached node may respond to a HELLO packet from a node other than its parent (i.e. with an ATTACH.request packet) if the difference in the hop count specified in the HELLO packet exceeds a CHANGE-THRESHOLD level. Only attached bridges or the root may respond to an ATTACH.request packet. Unattached nodes may broadcast a global ATTACH.request with a multicast bridge destination address to solicit short HELLO packets from attached bridges. The net effect is that the UNATTACHED state may optionally be shortened. Normally, this facility is reserved for terminals with transactions in progress.

ATTACH.request packets contain a "count" field which indicates that a terminal (i.e. which sent the request) may be SLEEPING. The bridging entity in the parent of a SLEEPING terminal can temporarily store messages for later delivery. If the count field is non-zero, the bridging entity in a parent node stores pending messages until the message is delivered, or the "count" hello times have expired. ATTACH.request packets may also contain a decedents list so that an internal node may attach itself and the subtree under it (i.e., to a bridge node closer to the root). In addition, data-link layer data can be piggy-backed on an ATTACH.request packet from a terminal Attached notes forget their network address and return to the UNATTACHED state whenever a HELLO packet is received with a new root node identifier.

The incremental portion of the distance between a node and its parent is primarily a function of the physical link type (i.e. ethernet, RS485, or radio communication). On radio communication links, bridging connections are biased toward the link with the best signal strength. Signal strength is not a factor in the cumulative path distance. The distance component is intended to bias path selection toward high-speed (i.e. wired) connections. On wired links, the weighted distance is the only criteria for choosing a parent.

Specifically, on radio links, a parent is chosen based on the following criteria: 1) the signal strength must exceed a minimum threshold value; 2) if two potential parent nodes are at a different distance from the root, the one with the least distance is chosen; 3) if two potential parent nodes are at the same distance, the node with the best signal strength is chosen; and 4) if two potential parent nodes are at the same distance and have the same signal strength, then the node with the lowest address is chosen. The intent of the above criteria is to create stable disjoint logical coverage areas in the presence of physically overlapping coverage areas. Ideally, all radio terminals in a coverage area will be attached to a single bridge node.

The concept of disjoint logical coverage areas is especially important when radio bridge nodes are placed in close proximity to provide redundant coverage for protection against a failure. The MAC entity in one of the bridge nodes can efficiently regulate access to the channel by queuing terminals for polling without coordination with other co-located bridge nodes.

All packets are routed along branches of the spanning tree. Bridges "learn" the address of terminals by monitoring traffic from terminals to the root. When a bridge receives a packet directed toward the root, the bridge creates or updates an entry in its routing table for the terminal. The entry includes the terminal address and the bridge address which sent the packet. The latter address is called the hop source address. When a bridge receives an upstream packet moving from the root toward a terminal the packet is forwarded to the upstream node which is specified in the routing entry for the destination.

Upstream packets are discarded whenever a routing entry does not exist. Downstream packets are simply forwarded to the next downstream node in the branch of the spanning tree. No explicit routing is required for downstream traffic because the route is defined by the structure of the spanning tree. A packet travels downstream until a node is reached which has an entry in its routing table for the destination address. The packet is then explicitly accomplished by routing all traffic through the nearest common ancestor of both terminals. In the worst case, the root is the nearest common ancestor. Additionally, an address resolution server in the root node facilitates terminal-to-terminal communications.

Referring back to the exemplary configuration shown in FIG. 24, if a terminal 3417 sends a packet to a terminal 3403, the packet follows the downstream hops from the terminal 3417 through a base station 3407, through a bas station 3405, to a node, 3401 and to a root node 3404. Routing tables are not required for the downstream hops. The routing function at the root node 3404 has an entry for the terminal 3403 in its routing table which specifies the terminal 3403 as the first upstream hop to terminal 3403. Therefore, the packet is explicitly routed upstream to the terminal 3403.

As a second example, if terminal 3419 sends a packet to terminal 3417, the packet follows one downstream hop from the terminal 3419 to the base station 3405. The routing function at the base 3405 has an entry for the terminal 3417 in its routing table which specifies the base 3407 as the first upstream hop to the terminal 3407. The packet is routed upstream to the base 3407. An entry in the routing table at the base 3407 specifies the terminal 3417 as the first upstream hop to the terminal 3417, and the packet is thus routed.

As an extension to the routing algorithm described above, terminals may optionally cache the addresses of neighbors in a separate direct route table. If a terminal has a message for a destination listed in its direct route table, it may transmit it directly to the source node. Note that the packet may not follow a branch of the spanning tree. Direct-route table entries are "aged" relatively quickly. If a direct transmission fails, the entry in the direct-route table is discarded and the packet is simply forwarded downstream to the root. The header format filed in the bridge header must be set to point-to-point for directly transmitted packets. Direct routing has obvious advantages; however, it forces terminals to maintain additional MAC layer state information.

As an example of direct routing, in FIG. 25, a terminal 3425 can route packets directly to a terminal 3427, if the terminal 3425 has an entry for the terminal 3427 in its direct routing table. The direct routing table in a node is built by listening to traffic directed to other nodes. If the MAC layer screens such traffic from the bridging layer, the direct routing table must be built by the MAC layer.

Paths in the spanning tree can change for a number of reasons. First, any node may select a new path to the root if the distance of its parent from the root is CHANGE-THRESHOLD greater than the distance in a HELLO packet from another node where CHANGE_THRESHOLD can be as small as one ("1"). A node on a radio channel should always choose for its parent the node with the best signal strength, and, all else being equal, the node with the lowest address. A node can move its entire subtree by including a decedents list in the ATTACH.request packet sent to the new parent. Rapidly moving terminals can also cache a short list of alternate parents. Periodically, SLEEPING terminals stay awake for at least one full HELLO to HELLO period to discover changes in the network topology.

Second, a parent node detaches the subtree rooted at a child node whenever a message cannot be delivered to the child. This occurs when the MAC layer in a parent node fails to deliver a unicast bridging layer packet to a child node. In addition, the bridging entity in a parent node can retain messages for a child terminal node. Terminals request the save messages by sending a DATA-REQUEST.request packet to the parent. If the message is not requested and delivered after a pre-determined number of HELLO periods, the terminal is detached. If the detached node is a bridging node, the parent node sends a DETACH.request packet to the root node which contains a decedents list that defines the lost subtree. If the detached child is a terminal, the parent floods a DETACH.request throughout all branches of the spanning tree using a reliable broadcast mechanism. The detached node information which is broadcast in flooded DETACH.request packets is added to the detached-node-set maintained in each bridge node. Each entry in the set has a HELLO-count associated with it. If an entry in the detached node list of a DETACH.request packet already exists in a bridge's detached-node-set, the associated HELLO-count filed is reset to zero ("0"). The detached-node-set is copied into the detached-node-list in the bridge's HELLO packets. The HELLO-count field for each entry is incremented after each HELLO is transmitted. Entries whose hello-count field exceeds a predetermined HELLO-value are deleted.

Third, a child node goes into state whenever its MAC layer fails to deliver a message to its parent. If the child node is a bridge, it continues to broadcast scheduled HELLO packets with an infinite distance for a time greater than that defined by the HELLO-value (HELLO-retry+1 time). If the child node is a terminal, it may solicit short HELLO packets to shorten the UNATTACHED state. The UNATTACHED learning state has expired the node reattaches by transmitting an ATTACH-.request to the bridge node closest to the root.

Fourth, if a node in an ATTACHED state receives a DETACH packet or a HELLO packet with its network address in the detached-node-list, it must enter the UNATTACHED state and reattach to the spanning tree. Additionally, a node can shorten the UNATTACHED state by soliciting short HELLO packets. After reattaching, the node must remain in a HOLD-DOWN state for HELLO+1 time. During the HOLD-DOWN state, the node ignores its address in DETACH packet and HELLO packet detached-node-lists. After the HOLD-DOWN period expires, the node sends a second ATTACH.request to the root to ensure that it is still attached.

Fifth, entries in routing tables are aged. When routing table space for a new entry is required, either an unused entry or the oldest (i.e. least recently used) entry is selected. If a used entry is selected, the old information is simply discarded. The aging factor associated with each table entry is reset to zero ("0") each time a new packet from the associated node arrives. In the absence of a regular data traffic, a node must periodically send an ATTACH.request packet to the root node to maintain its path in the spanning tree.

Sixth, a node enters the ATTACHED-LISTEN state whenever two HELLO packets from its parent are missed. SLEEPING terminals remain awake during the ATTACHED LISTEN state. This state ends when the node receives a data or HELLO packet from its parent. The node enters the UNATTACHED state when either its address appears in the detached list if a DETACH or HELLO packet or a total of HELLO-RETRY−1 consecutive HELLO packets are missed. The time that a node spends in the ATTACHED-LISTEN state is less than the lifetime of detached node information in the network. This ensures that a detached node always enter the UNATTACHED state since either the node finds its address in a detached-node-list or misses HELLO-RETRY−1 HELLO packets and goes into the UNATTACHED state before it sees a "good" HELLO packet from its parent.

Lastly, any node which receives a HELLO packet from its parent with an infinite distance immediately enters the UNATTACHED state. If the node is a bridge, it must continue to broadcast HELLO packets with an infinite distance for HELLO-times.

Old invalid paths may exist in the spanning tree for a period of time. For example, if a terminal detaches and reattaches to a different branch in the spanning tree, all downstream nodes in the new branch "learn" the new path to the terminal. Nodes which were also in the old path change their routing tables and no longer forward packets along the old path. At least one node, the root, must be in both the old and new path. A new path is established as soon as an end-to-end attached request packet from the terminal reaches a node which was also in the old path. Any remaining old path fragment is disjoint from the new path.

A parent node generates a DETACH.request packet whenever it is unable to deliver a message to a child node. When a parent node is unable to deliver a message to a child bridge node, it sends a DETACH.request packet, to the root node, which contains a detached-node-list describing the lost subtree. The list contains all nodes in the routing table of the parent for which the lost bridge was the first upstream hop. All downstream nodes in the path of the DETACH packet must adjust their routing tables by deleting entries which match those in the detached-node-list.

When a parent node is unable to deliver a message to a terminal, it must generate a DETACH.request packet with the terminal specified in the associated detached-node-list and flood the packet throughout all branches of the spanning tree. This packet is forwarded using a reliable broadcast mechanism. In response a DETACH packet is issued which contains a forward list to specify which nodes should forward and acknowledge the DETACH.request. Initially, the forward list consists of all bridges which are either children or the parent of the node which generated the packet. Nodes in the forward list acknowledge the DETACH.request with a DETACH.response and forward the DETACH.request along all branch s of the spanning tree except the branch it was received on, but with one exception. A bridge node in the forward list do s not forward an entry in the detached list of a DETACH.request if the DETACH.request came from an upstream node and the upstream node is not the first hop in the routing table entry associated with the entry in the detached-node-list. Upstream bridges which do not have bridge nodes as children broadcast the DETACH.request one time without a forward list.

The destination address used to forward a flooded DETACH.request is global. Therefore, the detached terminal receives a DETACH.request and quickly learns that it has been detached. All bridge nodes, which receive the DETACH.request, add the detached terminal to their detached-node-list. These lists are broadcast in HELLO packets for HELLO-times or until the bridge determines the terminal has reattached.

All attached non-terminal nodes broadcast periodic HELLO packets in discrete HELLO-slots at calculated intervals. Nodes learn which HELLO-slots are busy and refrain from transmitting during the occupied region of busy HELLO-slots. Bridge nodes do not transmit HELLO packets in busy HELLO-slots.

The HELLO packet contains a "seed" field used in a randomization algorithm to determine the next HELLO-slot for the transmitting node and the next seed. The address of the transmitting node is used as a factor in the algorithm to guarantee randomization. Nodes can execute the algorithm "i" times to determine the time (and seed) of the "i-th" HELLO packet from the transmitter. After attaching, a bridge chooses a random initial seed and a non-busy HELLO slot and broadcasts a HELLO packet in that slot. The bridge chooses succeeding HELLO slots by executing the randomization algorithm. If an execution of the algorithm chooses a busy slot, the next free slot is used and a HELLO "displacement" field indicates the offset from the calculated slot. Cumulative delays are not allowed (i.e, contention delays during the "i-th" HELLO transmission do not effect the time of the "i+1" HELLO transmission). In addition, default HELLO-TIME and HELLO-SLOT-TIME values are set at compile time and are well-known by all nodes. Modified HELLO-TIME and HELLO-SLOT-TIME values are set by the root node and are advertised throughout the network in HELLO packets. The HELLO-SLOT-TIME values must be large enough to minimize HELLO contention.

A node initially synchronizes on a HELLO packet from its parent. A SLEEPING node can calculate the time of the next expected HELLO packet from its parent and can power-down with an active timer interrupt set to wake it just before the HELLO packet is transmitted. The bridging entity in a parent node can store messages for SLEEPING nodes until the message are requested. A terminal learns that it must request a saved message by examining the pending message list in the HELLO packet. This implementation enables SLEEPING terminal to receive unsolicited messages and relaxes the timing constraints for transaction oriented messages. Retries for pending messages are transmitted in a round-robin order when messages are pending for more than one destination.

The bridging layer does not provide a reliable end-to-end service, thus lost and duplicate packets are handled by a higher layer. The bridging layer does not fragment packets and packets are normally delivered in sequence.

The data-link layer is implemented as an extension of Class 2 (LLC) (Logical Link Control as defined in ISO Standard 8802-2.2. The extensions to LLC are: an additional unnumbered command frame—SABMX, and 15-bit send and receive sequence numbers. In addition, the implantation must include an adaptive time-out algorithm for retransmissions. Unreliable ("type 1") and reliable ("type 2") connection-oriented services are provided. The unreliable service is provided for terminals which support a reliable end-to-end transport protocol with a host computer. LLC type 2 provides a reliable end-to-end transport service for long-lived terminal-to-terminal connections within the spanning tree network. A fast-connect VMTP-like transport protocol is used for transient terminal-to-terminal connections. The VMTP-like service is primarily provided for Remote Procedure Calls (RPC), client/server transactions, and short mail messages.

The interfaces to the next upper (i.e. application) layer include:

1) handle=CONNECT(destination, . . . );
2) handle=LISTEN($$AP, . . . );
3) SEND(handle, buffer, length, [destination]);
4) DATAGRAM(handle, buffer, length, [destination]);

5) TRANSACTION(handle, tx-buf, tx-len, rx-buf, max-rx-len, IDEMPOTENT, destination);
6) RECEIVE (handle, buffer, max-length, [destination]);
7) PENDING_MESSAGE(handle, [destination]); and
8) DISCONNECT(handle).

Designation fields are formed by concatenating the destination service access point (DSAP) with the destination network address where aliases are used for both. For example, 3270@HOST1 might designate a 3270 terminal controller application in a controller node. The DSAP can specify a remote terminal application or the access point to a higher layer protocol in a remote node. More specifically, the "handle" designates the connection type and is the connection identifier for LLC connections. The optional "destination" filed in send and receive operation is only used for the VMTP-like interface. SEND messages require a response. DATAGRAM messages are used to send messages to a hose which is capable of supporting end-to-end host-to-terminal transport connections and do not require a response. TRANSACTION is used to send transaction-oriented messages with the VMTP-like facility. An error occurs if a return message is not received in a TRXN-TIME-OUT period. The data-link/transport entity saves response messages and resends the response when a duplicate transaction message is received. In addition, an application can mark a transaction as redoable, by setting the IDEMPOTENT flag ON. In this case, the response message is not saved and the response is regenerated by re-executing the transaction. A response message can be guaranteed in the form of an acknowledgment from a higher layer protocol.

Because the bridging layer provides an unreliable service, the data-link layer is required to detect duplicate packets and retransmit lost packets. Detecting duplicates is facilitated by numbering data-link packets with unambiguous sequence numbers.

LLC type 2 connections are established by sending a SABMX control frame to the destination network address. To prevent frames from old connections from being accepted (i.e. with a sequence number of "0") the node which initiates a connection must ensure that at least MAX-PACKET-LIFE time has expired since the last connection before issuing a new CONNECT for the same destination. Because of the required waiting period, type 2 LLC connections are not ideal for the type of transient connections needed to reliably facilitate remote procedure calls, client/server transactions, and sporadic mail messages.

LLC frames are sequenced from zero ("0") to MAX-SEQ. The maximum number of outstanding frames (i.e., transmitted but not acknowledged) is LLC-WINDOW-SIZE. The default value LLC-WINDOW-SIZE is relative small, but the window size may be expanded with an XID frame. Because all frames sent during a connection may not follow the same path, no more than MAX-SEQ frames may be sent in a MAX-PACKET-LIFE time period.

A problem can arise when a node successfully transmits a data-link frame to the next downstream hop on a busy path but loses all acknowledgments. At this point, the node is detached and must quickly reattach to the spanning tree. If the next parent of the node is on a shorter, less busy branch, frames on the new path can easily arrive at the destination while old frames still exist in the old path. MAX-PACKET-LIFE is equal to MAX-HOPS multiplied by XMIT-Q-SIZE multiplied by MAX-RETRY-TIME, where MAX-HOPS is the maximum length of a branch of the spanning tree in hops, XMIT-Q-SIZE is the number of packets which can be queued in each node, and MAX-RETRY-TIME is the maximum time the MAC layer can spend retrying a frame before it is suc-cessfully sent. This problem is solved by increasing the size of the send and receive sequence number fields (i.e. from 7 bits to 15 bits) so that the N(S) and N(R) fields in an information frame can never roll over faster than MAX-PACKET-LIFE time. Note that the spanning tree topology insures that packets will not loop.

VMTP-like connection records are built automatically. A VMTP-like connection record is built or updated whenever a VMTP-like transport message is received. The advantage is that an explicit connection request is not required. A VMTP-like connection is half-duplex. It is contemplated, however, that a full-duplex connection at a higher layer could be built with two independent half-duplex VMTP-like connections. Acknowledgements must be handled by higher layers. Connections are defined by the concatenated network end-to-end destination and source addresses and service access points. The LLC type 2 data-link entity in a node stores messages for possible retransmission. Retransmissions may not always follow the same path primarily due to moving terminals and resulting changes in the spanning tree. For example, the bridging entity in a parent node may disconnect a child after the MAC entity reports a message delivery failure. The child soon discovers that it is detached and reattaches to the spanning tree. When the data-link entity in the root resends the message, it follows the new path.

The data-link entity in a terminal calculates a separate time-outs for SEND and TRANSACTION operations. Initially, both time-outs are a function of the distance of the terminal from the root node. A TCP-like algorithm is used to adjust the expected propagation delay for each message type to the end-to-end distance and load without causing sporadic changes or dramatic swings in time-out values. Messages, which require a response, are retransmitted if twice the expected propagation time expires before a response is received. SLEEPING terminals can power down for a large percentage of the expected propagation delay before waking up to receive the response message. Missed messages may be stored by the bridging entity in a parent node for a predetermined number of HELLO times.

The MAC layer is responsible for providing reliable transmission between any two nodes in the network (i.e. terminal-to-bridge). Access to the network communications channel is regulated in several ways. First, the HELLO protocol, described above, reduces contention for HELLO packets. Second, nodes are grouped into logical coverage areas associated with a single bridge node. CSMA and LBT algorithms are used to gain access to the channel. Lastly, a polling protocol reduces contention for data frames.

IEEE 802.3 media access control is used for ethernet links. A p-persistent CSMA/CA with ARQ (automatic retry request) protocol is used to gain access to the channel on the RS485 LAN. In addition, a collision avoidance protocol is implemented on RS485 LAN links. Bridging layer packets are typically sent in a single MAC layer data frame on both ethernet and RS485 LAN links. Short blocks can be transmitted as soon as an idle channel is detected. Before a long data frame can be transmitted on a wired link a potential transmitter must sense an idle channel, transmit an RFP frame and receive a POLL frame from the receiver. After a data frame is transmitted, the receiver notifies all listening nodes that the channel is free by sending a CLEAR frame.

A simple return priority mechanism is implemented by requiring a potential transmitter to sense an idle line for an IDLE-TIME period which exceeds the maximum transmitter/receiver turnaround time. The recipient of a unicast frame "owns" the channel for the turnaround time and can respond without executing the CSMA algorithm. This approach makes response times more deterministic and allows the sender to set response time-outs tightly. Short time-outs allow transmitting nodes to quickly retry out and discover disconnected links.

A CSMA random-backoff algorithm specifies backoff delays as a function of the CSMA slot time. A CSMA slot is calculated as a function of the worst-case carrier-sense ambiguous period. If, for example, in the worst case, it takes a character-time to determine that a frame is in progress then the CSMA slot time is defined to be slightly longer than one character time. The algorithm divides the sense time into "p" contiguous slots and chooses a number, "i", between one ("1") and "p". If the first "i" slots are idle then the algorithm allows transmission in the "i+1" slot. If one of the first "i" slots is busy, the device executing the algorithm listens until the channel is idle and re-executes the algorithm.

A polling protocol, which is consistent with the collision avoidance protocol used on wired links, is used to gain access to the channel on spread spectrum radio links. The polling protocol reduces contention in an environment with hidden terminals in several ways. On radio links, a MAC transmitter fragments a bridging layer packet into short fixed length frames before the packet is sent. The fragments are reassembled by the receiver and are posted to the receiver's bridging layer if, and only if, all frames in the packet are received. A group of frames which is associated with a single bridging layer packet is called a bracket. Fragmentation at the MAC layer allows the MAC entity to used a (shorter) frame size which is suitable for the like error rate without impacting packet sizes at the bridge layer.

Additionally, the polling radio link protocol generally limits contention of RFP frames. Before a bracket of frames can be transmitted on a radio link, a potential transmitter must sense an idle channel, transmit an RFP frame and receive a POLL frame from the receiver. If the receiver is busy it responds with a wait-for-poll (WFP) frame. The WFP frame positively acknowledges the RFP frame and causes the transmitter to wait for a POLL frame. Nodes are queued for polling in the order in which RFP frames arrive. After the last frame in a bracket is transmitted and successfully received, the receiver sends a CLEAR frame to notify all listening nodes that the channel is open.

In summary, the MAC layer:

1. accepts frames from the bridging layer and passes frames to the physical layer for transmission;
2. appends MAC layer framing bytes and CCITT-16 FCS bytes to transmitted frames;
3. removes MAC layer framing bytes and FCS bytes from received frames;
4. verifies the FCS bytes in received frames;
5. filters out frames which do not belong to the SST network on the local device;
6. filters out packets which are not directed to the local device;
7. forwards packets to the bridging layer which are directly addressed to the local device, or are broadcast or multicast to the local device;
8. regulates access to the communications channel on RS485 links and spread spectrum radio links;
9. schedules lost unicast frames for retransmission;
10. detects and discards duplicate back-to-back unicast MAC level data frames;
11. provides device-to-device flow control;
12. transparently fragments and reassembles bridging layer packets, which exceed the maximum MAC frame size; and
13. maintains and provides diagnostic statistics for higher layers.

Before delving into the specifics of the MAC layer a few points must be clarified. First, p-persistent CSMA/CA (carrier sense multiple access with collision avoidance) protocol is used to gain access to an RS485 LAN. The collision avoidance scheme gives channel access priority to the recipient of a unicast frame. Second, on lightly loaded spread spectrum radio links, a non-persistent CMA algorithm is used to gain access to the communications channel. Third, on moderately to heavily loaded spread spectrum radio links, an LBT/BP (listen-before-talk with busy pulse) algorithm is used to gain access to the channel and minimize the effect of hidden nodes. An LBT slot is defined as the total time required to transmit an RFP (request-for-poll) frame plus the time required by the receiver to begin transmitting the response.

Finally, CSMA idle time is the minimum time that a potential transmitter must sense an idle channel before assuming the channel is idle. The CSMA idle time is greater than the interframe gap plus the CSMA slot size. LBT idle time is the minimum time that a potential transmitter must sense an idle radio channel with hidden nodes before assuming the channel is idle. The LBT idle time is greater than the interpoll gap time plus the CSMA slot size.

MAC-level frames are categorized as either request or poll frames. The DATA, FRP and ENQ frames are request frames while POLL, WFP, CLEAR and REJECT frames are poll frames. More specifically, a DATA frame is a MAC-level request frame which is used to send higher-layer data to a receiver.

An EOD (end-of-data)frame is a MAC-level request frame which is sent as the last data frame in a bracket of one or more data frames. Note that a bracket of data frames may consist of a single EOD frame. An FRP (request-for-poll) frame is a MAC-level request frame which is used to request polling from a receiver and to determine the SEQ state of the receiver. An ENQ (enquiry) frame is a MAC-level request frame which is used to determine the SEQ state of a receiver and to determine if a node is within range. A POLL frame is a MAC-level poll frame which is used to obtain a data frame from another node and to return the current SEQ state.

A WFP (wait-for-poll) frame is a MAC-level poll frame which is used to inform a requesting node that it is scheduled to be polled later and to return the current SEQ state. A CLEAR frame is a MAC-level poll frame which is used to inform all listening nodes that the last frame in a bracket of frames has been received and to return a defined SEQ state. A REJECT frame is a MAC-level poll frame which is used to return an undefined SEQ state or to indicate that a received request frame was invalid.

Each request or poll frame contains a control byte wherein each bit represents an element of information or control.

Three categories of bits in the control bytes of the request frame and the poll frame are the same. These bits are: 1) the R/P bit is used to distinguish MAC layer request and poll frames. If the R/P bit is set OFF the frame is a request frame. If the R/P bit is set ON the frame is a poll frame. 2) The SEQ bit is used to sequence MAC layer data frames, modula 2. The SEQ field is used to detect and discard duplicate packets. A state machine which illustrates the use of the SEQ bit and the response ACC bit is shown below; 3) The LAD ID bits. The MAC frame belongs to the spanning tree specified by the LAN ID bits. The MAC entity discards frames which belong to spanning trees which are not in its LAN_ID_list. Note that LAN_ID_list is a parameter of the MAC_enable call.

The request frame control byte further includes a Data bit, MORE bit and priority bit. The DATA bit is used to distinguish control request frames from data request frames. In control request frames the MORE bit is used to distinguish RFP frames from ENQ frames. In data request frames, the MORE bit is used to distinguish between DATA frames and EOD frames. The last frame sent in a bracket of data frames is always an EOD frame.

The Priority bit includes the priority of a higher layer message and is set as specified by the bridging layer, in the MAC_send call. The receiver simply passes the priority to the bridging layer. The Priority bit value is the same for all frames which are associated with a bracket of frames.

The poll frame control byte further includes a MORE bit and WAIT bit. The MORE bit is used to distinguish POLL frames from CLEAR frames. The WAIT bit is used to distinguish POLL frames from WFP frames. The receiver of a request frame can return a poll frame with the WAIT bit set ON in the associated poll frame to put the requesting node in a quiet state for WFP-TIMEOUT seconds. The requesting node must refrain from transmitting unicast frames to the receiver until the quiet period expires or a POLL frame is received from the receiver. In addition, a REJECT frame is specified by setting the MORE bit OFF and the WAIT bit ON.

Each node in the network has a single bridging entity which invokes a MAC entity per port to send and receive messages on the port. MAC layer services are provided with the following software routines:

1) MAC_enable (port, LAN_ID_list);
2) MAC_set-address (port, net_address);
3) MAC_send (port, desk_net_address, buffer, control_flags, [mailbox], [queue]);
4) length=MAC_accept (port, buffer, wait);
5) MAC_stop (port);
6) MAC_start (port);
7) MAC_disable (port);
8) MAC_enquiry (port, desk_net_address); and
9) MAC_diagnostic (port, . . . ).

Initially, the MAC entity attached to a port is in a DISABLED/OFF state. The bridging layer enables a MAC entity on a port by calling MAC-enable (port, LAN-ID-list), where LAN-ID-list defines the spinning trees to which the node can belong. MAC-enable changes the MAC entity state to ENABLED/ON.

The MAC entity uses a default multicast address consisting of the node type and a node identifier of all 1's, until the bridging layer assigns a specific network address to the MAC entity. The MAC-set-address call is provided for this purpose.

The bridging layer accepts messages from the MAC entity by issuing a MAC-accept call. The returned buffer includes the MAC header, but does not include media framing and CRC characters. The wait parameter can be used to suspend the caller for some length of time or until a message is received. The MAC entity must be capable of queuing messages until they are accepted by the bridging layer.

The bridging layer requests the MAC entity to transmit a bridging layer packet by issuing a call to MAC-send. Packets are grouped into a set of one or more MAC layer frame which, together, constitute a bracket. On radio ports, if the size of a bridging layer packet exceeds the maximum MAC frame length, then the packet is fragmented. A bracket normally contains a single data (EOD) frame on wired links. The MAC entity prefixed a MAC header to the beginning of each frame in a bracket before transmitting each frame. The MAC layer is also responsible for providing media framing, which includes a link-type dependent synchronization preamble, start-of-frame delimiter, end-of-frame delimiter, and CRC-CCITT frame check sequence bytes for each frame. The control-flags parameter in the MAC-send call is used to: 1) set the priority bit in the MAC header (priority); 2) to indicate if the buffer is being sent in response to a multicast bridging layer packet (p-flag); and 3) to set the LAN ID field in the MAC header. The optional mailbox and queue parameters are mutually exclusive and are used for asynchronous calls. Also, the maximum size of a buffer passed to the MAC layer for transmission is MAX-PKT-SIZE. The bridging layer can disable the MAC receiver by calling MAC-stop. The MAC entity is in an ENABLED/OFF state after a call to MAC-stop is used. The bridging layer forces the MAC entity back into the ENABLED/ON state by calling MAC-send or MAC-start. The bridging layer can disable the MAC entity and force it to the DISABLED/OFF state by calling MAC-disable. In addition, MAC-enquiry can be used to determine if a destination node is within range, and MAC-diagnostic is used to retrieve diagnostic statistics from the MAC layer.

When the MAC entity is in an ENABLED/ON state it is continuously listening on its assigned port. The MAC entity receives all MAC layer frames. Frames which do not pass a CRC-CCITT check are invalid and are discarded. Valid data frames are reassembled into a complete packet which is posted to the bridging entity if: 1) the LAN ID in the MAC header is among those contained in the LAN ID list passed to the MAC entity in the MAC-enable call; and 2) the destination address in the MAC header is equal to the network address of the local node, or is unacceptable multicast or broadcast address.

The high-order multicast bit is set ON in all multicast or broadcast frames. A multicast or broadcast frame is accepted if the node type specifies a group to which the local node belongs and either the node identifier is all ones ("1's"), or the node identifier is equal to the identifier of the local node. A response is never required when the multicast bit is set ON.

A default network address used when the MAC entity is first enabled consists of the multicast nod type concatenated with a node identifier of all ones. For example, the default address for a bridge is hexadecimal A7FF. The bridging layer is responsible for obtaining a network address and assigning it to the MAC entity on the port.

A return priority mechanism is used to group MAC layer request and poll frames into a single CA sequence. A channel access algorithm is executed to gain access to the channel before the first frame in a CA sequence is transmitted. All other frames in a CA sequence may be sent without executing the channel access algorithm. The idle time between frames which belong to a single CA sequence must be less than the maximum interframe gap time. On wired links, the CSMA/CA algorithm forces nodes to detect an idle channel for CSMA idle time which exceeds the interframe gap time before initiating a CA sequence. On radio links "hidden nodes" can cause throughput to be significantly degraded on spread spectrum radio links. Under lightly loaded conditions, a CSMA channel access algorithm allows nodes to access the radio channel immediately after detecting an idle channel. Under moderate to heavily loaded conditions, the LBT/DP algorithm forces nodes to detect an idle radio channel for an LBT idle time which exceeds the interpoll gap time before accessing the channel. By listening for longer than the interpoll gap time, a node will detect a conversation in progress, if both involved nodes are in range or only one node is in range and the other node is hidden. Limiting the time between frames in a CA sequence to a short fixed interval, essentially provides a busy-pulse signal which spans the coverage area of both nodes involved in a conversation.

A CA sequence of frames begins with the transmission of a request or poll frame, following an execution of the channel access algorithm. Possible successive frames in a CA sequence are: 1) any poll frame sent in response to a unicast request frame; 2) a DATA or EOD frame sent in response to a POLL frame; or 3) a bridge node can "piggyback" a second frame onto a transmitted broadcast, multicast, WFP, CLEAR, or REJECT frame, by transmitting the second frame within the interframe gap time.

The size of packets which are passed to the MAC layer by the bridging layer must be less than or equal to MAX-PKT-SIZE, where MAX-PKT-SIZE specifies the total length of the packet, including bridging and data-link header characters.

Packets which are larger than MAX-FRAME-SIZE must be fragmented, by the MAC entity, to insure that the interpoll gap time is constant. The fragmented frames are transmitted as a bracket with the MORE bit set OFF in the last frame to mark the end of the bracket. Frames which belong to a single bracket are reassembled by the MAC entity in the receiver before the packet is posted to the bridging layer in the receiver. If the entire bracket is not received successfully, all other frames in the bracket are discarded by the receiver. The maximum number of data frames in a bracket is the ceiling of MAX-PKT-SIZE/MAX-FRAME-SIZE.

MAX-FRAME-SIZE does not include characters added at the MAC level. MAX-FRAME-SIZE on the 192K bps spread spectrum radio link is limited by the interpoll gap time. On a wired links with low error rates, MAX-FRAME-SIZE is set so that a bracket is generally limited to a single LIMITED frame.

A bracket of frames may be transmitted in one or more CA sequences where a channel access algorithm is used to gain access to the link for each CA sequence. A transmitter initiates the transmission of a bracket of frames by sending either an RFP frame or an EOD frame to a receiver. If a receiver is not busy, the receiver responds to RFP and DATA frames with a POLL frame, which solicits the next DATA frame and implicitly acknowledges the previous frame. A receiver responds to an EOD frame with a CLEAR frame. If a receiver is busy or does not have a buffer, the receiver may respond to RFP, DATA or EOD frames with a WFP frame.

The node which initiates a bracket of frames (i.e., the transmitter) is responsible for recovery until the first POLL frame is received. The receiver is responsible for polling the transmitter as soon as an RFP frame is received and assumed responsibility for recovery at that point. It is possible for both the transmitter and receiver to be in contention to recover a lost frame (i.e., RFP or DATA) if the POLL frame is lost. The contention is resolved with a random backoff algorithm. If a CLEAR frame is lost and the polling node which sent the CLEAR frame is responsible for recovery, the requesting node which initiated the bracket cannot determine if the link was lost or the CLEAR frame was lost. The requesting node must send an ENQ frame to determine which case holds.

This preferred embodiment utilizes a state machine (SM) to control network communication. No state machine is required for multicast and broadcast frames, however. Multicast and broadcast frames can be transmitted whenever the channel is available. Received multicast or broadcast frames are simply discarded or posted to the bridging layer. Various state machines are used to handle other communication aspects. These include the bracket-transmit, bracket-receive, receive-SEQ-control and transmit-SEQ-control state machines.

Specifically, the bracket-transmit state machine used provides IDLE, READY, S-RFP, S-DATA, S-EOD, READY2 and S-EOD2 states. The IDLE state causes this state machine to idle, waiting a bracket of frames to transmit. The READY occurs when the state machine has a bracket of one or more frames to transmit and is waiting to acquire the channel. The S-RFP state occurs when the state machine has sent an RFP frame and is waiting for a POLL frame. The S-DATA state occurs when the state machine has sent a DATA frame and is waiting for a POLL frame. The S-EOD state occurs when the state machine has sent an EOD frame after receiving a POLL frame and is waiting for a CLEAR frame. The RDY-WAIT state occurs when the state machine has received a WFP frame and is waiting for a POLL frame (or timeout).

The READY2 and S-EOD2 states only apply to transmissions on a wired link which are not initiated with a request for polling. The READY2 state occurs when the state machine has a single short frame to transmit, is waiting to acquire a wired link, and the SEQ state of the receiver is known. The S-EOD2 state occurs when the state machine has sent an unsolicited EOD frame is waiting for a CLEAR frame.

There is an automatic and immediate transition from the READY state to the READY2 state if the communications channel is a wired link, the SEQ state of the receiver is known, and the bracket to transmit consists of a single EOD frame which is less than MAX-SHORT-FRAME-SIZE in length.

The state machine also uses various timers. A RP-TIMEOUT receive timer is started when an RFP frame is transmitted, an ENQ frame is transmitted, and (on wired links), when an EOD frame is sent without first sending an RFP frame. The timeout value is larger than interframe gap time plus the time required to transmit a POLL or CLEAR frame. If the RSP-TIMEOUT timer expires before an expected response is received, a retry counter is incremented and the request frame is retransmitted, if the retry count has not been exceeded.

A POLL-TIMEOUT receive timer is also used. This timer is started whenever a DATA or EOD frame is transmitted following an RFP frame. The timeout value is larger than the time required for the maximum number of poll retry attempts. The MAC layer returns an error to the bridging layer if this timer expires before an expected poll frame is received. Note that the receiver is responsible for recovery when this timer is running. Similarly, a WFP-TIMEOUT timer is started whenever a WFP frame is received. The RDY-WAIT state ends when this timer expires or a POLL frame is received.

The state machine must maintain a "current pointer" variable which points to the current frame in a bracket of frames to be transmitted. The current pointer is advanced if, and only if, a POLL for the next frame in the bracket is received. If more than one transition is specified when a POLL frame is received, the state of the current pointer determines which transition should be taken.

In the bracket-receive state machine, an assumption is made that invalid frames and frames not directed to the local node are discarded and do not affect state transitions. Multicast and broadcast frames are simply posted to the bridging entity, if a buffer is available, and do not affect state transitions.

There are three states in the bracket-receive state machine: 1) IDLE-LISTEN; 2) BUSY; and 3) BUSY-WAIT. The IDLE-LISTEN state occurs whenever the receiver is not receiving a bracket of frames. The BUSY state occurs when the receiver has sent a POLL frame and is waiting for the next frame in a bracket. Finally, the BUSY-WAIT state occurs when the receiver is waiting for a buffer to become free.

The bracket-receive state also uses the RSP-TIMEOUT and WFP-TIMEOUT timers. Specifically, the RSP-TIMEOUT timer is started when a POLL frame is transmitted. The timeout value is larger than interframe gap time plus the time required to transmit a DATA frame. If the RSP-TIMEOUT timer expires before an expected response is received, a retry counter is incremented and the POLL frame is retransmitted, if the retry count has not been exceeded. The receiver must maintain a poll-queue which is a FIFO list of all terminals which have requested polling. Entries in the queue are aged so that they are discarded after WFP-TIMEOUT seconds. The entry at the front of the queue is considered active; all other entries in the queue are denoted as queued. Nodes which are not active nor queued are denoted as inactive. Note that there is no active node in the IDLE-LISTEN state. Additionally, a separate queue can be used for high priority requests.

A SEQ state variable is cached for all nodes which have recently transmitted valid data frames. The SEQ state variable is updated as specified in the section which describes state machines for frame SEQ control.

Only one bracket may be in progress at a time. The receiver must reserve enough buffers for an entire bracket of frames before sending a POLL frame in response to an RFP frame. This ensures that the entire bracket will be accepted.

All unicast MAC data frames are sequenced with a 1-bit sequence number (SEQ). The sequence number is used to detect lost data frames and duplicate data frames. The MAC entity in each node must maintain transmit and receive SEQ state tables for unicast messages. The receive SEQ state table contains an entry for each active MAC source node. The transmit SEQ state table contains an entry for each active destination node. Each entry consists of a 1-bit SEQ state variable and a network address. Only unicast command frames affect state table entries. As a rule, a receive table entry should be discard d before the counterpart transmit table entry (i.e., in another node) is discarded. Receive SEQ state table entries need only be kept long enough to ensure that retransmitted duplicates are not mistaken for valid frames. This implies that receive table entries must be kept for a period longer than the maximum transmit retry time for a single frame. An entry in the transmit SEQ state table can be kept until the space is required for a new entry. Strict state timing is not required because a transmitter, (without a table entry for a potential receiver), can determine the state of a receiver, (with an RFP frame), before transmitting data frames. Also, the MAC layer does not provide a reliable service. Lost frames and duplicates are detected by higher layers.

The receive-SEQ-control and transmit-SEQ-control state machines specify how entries in the SEQ state tables are maintained. The use of the term "poll" is used to denote any poll frame (i.e., POLL, WFP, CLEAR, or REJECT) and the term "data" is used to denote any data frame (i.e., DATA or EOD).

Move specifically, the receive-SEQ-control state machine uses three states: 1) ACCEPT-0; 2) ACCEPT-1; and 3) ACCEPT-ANY. In the ACCEPT-0 state, the receiver expects the next DATA or EOD packet to have a SEQ number of 0. In the ACCEPT-1 state the receiver expects the next DATA or EOD packet to have a SEQ number of 1. Finally, in the ACCEPT-ANY state the receiver will accept a DATA or EOD packet with a SEQ number of 0 or 1.

The MAC receiver caches receive SEQ state variables for active external source nodes. The variable can be set to one of three states listed above. A state of ACCEPT-ANY applies to all nodes which do not have entries in the receiver's SEQ state table. The receiver sets the SEQ bit in a poll frame to denote the next frame that the receiver expects.

The transmit-SEQ-control state machine also utilizes three states: 1) SEND-0; 2) SEND-1; and 3) UNKNOWN. In the SEND-0 state, the transmitter sends the current data frame with a SEQ number of 0 and expects a POLL or CLEAR with a SEQ number of 1. In the SEND-1 state the transmitter sends the current data frame with a SEQ number of 1 and expects a POLL or CLEAR with a SEQ number of 0. In the UNKNOWN state, the transmitter must send an RFP or ENQ frame to determine the SEQ state of the receiver.

The MAC transmitter maintains a transmit SEQ state variable per external node. The transmitter sends the SEQ field in DATA and EOD frames to the value of the transit SEQ state variable. The state variable can be in one of the three states listed above. The UNKNOWN state applies to all nodes which do not have entries in the transmitter's state table. If the state is UNKNOWN, the transmitter sends an RFP or ENQ frame to determine the SEQ state of the receiver before sending a data frame. On radio links, the SEQ state is set to UNKNOWN as soon as the transmission of frames is completed.

The SEQ field in a poll frame denotes the next data frame expected. Each time a poll frame is received, the transmit SEQ state variable associated with the source of the poll frame is set to the value of the poll frame's SEQ field. A "current pointer" points to the current data frame in a bracket of data frames. The current pointer is advanced if the current data fame has been transmitted with a SEQ field value of "0" ("1") and a poll frame is received with a SEQ field value of "1" ("0").

Various network constants are also used in this preferred embodiment. These include:
1) WFP-TIMEOUT (1 second) this is the time that a node remains in a quite state waiting for a POLL frame after a WFP frame is received;
2) MAX-PKT-SIZE (800 bytes) this is the maximum size of a bridging layer packet including bridging header characters;
3) R-MAX-FRAME-SIZE (100 bytes) this is the maximum size of a MAC layer frame on the spread spectrum radio link, not including MAC header and framing characters;
4) W-MAX-FRAME-SIZE MAX_PKT_size, is the maximum size of a MAC layer frame on the RS485 LAN, not including MAC header and framing characters;
5) W-MAX-SHORT-FRAME-SIZE (200 bytes) this is the maximum size of a MAC layer frame which can be transmitted without first sending a RFP frame on the RS485 LAN;
6) W-SLOT-SIZE (50 microseconds) this is the CSMA slot size for the RS485 LAN;
7) W-INTERFRAME-GAP (200 microseconds) this is the maximum interframe gap time for the RS485 LAN.
8) W-IDLE-TIME (W-INTERFRAME-GAP+W-SLOT-size+50 microseconds) this is the CSMA idle time on the RS485 LAN;
9) R-SLOT-SIZE (1000 microseconds) this is the LBT slot size on the spread spectrum radio link;
10) R-INTERPOLL-GAP (500 microseconds) this is the interpoll gap time on the spread spectrum radio link; and
11) R-IDLE-TIME (R-INTERPOLL-GAP) this is the LBT idle time on the spread spectrum radio link.

THE CSMA/CA channel access algorithm used on the RS485 LAN differs from the LBT algorithm for radio links because of the hidden terminal factor in the radio network. Particularly, the p-persistent CSMA/CA algorithm forces all nodes to detect an idle channel for one CSMA idle time unit, where a CSMA idle time unit is greater than the interframe gap time, before the channel is considered free. If a node initially detects a free channel, it can transmit immediately. If a node detects a busy channel, it listens to the channel until it becomes free. When the channel becomes free, at that point, time is divided into "p" CSMA slots. The node selects one of the "p" slots, "i", at random. If the channel is idle for the first i−1 ("i" minus one) slots, the node transmits in slot i. If the channel becomes busy in one of the fist i−1 slots, the process is repeated. If an expected response is not received, a node chooses a number, "i", between one ("1") and p, and delays for "i" CSMA slots before re-executing the CSMA algorithm to retransmit. The number of backoff slots, p, is given as an increasing function of the number of missed responses and busy channel directions.

The LBT algorithm functions as a pure CSMA algorithm when the channel is lightly loaded. A channel is allowed to transmit as soon as an idle channel is detected. CSMA is never used for retransmissions. When the channel is moderately to heavily loaded, the LBT algorithm forces all nodes to detect an idle channel for at least one LBT idle time unit, (this unit being greater than the interpoll gap time) before the channel is considered free. If a node initially detects a free channel, it can transmit immediately. If a node detects a busy channel, it listens to the channel until it becomes free. When the channel becomes free, at that point, time is divided into "p" LBT slots. The node selects one of the "p" slots, "i", at random. If the channel is idle for the first i–1 slots, then the node will transmit in slot i. If the channel becomes busy in one of the first i–1 slots, the process is repeated. If an expected response is not received, a node chooses a number, "i", between one ("1") and "p", and delays for "i" LBT slots before re-executing the LBT algorithm to retransmit. The number of backoff slots, "p", is given as an increasing function of the number of missed responses and busy channel detections.

The CSMA/CA algorithm for the RS485 LAN, and the LBT/BP algorithm for spread spectrum radio links are both shown in pseudo-code in Appendix F.

This network embodiment uses what will be referred to as "SST Multi-drop LAN" techniques herein. The SST Multi-drop LAN shown in FIG. 26 is built on what is called a "linear" topology. A single cable 3501 forms a line and each device is simply connected to the line. In a typical warehouse facility 3503 the multi-drop network consists of the cable 3501 connecting bases stations 3505-3521 and 3503 a controller 3523. The controller 3523 and the base stations 3505-3521 can be placed anywhere along the cable 3501.

The physical length of the cable 3501 depends primarily on the following:
1. the data rate used;
2. the number of devices on the network;
3. the gauge of wire used;
4. the characteristics of the wire used which includes the capacitance, 6 dbv length and twist-rat;
5. the shielding of the wire (the combination of braided and foil shields are preferred); and
6. the environment (in a heavy-industrial environment with such things as large motors that start and stop frequently, welding, ultrasonic equipment, electroplating, or other electrically noisy equipment, the distance is less).

For example, using simulated noisy environment AWG #24 wire with eight device and shielded wire, a two thousand foot cable 3501 operates without problems. In preferred embodiment, the communication link utilizes NPN 321-457-001 cable (Belden 9841).

If the physical length of the cable 3050 needs to be extended, an additional "network segment" can be added. Segments are linked together by repeaters. This repeater can be either a "dumb" bridge, acting to relay all information between segments, or an "intelligent" bridge, relaying information selectively. Further, the repeater does not have to be placed at the end of the communication link. As with base stations and controllers, repeaters can be placed any where it physically makes sense.

Coupling transformer may be used to protect the devices from ESD, EMI, and noise.

Radio bases don't always have to be wired to the network. If a base is within radio range of another base that is connected to the network, then the first base can communicate data from terminals to the host via the second base. For wireless routing, the two coverage areas must overlap enough so that each base is within range of the other. As a result, more radio bases are needed than scenarios using hand-wired routing to the LAN.

As shown in FIG. 27, wireless routing can reduce the amount of wiring necessary in a facility. This arrangement require no more than one on-the-air hop from any area, so the performance impact isn't that great.

Wireless routing is especially effective at filling in fringe areas. In the example above, the outside of the loading dock could have marginal coverage. If, once the system is installed, the coverage is this area turns out to be unacceptable, couple of wireless routers could be added to guarantee solid coverage in this area without adding any more wiring. Installation could be complete in just the time required to mount the bases. These bases need only to be taped to a wall to optimize coverage. If this solves the coverage problem, but the customer finds the performance impact unacceptable, then the new bases station could be hardwired in. Terminals being used out on the loading dock in areas where the coverage of the wireless routers and the wired bases overlap automatically switches between the wireless routers and the wired based depending on which gives the shortest path to the host. There is no danger that adding a wireless router will slow things down by causing terminals to make unnecessary on-the-air hops when they are within range of a wired base.

Another major application for wireless routers is continuing coverage when a wired base fails. A couple of wireless routers setup at ground level or perhaps duct taped a few feet up on support columns, a temporary installation that can be done with a step ladder, could easily fill in most of the blacked-out area until the failed base can be repaired.

Wireless routers can also be a real benefit for operation in temporary physical are as avoiding hard-wiring. In addition, two networks can be linked with wireless routing. In some situations, this may be a good way to eliminate multiple on-the-air hops.

Once all the network hardware is installed and on, the system configures itself and constantly reconfigures itself. As the customer moves goods around his warehouse and radio propagation inside changes, the system reconfigures to try to maintain as much coverage as it can. When a piece of equipment fails, the system reconfigures around it. If a base fails, but the area can be covered by a wireless router, the system automatically uses that router. For example, when a new wireless router is installed, it is automatically assimilated into the system within minutes of merely powering up the router. If that wireless router is hardwired it in, it automatically stops wireless routing and become a wired base. If that hardwired communication link breaks, the two resulting segments automatically begins communicating wirelessly.

Description of FIGS. 28 through 30

FIG. 28 illustrates a roaming terminal power saving or sleep mode feature involved in the communication between an exemplary base station which polls a plurality of roaming terminals. Although the communication system configuration set forth in FIG. 18 is used for specific illustration, any other configuration may also be utilized. Similarly, although this illustration uses slotted contention polling, any other polling protocol might also be used.

Roaming terminals which have radio transceivers may also have keyboards and/or bar code reading devices attached thereto for data collection. All of these devices are portable and quickly drain battery power unless used wisely. The power requirements of the roaming terminals can be minimized if the transceiver circuitry is only powered-up when needed. In a specific example shown in FIG. 18, the roaming terminal 3016 is illustrated in a dormant/active cycle where the unit remains off for a five second period as at 4500 and at 4501 terminal 3016 assumes receive mode for a 1000 millisecond period whereupon, having received no signal addressed to it and having no data to send, it returns to "off" (dormant) state at 4502 to begin a new dormant/active cycle. This dormant state is also referred to herein as a "sleep mode."

Roaming terminal 3015 is illustrated as being in off status at 4504 and as cycling to receive mode at 4505. In one embodiment the polling signal at 4051 (even though not addressed to terminal 3015) may trigger a ten second timing interval at 4506 at the end of which if no further RF signal has been received terminal 3015 will move to off (dormant) state and resume its dormant/active cycling. (The signal at 4507 may not be of received strength at terminals 3015 and 3016 sufficient to cause an increase in the active cycles at 4501 and 4506).

Roaming terminal 3017 turns on its receiver at 4510 when it has determined that it has a message to send. Terminal 3017 would bid for attention at 4511, e.g., in response to general poll 4040 would send its message at 4507, and then switch to receive at 4512, and stay on for ten seconds as indicated at 4514 whereupon it would resume the power of saving cycle of one second RX-ON, five seconds—radio OFF in the absence of a received RF signal.

When a roaming terminal has no message to send, it will remain in receive enable state for a fixed time, e.g., ten seconds and if no message is directed to the roaming terminal, and further, no input is otherwise made to the roaming terminal, e.g., by the user, then the roaming terminal will commence a cycle of alternating dormant and active states, e.g., five seconds off or dormant and one second on or active, that is, in receive mode, ready to receive a message from a base station. The cycling will continue until the roaming terminal receives a signal addressed to it whereupon the roaming terminal will remain in active state, that is, in receive or transmit mode until completion of its communication with the base station.

Following completion of the communication with the base station, the roaming terminal will remain in receive mode for a fixed time, e.g., ten seconds, and return to the alternating dormant and active cycling, thereby conserving power in the roaming terminal. If a polling signal or a message of any type is received by a roaming terminal during any active state portion of its active/dormant cycling, the roaming terminal, e.g., terminal 3016 will remain enabled, that is, in active state and will receive messages and transmit in response thereto until the communication session has been completed.

Further, when a roaming terminal unit is powered up by a user, such as by manipulation of its keyboard or by other directly coupled input means, e.g., by a bar code reader, the roaming terminal will remain in active, receive mode for the fixed time period, e.g., ten seconds, there following, before returning to its alternating dormant/active cycle. However, should any input signal be received by the roaming terminal during the initial fixed time period before cycling begins, the roaming terminal will remain in enabled, that is, receive mode until a fixed period elapses during which no signal or other stimulus is received.

The structure of the internally operated command sequencing within the processor of a roaming terminal having the cyclic dormant/active power saving feature of the present disclosure is presented in Appendix H.

FIGS. 29 and 30 together comprise a flow chart with the operation of a roaming terminal with the dormant/active power saving feature. When the terminal radio is on, the system tests for reception of a transmission from the base station, and turns the terminal radio on for ten seconds if it detects one. If it does not, it tests to see if the terminal has scanned the bar code. If so, it turns the radio on for ten seconds. If not, it tests to see if the user has initiated a transmission. If so, it turns the terminal on for ten seconds. If none of these events occur, the cycle repeats until a timer turns the radio off. The sequence tests to see if the terminal has scanned the bar code and, if not, if the user has initiated a transmission. If the answer is yes, the radio is switched on for ten seconds; otherwise, the cycle repeats until a timer times out the test, in which case the radio is turned on for one second to listen for a poll.

Other "sleep mode" scenarios are described above in relation to the dominant communication protocol.

Additionally, it is obvious that the embodiments of the present invention described hereinabove are merely illustrative and that other modifications and adaptations may be made without departing from the scope of the appended claims.

What is claimed is:

1. A radio frequency data communication system comprising:
    one or more base stations each having a radio frequency transceiver and each base station transmitting a pending message list at each of selected time intervals; and
    a plurality of roaming terminals each having a radio frequency transceiver, the roaming terminals being selectively communicative with one or more base stations and each of the roaming terminals selectively deactivating the terminal's radio frequency transceiver through a plurality of the selected time intervals and synchronizing the activation of the terminal's radio frequency transceiver to receive the pending message list following the plurality of the selected time intervals.

2. A radio frequency data communication system as recited in claim 1 wherein the one or more base stations transmits timing information regarding the selected time intervals to the plurality of roaming terminals.

3. A radio frequency data communication system as recited in claim 2 wherein the one or more base stations communicates the timing information during the selected time intervals.

4. A radio frequency data communication system as recited in claim 1 wherein the one or more base stations transmits timing information regarding the selected time intervals along with each pending message list to the plurality of roaming terminals.

5. The radio frequency data communication system of claim 1, wherein the respective transceivers of the roaming terminals are spread spectrum transceivers.

6. The radio frequency data communication system of claim 1, wherein the communication system comprises a plurality of base stations, each of which corresponds to a respective coverage area.

7. The radio frequency data communication system of claim 1, wherein at least one of the roaming terminals operates to activate its transceiver to receive a pending message list for up to a maximum listening period, where the maximum listening period is at least a maximum expected time interval between consecutive pending message list transmissions.

8. The radio frequency data communication system of claim 1, wherein at least one of the roaming terminals operates to determine whether to consider a received pending message list transmission based, at least in part, on signal strength.

9. The radio frequency data communication system of claim 1, wherein at least one of the roaming terminals comprises a hand-held terminal.

10. The radio frequency data communication system of claim 1, wherein at least one of the roaming terminals comprises circuitry that operates to perform batch file transfer.

11. The radio frequency data communication system of claim 1, wherein at least one of the roaming terminals comprises circuitry that operates to perform on-line data entry.

12. The radio frequency data communication system of claim 1, wherein at least one of the roaming terminals operates to calculate an expected time for a pending message list transmission.

13. The radio frequency data communication system of claim 1, wherein at least one of the roaming terminals operates to calculate an expected time for a pending message list transmission based, at least in part, on timing information received with a previous pending message list transmission.

14. The radio frequency data communication system of claim 1, wherein at least one of the roaming terminals operates to calculate an expected time for a pending message list transmission based, at least in part, on seed information received in a previous transmission.

15. The radio frequency data communication system of claim 1, wherein at least one of the roaming terminals operates to cause its respective transceiver to operate in a sleep mode by, at least in part, causing circuitry to power down the transceiver.

16. The radio frequency data communication system of claim 1, wherein at least one of the roaming terminals operates to determine a sleep time period based, at least in part, on an expected duration of a communication between another roaming terminal and a base station of the communication system.

17. The radio frequency data communication system of claim 1, wherein at least one of the roaming terminals operates to determine a sleep time period based, at least in part, on message length information communicated between another roaming terminal and a base station of the communication system.

18. The radio frequency data communication system of claim 1, wherein at least one of the roaming terminals operates to determine a sleep time period based, at least in part, on message length information transmitted by another roaming terminal.

19. The radio frequency data communication system of claim 1, wherein the pending message list comprises information of messages stored for a plurality of sleeping terminals.

20. The radio frequency data communication system of claim 1, wherein the pending message list comprises information indicating that a message awaits delivery to at least one of the roaming terminals.

21. The radio frequency data communication system of claim 1, wherein the pending message list comprises information from which at least one of the roaming terminals determines whether a message awaits delivery to the at least one of the roaming terminals.

22. The radio frequency data communication system of claim 1, wherein at least one of the roaming terminals operates to analyze a received pending message list to determine whether a message awaits delivery to the at least one of the roaming terminals.

23. The radio frequency data communication system of claim 1, wherein in response to a received pending message list indicating that a message awaits delivery to at least one of the roaming terminals, the at least one of the roaming terminals operates to direct its respective transceiver to transmit a message requesting delivery of one or more pending messages to the at least one of the roaming terminals.

24. The radio frequency data communication system of claim 1, wherein the pending message list comprises information indicating that one or more messages are stored at a node of the communication system and awaiting delivery to at least one of the roaming terminals.

25. The radio frequency data communication system of claim 1, wherein the pending message list comprises information indicating that one or more messages are stored in a base station of the communication system and awaiting delivery to at least one of the roaming terminals.

26. The radio frequency data communication system of claim 1, wherein at least one of the roaming terminals operates to maintain operation of the at least one of the roaming terminals in an awake state if a predetermined number of expected signals from the communication system are not received.

27. The radio frequency data communication system of claim 1, wherein at least one of the roaming terminals operates to determine a number of the selected time intervals in which to operate its respective transceiver in a sleep mode.

28. The radio frequency data communication system of claim 1, wherein the pending message list comprises information of mail messages awaiting delivery to at least one of the roaming terminals.

29. The radio frequency data communication system of claim 1, wherein at least one of the roaming terminals operates to cause circuitry of the at least one of the roaming terminals to enter a sleep mode for at least a portion of an expected delay to receive a message in response to a message sent from the at least one of the roaming terminals.

30. The radio frequency data communication system of claim 1, wherein at least one of the roaming terminals operates to activate and deactivate particular circuitry of the at least one of the roaming terminals in a consistent cycle.

31. The radio frequency data communication system of claim 1, wherein at least one of the roaming terminals operates to cause circuitry of the at least one of the roaming terminals to operate in an awake state for a first period of time if no message is received and for a second period of time, longer than the first period of time, if a message is received.

32. The radio frequency data communication system of claim 1, wherein at least one of the roaming terminals operates to cause circuitry of the at least one of the roaming terminals to operate in an awake state in response to a user input and to continue to operate in the awake state for a fixed time period following the user input.

33. The radio frequency data communication system of claim 1, wherein at least one of the roaming terminals operates to cause circuitry of the at least one of the roaming terminals to operate in an awake state for at least an entire duration of a communication session with the communication system.

34. The radio frequency data communication system of claim 1, wherein at least one of the roaming terminals operates to cause circuitry of the at least one of the roaming terminals to operate in an awake state for a fixed time period following completion of a communication session with the communication system.

35. A radio frequency data communication system comprising:
one or more base stations each having a radio frequency transceiver and each base station transmitting a pending message list at each of selected time intervals; and
a plurality of roaming terminals each having a radio frequency transceiver, the roaming terminals being selectively communicative with one or more base stations and each of the roaming terminals selectively deactivating the terminal's radio frequency transceiver through at least one of the selected time intervals and synchronizing the activation of the terminal's radio frequency transceiver to receive the pending message list following at least one of the selected time intervals.

36. A radio frequency data communication system as recited in claim 35 wherein the one or more base stations transmits timing information regarding the selected time intervals to the plurality of roaming terminals.

37. A radio frequency data communication system as recited in claim 36 wherein the one or more base stations communicates the timing information during the selected time intervals.

38. A radio frequency data communication system as recited in claim 35 wherein the one or more base stations transmits timing information regarding the selected time intervals along with each pending message list to the plurality of roaming terminals.

39. The radio frequency data communication system of claim 35, wherein the respective transceivers of the roaming terminals are spread spectrum transceivers.

40. The radio frequency data communication system of claim 35, wherein the communication system comprises a plurality of base stations, each of which corresponds to a respective coverage area.

41. The radio frequency data communication system of claim 35, wherein at least one of the roaming terminals operates to activate its transceiver to receive a pending message list for up to a maximum listening period, where the maximum listening period is at least a maximum expected time interval between consecutive pending message list transmissions.

42. The radio frequency data communication system of claim 35, wherein at least one of the roaming terminals operates to determine whether to consider a received pending message list transmission based, at least in part, on signal strength.

43. The radio frequency data communication system of claim 35, wherein at least one of the roaming terminals comprises a hand-held terminal.

44. The radio frequency data communication system of claim 35, wherein at least one of the roaming terminals comprises circuitry that operates to perform batch file transfer.

45. The radio frequency data communication system of claim 35, wherein at least one of the roaming terminals comprises circuitry that operates to perform on-line data entry.

46. The radio frequency data communication system of claim 35, wherein at least one of the roaming terminals operates to calculate an expected time for a pending message list transmission.

47. The radio frequency data communication system of claim 35, wherein at least one of the roaming terminals operates to calculate an expected time for a pending message list transmission based, at least in part, on timing information received with a previous pending message list transmission.

48. The radio frequency data communication system of claim 35, wherein at least one of the roaming terminals operates to calculate an expected time for a pending message list transmission based, at least in part, on seed information received in a previous transmission.

49. The radio frequency data communication system of claim 35, wherein at least one of the roaming terminals operates to cause its respective transceiver to operate in a sleep mode by, at least in part, causing circuitry to power down the transceiver.

50. The radio frequency data communication system of claim 35, wherein at least one of the roaming terminals operates to determine a sleep time period based, at least in part, on an expected duration of a communication between another roaming terminal and a base station of the communication system.

51. The radio frequency data communication system of claim 35, wherein at least one of the roaming tenninals operates to determine a sleep time period based, at least in part, on message length information communicated between another roaming terminal and a base station of the communication system.

52. The radio frequency data communication system of claim 35, wherein at least one of the roaming terminals operates to determine a sleep time period based, at least in part, on message length information transmitted by another roaming terminal.

53. The radio frequency data communication system of claim 35, wherein the pending message list comprises information of messages stored for a plurality of sleeping terminals.

54. The radio frequency data communication system of claim 35, wherein the pending message list comprises information indicating that a message awaits delivery to at least one of the roaming terminals.

55. The radio frequency data communication system of claim 35, wherein the pending message list comprises information from which at least one of the roaming terminals determines whether a message awaits delivery to the at least one of the roaming terminals.

56. The radio frequency data communication system of claim 35, wherein at least one of the roaming terminals operates to analyze a received pending message list to determine whether a message awaits delivery to the at least one of the roaming terminals.

57. The radio frequency data communication system of claim 35, wherein in response to a received pending message list indicating that a message awaits delivery to at least one of the roaming terminals, the at least one of the roaming terminals operates to direct its respective transceiver to transmit a message requesting delivery of one or more pending messages to the at least one of the roaming terminals.

58. The radio frequency data communication system of claim 35, wherein the pending message list comprises information indicating that one or more messages are stored at a node of the communication system and awaiting delivery to at least one of the roaming terminals.

59. The radio frequency data communication system of claim 35, wherein the pending message list comprises information indicating that one or more messages are stored in a base station of the communication system and awaiting delivery to at least one of the roaming terminals.

60. The radio frequency data communication system of claim 35, wherein at least one of the roaming terminals operates to maintain operation of the at least one of the roaming terminals in an awake state if a predetermined number of expected signals from the communication system are not received.

61. The radio frequency data communication system of claim 35, wherein at least one of the roaming terminals operates to determine a number of the selected time intervals in which to operate its respective transceiver in a sleep mode.

62. The radio frequency data communication system of claim 35, wherein the pending message list comprises information of mail messages awaiting delivery to at least one of the roaming terminals.

63. The radio frequency data communication system of claim 35, wherein at least one of the roaming terminals operates to cause circuitry of the at least one of the roaming terminals to enter a sleep mode for at least a portion of an expected delay to receive a message in response to a message sent from the at least one of the roaming terminals.

64. The radio frequency data communication system of claim 35, wherein at least one of the roaming terminals operates to activate and deactivate particular circuitry of the at least one of the roaming terminals in a consistent cycle.

65. The radio frequency data communication system of claim 35, wherein at least one of the roaming terminals operates to cause circuitry of the at least one of the roaming terminals to operate in an awake state for a first period of time if no message is received and for a second period of time, longer than the first period of time, if a message is received.

66. The radio frequency data communication system of claim 35, wherein at least one of the roaming terminals operates to cause circuitry of the at least one of the roaming terminals to operate in an awake state in response to a user input and to continue to operate in the awake state for a fixed time period following the user input.

67. The radio frequency data communication system of claim 35, wherein at least one of the roaming terminals operates to cause circuitry of the at least one of the roaming terminals to operate in an awake state for at least an entire duration of a communication session with the communication system.

68. The radio frequency data communication system of claim 35, wherein at least one of the roaming terminals operates to cause circuitry of the at least one of the roaming terminals to operate in an awake state for a fixed time period following completion of a communication session with the communication system.

69. For use in a radio frequency, data communication system having one or more base stations each transmitting a pending message list at each of selected time intervals, a roaming terminal operable in a sleep mode comprising:
 a radio frequency transceiver; and
 a processor selectively deactivating the transceiver through a plurality of the selected time intervals to operate the transceiver in a sleep mode and synchronizing the activation of the transceiver to receive a pending message list following the sleep mode.

70. The roaming terminal of claim 69, wherein the processor operates the transceiver to receive timing information regarding the selected time intervals from one or more base stations.

71. The roaming terminal of claim 70, wherein the processor operates the transceiver to receive the timing information during the selected time intervals.

72. The roaming terminal of claim 69, wherein the processor operates the transceiver to receive timing information regarding the selected time intervals along with each pending message list.

73. A data communication method for a communication system having one or more base stations that transmit via radio frequency a pending message list at each of selected time intervals and at least one roaming terminal having a radio frequency transceiver, the method comprising:
 deactivating the roaming terminal's transceiver in a sleep mode through a plurality of the selected time intervals; and
 synchronizing the activation of the roaming terminal's radio frequency transceiver to receive the pending message list following the sleep mode.

74. The method of claim 73, further comprising transmitting timing information regarding the selected time intervals from a base station.

75. The method of claim 73, wherein the transceiver of the roaming terminal is a spread spectrum transceiver.

76. The method of claim 73, wherein the communication system comprises a plurality of base stations, each of which corresponds to a respective coverage area.

77. The method of claim 73, further comprising activating the transceiver to receive a pending message list for up to a maximum listening period, where the maximum listening period is at least a maximum expected time interval between consecutive pending message list transmissions.

78. The method of claim 73, further comprising determining whether to consider a received pending message list transmission based, at least in part, on signal strength.

79. The method of claim 73, wherein the roaming terminal comprises a hand-held terminal.

80. The method of claim 73, further comprising performing batch file transfer between the roaming terminal and a base station of the communication system.

81. The method of claim 73, further comprising performing on-line data entry with the roaming terminal.

82. The method of claim 73, further comprising calculating an expected time for a pending message list transmission.

83. The method of claim 73, further comprising calculating an expected time for a pending message list transmission based, at least in part, on timing information received with a previous pending message list transmission.

84. The method of claim 73, further comprising calculating an expected time for a pending message list transmission based, at least in part, on seed information received in a previous transmission.

85. The method of claim 73, wherein deactivating the roaming terminal's transceiver comprises powering down circuitry of the transceiver.

86. The method of claim 73, further comprising determining a sleep time period based, at least in part, on an expected duration of a communication between another roaming terminal and a base station of the communication system.

87. The method of claim 73, further comprising determining a sleep time period based, at least in part, on message length information communicated between another roaming terminal and a base station of the communication system.

88. The method of claim 73, further comprising determining a sleep time period based, at least in part, on message length information transmitted by another roaming terminal.

89. The method of claim 73, wherein the pending message list comprises information of messages stored for a plurality of sleeping terminals.

90. The method of claim 73, wherein the pending message list comprises information indicating that a message awaits delivery to the roaming terminal.

91. The method of claim 73, wherein the pending message list comprises information from which the roaming terminal determines whether a message awaits delivery to the roaming terminal.

92. The method of claim 73, further comprising determining from a received pending message list whether a message for the roaming terminal is awaiting delivery.

93. The method of claim 73, further comprising in response to a received pending message list indicating that a message awaits delivery to the roaming terminal, directing the transceiver to transmit a message requesting delivery of one or more pending messages to the roaming terminal.

94. The method of claim 73, wherein the pending message list comprises information indicating that one or more messages are stored at a node of the communication system and awaiting delivery to the roaming terminal.

95. The method of claim 73, wherein the pending message list comprises information indicating that one or more messages are stored in a base station of the communication system and awaiting delivery to the roaming terminal.

96. The method of claim 73, further comprising operating the roaming terminal in an awake state if a predetermined number of expected signals from the communication system are not received.

97. The method of claim 73, further comprising determining a number of the selected time intervals in which to deactivate the transceiver.

98. The method of claim 73, wherein the pending message list comprises information of mail messages awaiting delivery to the roaming terminal.

99. The method of claim 73, further comprising causing circuitry of the roaming terminal to enter a sleep mode for at least a portion of an expected delay to receive a message in response to a message sent from the roaming terminal.

100. The method of claim 73, further comprising activating and deactivating particular circuitry of the roaming terminal in a consistent cycle.

101. The method of claim 73, further comprising operating circuitry of the roaming terminal in an awake state for a first period of time if no message is received and for a second period of time, longer than the first period of time, if a message is received.

102. The method of claim 73, further comprising operating circuitry of the roaming terminal in an awake state in response to a user input and continuing operating circuitry of the roaming terminal in the awake state for a fixed time period following the user input.

103. The method of claim 73, further comprising operating circuitry of the roaming terminal in an awake state for at least an entire duration of a communication session with the communication system.

104. The method of claim 73, further comprising operating circuitry of the roaming terminal in an awake state for a fixed time period following completion of a communication session with the communication system.

105. A method for operating a roaming terminal with a radio frequency transceiver in a data communication system, the method comprising:
- deactivating the roaming terminal's transceiver in a sleep mode through a plurality of selected time intervals during which a pending message list is transmitted;
- synchronizing the activation of the roaming terminal's radio frequency transceiver to receive a message following the sleep mode;
- receiving a pending message list; and
- determining from the pending message list whether a message for the roaming terminal is awaiting delivery.

106. The method of claim 105, wherein the communication system comprises a plurality of base stations, each of which corresponds to a respective coverage area.

107. The method of claim 105, further comprising activating the transceiver to receive a pending message list for up to a maximum listening period, where the maximum listening period is at least a maximum expected time interval between consecutive pending message list transmissions.

108. The method of claim 105, further comprising determining whether to consider a received pending message list transmission based, at least in part, on signal strength.

109. The method of claim 105, wherein the roaming terminal comprises a hand-held terminal.

110. The method of claim 105, wherein the roaming terminal comprises circuitry that operates to perform batch file transfer.

111. The method of claim 105, wherein the roaming terminal comprises circuitry that operates to perform on-line data entry.

112. The method of claim 105, further comprising calculating an expected time for a pending message list transmission.

113. The method of claim 105, further comprising calculating an expected time for a pending message list transmission based, at least in part, on timing information received with a previous pending message list transmission.

114. The method of claim 105, further comprising calculating an expected time for a pending message list transmission based, at least in part, on seed information received in a previous transmission.

115. The method of claim 105, wherein deactivating the roaming terminal's transceiver in a sleep mode comprises powering down circuitry of the transceiver.

116. The method of claim 105, further comprising determining a sleep time period based, at least in part, on an expected duration of a communication between another roaming terminal and a base station of the communication system.

117. The method of claim 105, further comprising determining a sleep time period based, at least in part, on message length information communicated between another roaming terminal and a base station of the communication system.

118. The method of claim 105, further comprising determining a sleep time period based, at least in part, on message length information transmitted by another roaming terminal.

119. The method of claim 105, wherein the pending message list comprises information of messages stored for a plurality of sleeping terminals.

120. The method of claim 105, wherein the pending message list comprises information indicating that a message awaits delivery to the roaming terminal.

121. The method of claim 105, wherein the pending message list comprises information from which circuitry of the roaming terminal determines whether a message awaits delivery to the roaming terminal.

122. The method of claim 105, wherein determining from the pending message list whether a message for the roaming terminal is awaiting delivery comprises utilizing at least one processor operates to analyze the pending message list to determine whether a message for the roaming terminal is awaiting delivery.

123. The method of claim 105, further comprising in response to a received pending message list indicating that a message awaits delivery to the roaming terminal, directing the transceiver to transmit a message requesting delivery of one or more pending messages to the roaming terminal.

124. The method of claim 105, wherein the pending message list comprises information indicating that one or more messages are stored at a node of the communication system and awaiting delivery to the roaming terminal.

125. The method of claim 105, wherein the pending message list comprises information indicating that one or more messages are stored in a base station of the communication system and awaiting delivery to the roaming terminal.

126. The method of claim 105, further comprising operating the roaming terminal in an awake state if a predetermined number of expected signals from the communication system are not received.

127. The method of claim 105, further comprising determining a number of the selected time intervals in which to deactivate the transceiver in a sleep mode.

128. The method of claim 105, wherein the pending message list comprises information of mail messages awaiting delivery to the roaming terminal.

129. The method of claim 105, further comprising causing circuitry of the roaming terminal to enter a sleep mode for at least a portion of an expected delay to receive a message in response to a message sent from the roaming terminal.

130. The method of claim 105, further comprising activating and deactivating particular circuitry of the roaming terminal in a consistent cycle.

131. The method of claim 105, further comprising operating circuitry of the roaming terminal in an awake state for a first period of time if no message is received and for a second period of time, longer than the first period of time, if a message is received.

132. The method of claim 105, further comprising operating circuitry of the roaming terminal in an awake state in response to a user input and continuing operating circuitry of the roaming terminal in the awake state for a fixed time period following the user input.

133. The method of claim 105, further comprising operating circuitry of the roaming terminal in an awake state for at least an entire duration of a communication session with the communication system.

134. The method of claim 105, further comprising operating circuitry of the roaming terminal in an awake state for a fixed time period following completion of a communication session with the communication system.

135. For use in a radio frequency, data communication system having at least one base station that transmits a pending message list at each of selected time intervals, a roaming terminal having a radio frequency transceiver and operable in a sleep mode, the roaming terminal comprising:

at least one processor that operates to selectively deactivate a radio frequency transceiver of the roaming terminal through a plurality of the selected time intervals to operate the transceiver in a sleep mode, and synchronize activation of the transceiver to receive a pending message list following the sleep mode.

136. The roaming terminal of claim 135, wherein the at least one processor operates to control the radio frequency transceiver of the roaming terminal to receive timing information regarding the selected time intervals from one or more base stations.

137. The roaming terminal of claim 136, wherein the at least one processor operates to control the radio frequency transceiver of the roaming terminal to receive the timing information during the selected time intervals.

138. The roaming terminal of claim 135, wherein the at least one processor operates to control the radio frequency transceiver of the roaming terminal to receive timing information regarding the selected time intervals along with each pending message list.

139. The roaming terminal of claim 135, wherein the transceiver of the roaming terminal is a spread spectrum transceiver.

140. The roaming terminal of claim 135, wherein the communication system comprises a plurality of base stations, each of which corresponds to a respective coverage area.

141. The roaming terminal of claim 135, wherein the at least one processor operates to activate the transceiver to receive a pending message list for up to a maximum listening period, where the maximum listening period is at least a maximum expected time interval between consecutive pending message list transmissions.

142. The roaming terminal of claim 135, wherein the at least one processor operates to determine whether to consider a received pending message list transmission based, at least in part, on signal strength.

143. The roaming terminal of claim 135, wherein the roaming terminal comprises a hand-held terminal.

144. The roaming terminal of claim 135, wherein the roaming terminal comprises circuitry that operates to perform batch file transfer.

145. The roaming terminal of claim 135, wherein the roaming terminal comprises circuitry that operates to perform on-line data entry.

146. The roaming terminal of claim 135, wherein the at least one processor operates to calculate an expected time for a pending message list transmission.

147. The roaming terminal of claim 135, wherein the at least one processor operates to calculate an expected time for a pending message list transmission based, at least in part, on timing information received with a previous pending message list transmission.

148. The roaming terminal of claim 135, wherein the at least one processor operates to calculate an expected time for a pending message list transmission based, at least in part, on seed information received in a previous transmission.

149. The roaming terminal of claim 135, wherein the at least one processor operates to cause the transceiver to operate in a sleep mode by, at least in part, causing circuitry to power down the transceiver.

150. The roaming terminal of claim 135, wherein the at least one processor operates to determine a sleep time period based, at least in part, on an expected duration of a communication between another roaming terminal and a base station of the communication system.

151. The roaming terminal of claim 135, wherein the at least one processor operates to determine a sleep time period based, at least in part, on message length information communicated between another roaming terminal and a base station of the communication system.

152. The roaming terminal of claim 135, wherein the at least one processor operates to determine a sleep time period based, at least in part, on message length information transmitted by another roaming terminal.

153. The roaming terminal of claim 135, wherein the pending message list comprises information of messages stored for a plurality of sleeping terminals.

154. The roaming terminal of claim 135, wherein the pending message list comprises information indicating that a message awaits delivery to the roaming terminal.

155. The roaming terminal of claim 135, wherein the pending message list comprises information from which the at least one processor determines whether a message awaits delivery to the roaming terminal.

156. The roaming terminal of claim 135, wherein the at least one processor operates to analyze a received pending message list to determine whether a message awaits delivery to the roaming terminal.

157. The roaming terminal of claim 135, wherein the response to a received pending message list indicating that a message awaits delivery to the roaming terminal, the at least one processor operates to direct the transceiver to transmit a message requesting delivery of one of more pending messages to the roaming terminal.

158. The roaming terminal of claim 135, wherein the pending message list comprises information indicating that one or more messages are stored at a node of the communication system and awaiting delivery to the roaming terminal.

159. The roaming terminal of claim 135, wherein the pending message list comprises information indicating that one or more messages are stored in a base station of the communication system and awaiting delivery to the roaming terminal.

160. The roaming terminal of claim 135, wherein the at least one processor operates to maintain operation of the roaming terminal in an awake state if a predetermined number of expected signals from the communication system are not received.

161. The roaming terminal of claim 135, wherein the at least one processor operates to determine a number of the selected time intervals in which to operate the transceiver in a sleep mode.

162. The roaming terminal of claim 135, wherein the pending message list comprises information of mail messages awaiting delivery to the roaming terminal.

163. The roaming terminal of claim 135, wherein the at least one processor operates to cause circuitry of the roaming terminal to enter a sleep mode for at least a portion of an expected delay to receive a message in response to a message sent from the roaming terminal.

164. The roaming terminal of claim 135, wherein the at least one processor operates to activate and deactivate particular circuitry of the roaming terminal in a consistent cycle.

165. The roaming terminal of claim 135, wherein the at least one processor operates to cause circuitry of the roaming terminal to operate in an awake state for a first period of time of no message is received and for a second period of time, longer than the first period of time, if a message is received.

166. The roaming terminal of claim 135, wherein the at least one processor operates to cause circuitry of the roaming terminal to operate in an awake state in response to a user input and to continue to operate in the awake state for a fixed time period following the user input.

167. The roaming terminal of claim 135, wherein the at least one processor operates to cause circuitry of the roaming terminal to operate in an awake state for at least an entire duration of a communication session with the communication system.

168. The roaming terminal of claim 135, wherein the at least one processor operates to cause circuitry of the roaming terminal to operate in an awake state for a fixed time period following completion of a communication session with the communication system.

169. A roaming terminal for use in a data communication system, the roaming terminal having a radio frequency transceiver, the roaming terminal comprising:
at least one processor that operates to, at least:
deactivate the terminal's radio frequency transceiver in a sleep mode through a plurality of selected time intervals during which a pending message list is transmitted;
synchronize activation of the roaming terminal's radio frequency transceiver to receive a message following the sleep mode;
receive a pending message list; and
determine from the pending message list whether a message for the roaming terminal is awaiting delivery.

170. The roaming terminal of claim 169, wherein the at least one processor operates to, at least, control the terminal's radio frequency transceiver to receive timing information regarding the selected time intervals from one or more base stations.

171. The roaming terminal of claim 170, wherein the at least one processor operates to, at least, control the terminal's radio frequency transceiver to receive the timing information during the selected time intervals.

172. The roaming terminal of claim 169, wherein the at least one processor operates to, at least, control the terminal's radio frequency transceiver to receive timing information regarding the selected time intervals along with each pending message list.

173. The roaming terminal of claim 169, wherein the transceiver of the roaming terminal is a spread spectrum transceiver.

174. The roaming terminal of claim 169, wherein the communication system comprises a plurality of base stations, each of which corresponds to a respective coverage area.

175. The roaming terminal of claim 169, wherein the at least one processor operates to activate the transceiver to receive a pending message list for up to a maximum listening period, where the maximum listening period is at least a maximum expected time interval between consecutive pending message list transmissions.

176. The roaming terminal of claim 169, wherein the at least one processor operates to determine whether to consider a received pending message list transmission based, at least in part, on signal strength.

177. The roaming terminal of claim 169, wherein the roaming terminal comprises a hand-held terminal.

178. The roaming terminal of claim 169, wherein the roaming terminal comprises circuitry that operates to perform batch file transfer.

179. The roaming terminal of claim 169, wherein the roaming terminal comprises circuitry that operates to perform on-line data entry.

180. The roaming terminal of claim 169, wherein the at least one processor operates to calculate an expected time for a pending message list transmission.

181. The roaming terminal of claim 169, wherein the at least one processor operates to calculate an expected time for a pending message list transmission based, at least in part, on timing information received with a previous pending message list transmission.

182. The roaming terminal of claim 169, wherein the at least one processor operates to calculate an expected time for a pending message list transmission based, at least in part, on seed information received in a previous transmission.

183. The roaming terminal of claim 169, wherein the at least one processor operates to cause the transceiver to operate in a sleep mode by, at least in part, causing circuitry to power down the tranceiver.

184. The roaming terminal of claim 169, wherein the at least one processor operates to determine a sleep time period based, at least in part, on an expected duration of a communication between another roaming terminal and a base station of the communication system.

185. The roaming terminal of claim 169, wherein the at least one processor operates to determine a sleep time period based, at least in part, on message length information communicated between another roaming terminal and a base station of the communication system.

186. The roaming terminal of claim 169, wherein the at least one processor operates to determine a sleep time period based, at least in part, on message length information transmitted by another roaming terminal.

187. The roaming terminal of claim 169, wherein the pending message list comprises information of messages stored for a plurality of sleeping terminals.

188. The roaming terminal of claim 169, wherein the pending message list comprises information indicating that a message awaits delivery to the roaming terminal.

189. The roaming terminal of claim 169, wherein the pending message list comprises information from which the at least one processor determines whether a message awaits delivery to the roaming terminal.

190. The roaming terminal of claim 169, wherein the at least one processor operates to analyze a received pending message list to determine whether a message awaits delivery to the roaming terminal.

191. The roaming terminal of claim 169, wherein in response to a received pending message list indicating that a message awaits delivery to the roaming terminal, the at least one processor operates to direct the transceiver to transmit a message requesting delivery of one or more pending messages to the roaming terminal.

192. The roaming terminal of claim 169, wherein the pending message list comprises information indicating that one or more messages are stored at a node of the communication system and awaiting delivery to the roaming terminal.

193. The roaming terminal of claim 169, wherein the pending message list comprises information indicating that one or more messages are stored in a base station of the communication system and awaiting delivery to the roaming terminal.

194. The roaming terminal of claim 169, wherein the at least one processor operates to maintain operation of the roaming terminal in an awake state if a predetermined number of expected signals from the communication system are not received.

195. The roaming terminal of claim 169, wherein the at least one processor operates to determine a number of the selected time intervals in which to operate the transceiver in a sleep mode.

196. The roaming terminal of claim 169, wherein the pending message list comprises information of mail messages awaiting delivery to the roaming terminal.

197. The roaming terminal of claim 169, wherein the at least one processor operates to cause circuitry of the roaming terminal to enter a sleep mode for at least a portion of an expected delay to receive a message in response to a message sent from the roaming terminal.

198. The roaming terminal of claim 169, wherein the at least one processor operates to activate and deactivate particular circuitry of the roaming terminal in a consistent cycle.

199. The roaming terminal of claim 169, wherein the at least one processor operates to cause circuitry of the roaming terminal to operate in an awake state for a first period of time if no message is received and for a second period of time, longer than the first period of time, if a message is received.

200. The roaming terminal of claim 169, wherein the at least one processor operates to cause circuitry of the roaming terminal to operate in an awake state in response to a user input and to continue to operate in the awake state for a fixed time period following the user input.

201. The roaming terminal of claim 169, wherein the at least one processor operates to cause circuitry of the roaming terminal to operate in an awake state for at least an entire duration of a communication session with the communication system.

202. The roaming terminal of claim 169, wherein the at least one processor operates to cause circuitry of the roaming terminal to operate in an awake state for a fixed time period following completion of a communication session with the communication system.

203. The method of claim 105, wherein the transceiver of the terminal is a spread spectrum transceiver.

* * * * *

UNITED STATES PATENT AND TRADEMARK OFFICE
CERTIFICATE OF CORRECTION

PATENT NO. : 7,536,167 B2  Page 1 of 1
APPLICATION NO. : 10/630138
DATED : May 19, 2009
INVENTOR(S) : Charles D. Gollnick et al.

It is certified that error appears in the above-identified patent and that said Letters Patent is hereby corrected as shown below:

Column 63, line 5 delete "wherein the" and insert --wherein in--.

Signed and Sealed this

Twenty-seventh Day of October, 2009

David J. Kappos
*Director of the United States Patent and Trademark Office*

UNITED STATES PATENT AND TRADEMARK OFFICE
CERTIFICATE OF CORRECTION

PATENT NO.       : 7,536,167 B2
APPLICATION NO.  : 10/630138
DATED            : May 19, 2009
INVENTOR(S)      : Charles D. Gollnick et al.

It is certified that error appears in the above-identified patent and that said Letters Patent is hereby corrected as shown below:

On the Title Page

Item (56) References Cited – OTHER PUBLICATIONS, page 3, lines 37-38, delete ""Man-Machine Interface of The Mobile Station", GSM 03.30 v. 3.9.0, Feb. 1992, QBB155113-155137." and insert --"Man-Machine Interface of The Mobile Station", GSM 02.30 v. 3.9.0, Feb. 1992, QBB155113-155137.--

Item (56) References Cited – OTHER PUBLICATIONS, page 3, line 60, delete "Intentionally Left Blank."

Item (56) References Cited – OTHER PUBLICATIONS, page 8, lines 42-44, delete "Loberg et al., "The New Swedish Cellular Mobile Radio Service", International Conference on Radio Receivers & Associated Systems (4th: 1986), 1986, Pub. No. 68, pp. 77-82." and insert --Loberg et al., "Mobitex - The New Swedish Cellular Mobile Radio Service", International Conference on Radio Receivers & Associated Systems (4th: 1986), 1986, Pub. No. 68, pp. 77-82.--

Item (56) References Cited – OTHER PUBLICATIONS, page 11, line 18, delete "M68HJC11 Reference Manual, Rev. 3.0, 1991." and insert --M68HC11 Reference Manual, Rev. 3.0, 1991.--

Item (56) References Cited – OTHER PUBLICATIONS, page 11, lines 7-8, delete "Katarine Standard Cell Specification, Aug. 12, 1992, Bates No. E 000087C-0242C." and insert --Katarina Standard Cell Specification, Aug. 12, 1992, Bates No. E 000087C-0242C.--

Signed and Sealed this

Twenty-second Day of December, 2009

David J. Kappos
*Director of the United States Patent and Trademark Office*